(12) United States Patent
Nodoushani et al.

(10) Patent No.: US 7,164,694 B1
(45) Date of Patent: Jan. 16, 2007

(54) VIRTUAL LOOP CARRIER SYSTEM WITH GATEWAY PROTOCOL MEDIATION

(75) Inventors: Paiman Nodoushani, Northboro, MA (US); Anthony Monterio, North Andover, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/378,587

(22) Filed: Feb. 28, 2003

Related U.S. Application Data

(63) Continuation of application No. 09/724,270, filed on Nov. 28, 2000, now Pat. No. 6,563,816, which is a continuation of application No. 09/441,587, filed on Nov. 17, 1999, now Pat. No. 6,731,627.

(60) Provisional application No. 60/130,170, filed on Apr. 20, 1999, provisional application No. 60/108,924, filed on Nov. 17, 1998.

(51) Int. Cl.
*H04L 12/66* (2006.01)
*H04L 12/64* (2006.01)

(52) U.S. Cl. .................. 370/467; 370/395.6; 370/401; 370/354

(58) Field of Classification Search ................ 370/352, 370/353, 356, 389, 395.1, 395.6, 395.61, 370/395.65, 401, 410, 465–466, 467, 493, 370/496, 498, 95.1, 354
See application file for complete search history.

(56) References Cited

U.S. PATENT DOCUMENTS

| | | | |
|---|---|---|---|
| 5,533,018 A | | 7/1996 | DeJager et al. |
| 5,687,174 A | | 11/1997 | Edem et al. |
| 5,696,790 A | | 12/1997 | Graham et al. |
| 5,703,876 A | * | 12/1997 | Christie ................. 370/395.61 |
| 5,724,355 A | | 3/1998 | Bruno et al. |
| 5,742,596 A | | 4/1998 | Baratz et al. |
| 5,778,001 A | | 7/1998 | Nakayama et al. |
| 5,818,511 A | | 10/1998 | Farry et al. |
| 5,896,443 A | | 4/1999 | Dichter |
| 5,936,936 A | | 8/1999 | Alexander et al. |
| 5,999,529 A | * | 12/1999 | Bernstein et al. ........... 370/376 |
| 6,002,689 A | * | 12/1999 | Christie et al. ............. 370/401 |

(Continued)

OTHER PUBLICATIONS

Lucent Joins Home Networking Crowd,: Electronics News, Oct. 12, 1998, vol. 44, No. 2240, p. 64.

*Primary Examiner*—Chau Nguyen
*Assistant Examiner*—Ahmed Elallam
(74) *Attorney, Agent, or Firm*—Hamilton, Brook, Smith & Reynolds, P.C.

(57) ABSTRACT

A loop carrier system includes a home local area network having plural telephone modules and a hub coupled to in-home telephone wiring. The telephone modules and the hub communicate voice signals over the in-home wiring in a dedicated frequency band above baseband POTS. The hub converts between voice signals and voice packets and is connected to a network access device for transferring the voice packets from the home local area network to a telecommunications network which routes the voice packets to a gateway. The gateway converts between the voice packets and a circuit format compatible with a local digital voice switch. The gateway includes an ATM switch and a call processing adjunct coupled to the ATM switch. The call processing adjunct controls the conversion between voice packets and the circuit format at the ATM switch. The call processing adjunct communicates with the home local area network using a first signaling protocol such as Media Gateway Control Protocol, Session Initiation Protocol or H.323, and with the local digital switch using a second signaling protocol such as GR-303 for controlling call processing in the communication system.

15 Claims, 45 Drawing Sheets

U.S. PATENT DOCUMENTS

| | | | |
|---|---|---|---|
| 6,026,086 A * | 2/2000 | Lancelot et al. ............ 370/353 |
| 6,065,061 A | 5/2000 | Blahut et al. |
| 6,069,899 A | 5/2000 | Foley |
| 6,075,784 A | 6/2000 | Frankel et al. |
| 6,101,182 A | 8/2000 | Sistanizadeh et al. |
| 6,134,235 A * | 10/2000 | Goldman et al. ........... 370/352 |
| 6,141,339 A | 10/2000 | Kaplan et al. |
| 6,195,714 B1 | 2/2001 | Li et al. |
| 6,198,752 B1 | 3/2001 | Lee |
| 6,208,653 B1 | 3/2001 | Ogawa et al. |
| 6,289,097 B1 | 9/2001 | Gregory et al. |
| 6,370,149 B1 * | 4/2002 | Gorman et al. ............. 370/419 |
| 6,370,153 B1 | 4/2002 | Eng |
| 6,385,193 B1 | 5/2002 | Civanlar et al. |
| 6,388,997 B1 | 5/2002 | Scott |
| 6,404,782 B1 | 6/2002 | Berenbaum et al. |
| 6,407,997 B1 | 6/2002 | DeNap et al. |
| 6,414,950 B1 | 7/2002 | Rai et al. |
| 6,414,952 B1 | 7/2002 | Foley |
| 6,456,594 B1 | 9/2002 | Kaplan et al. |
| 6,487,405 B1 | 11/2002 | Dapper |
| 6,570,974 B1 * | 5/2003 | Gerszberg et al. ........ 379/218.1 |
| 6,631,133 B1 * | 10/2003 | Christie et al. ........... 370/395.2 |
| 6,640,248 B1 * | 10/2003 | Jorgensen ................... 709/226 |
| 2001/0012319 A1 | 8/2001 | Foley |
| 2001/0043568 A1 | 11/2001 | McHale et al. |

\* cited by examiner

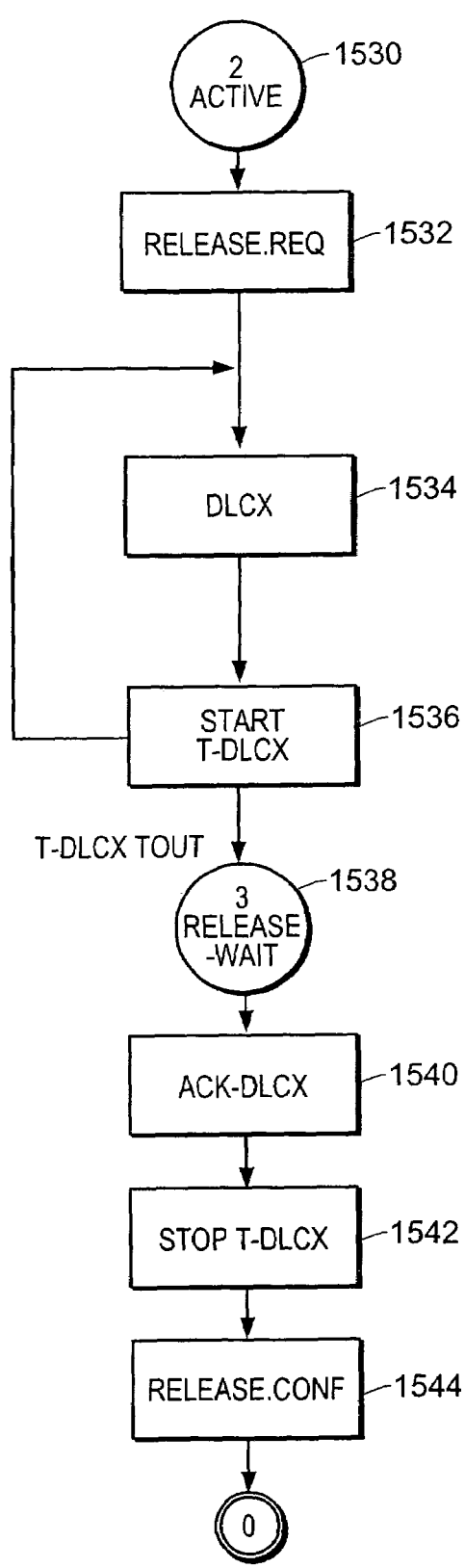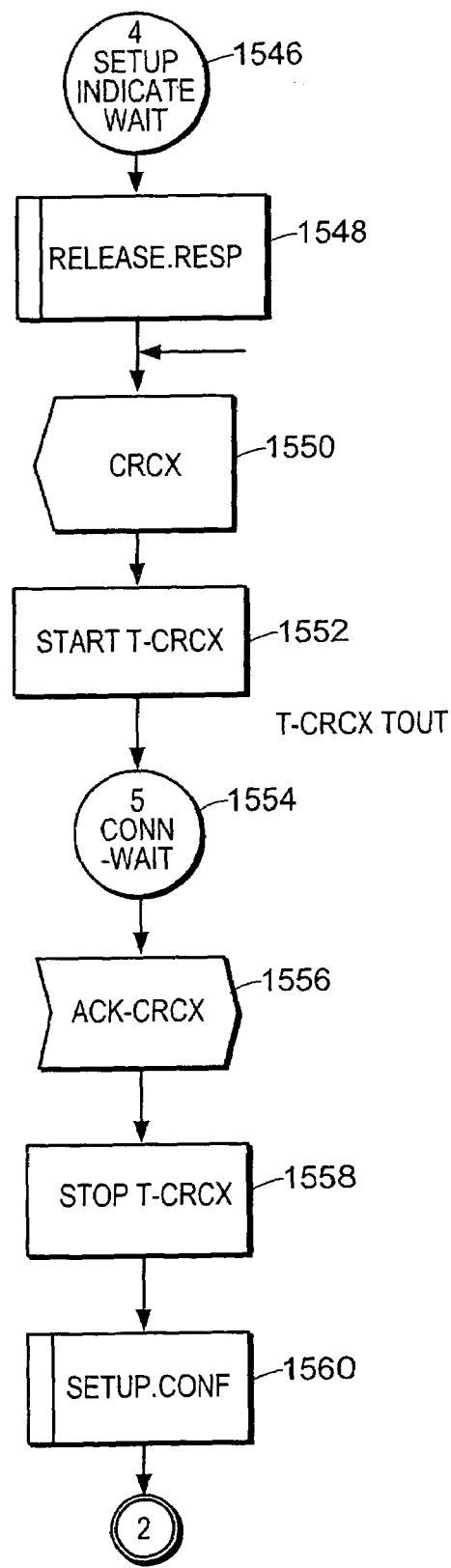
FIG. 27B                    FIG. 27C

VIRTUAL LOOP CARRIER SYSTEM WITH GATEWAY PROTOCOL MEDIATION

RELATED APPLICATIONS

This application is a continuation of U.S. application Ser. No. 09/724,270, filed on Nov. 28, 2000 now U.S. Pat. No. 6,563,816, which is a continuation of U.S. application Ser. No. 09/441,587, filed on Nov. 17, 1999 now U.S. Pat. No. 6,731,627, which claims the benefit of U.S. Provisional Application No. 60/108,924, filed Nov. 17, 1998, and U.S. Provisional Application No. 60/130,170, filed Apr. 20, 1999, the entire teachings of which are incorporated herein by reference.

BACKGROUND OF THE INVENTION

The public switched telephone network (PSTN) based on circuit switching technology has served well for the past several decades in making a broad range of telephony services possible for consumers and businesses. However, its infrastructure is fraught with cost inefficiencies, inflexible service creation and delivery platforms, and manually-intensive, error-prone operations, administration and maintenance (OA&M) applications and processes. All of these aspects combine to keep prices artificially high and make service creation and delivery intervals unduly long from an end-user perspective. In contrast, the broadband networking platforms that are being deployed for data services are optimized for high efficiencies and fast service creation due to the speed at which the market is driving the growth of new services. Given the large-scale investments in broadband network technologies being undertaken by the service providers to meet the explosive growth in demand, planning is underway to migrate voice services from the legacy circuit-switched environment to the newer broadband networking environment to take advantage of economies of scale. However, this migration needs to be carefully planned so it does not create a significant discontinuity in the features, services, and overall quality that customers have come to expect from the well-established circuit-switched network.

In the past, the typical home had a single telephone line for all the residents to share. Today, there has been a dramatic increase in the need for communication services in the home driven by such factors as telecommuting, home offices, residential facsimile machines and computer networking including Internet access.

In the traditional PSTN environment, each telephone circuit, called a "loop", requires a separate wire pair from the access service provider's facilities to the subscriber's location. This places practical limits on the number of circuits that may be available at each subscriber location, especially for residential subscribers. The access service provider generally does not have sufficient capacity in the loop facilities to provide multiple telephone lines to every subscriber.

Furthermore, most homes have been wired for one or at most two telephone lines. Adding a new telephone line beyond this usually requires adding new wiring in the home. This home wiring limit acts as a barrier to residential users who may want additional telephone lines and to service providers who would like to gain additional revenues from providing new communication services.

SUMMARY OF THE INVENTION

It is desirable to provide a migration strategy that uses the broadband network for multiplexing efficiencies (which leads to significantly lower unit costs) and logical provisioning benefits (which leads to significant reduction in service turn-up times) while continuing to leverage the PSTN's switching and service control engines (Class 4/5 switches, SCPs, etc.) for providing value-added services. This low-risk migration can be achieved by using a gateway between the broadband network and the PSTN.

It is desirable to provide a capability that could enable greater communication services in the home without adding wiring in the home or to the service provider's facilities.

The present invention provides a gateway between the broadband network and the PSTN while also providing distribution of multiple voice lines over a home local area network.

In accordance with the present invention, a loop carrier system includes a home local area network having plural telephone modules and a hub coupled to a communications medium. The communications medium in a preferred embodiment comprises in-home telephone wiring, though other communications media are possible, including wireless. The telephone modules and the hub communicate digitized voice signals over the in-home wiring in a dedicated frequency band located above the traditional baseband services, e.g., plain old telephone service (POTS). The hub converts between voice signals and voice packets and is connected to a network access device for transferring the voice packets from the home local area network to a telecommunications network which routes the voice packets to a gateway. The gateway converts between the voice packets and a circuit format compatible with a local digital voice switch. The voice packets can be any packet format such as ATM cells (e.g., ATM Adaptation Layer versions AAL1, AAL2, AAL5) or IP packets. The network access device can be, for example, an xDSL device, a cable modem or wireless access device.

According to an aspect of an embodiment of the system, the hub includes a data interface circuit for converting between data signals and data packets and a packet multiplexer for multiplexing data packets with voice and signaling packets for transfer between the hub and the gateway.

In an embodiment, the gateway comprises an ATM switch and a call processing adjunct which controls the conversion between voice packets and the circuit format at the ATM switch. The call processing adjunct communicates with the hub and with the local digital switch using signaling protocols (e.g., Media Gateway Control Protocol and GR-303, respectively) for controlling call processing in the loop carrier system.

According to an aspect of the invention, a network element includes a Common Object Request Broker Architecture (CORBA)-based server, CORBA-based managed objects accessible by the CORBA-based server and a CORBA-based applications programming interface (API). The CORBA-based API is coupled to an external operations support system which can manage the plural CORBA-based managed objects directly.

According to an aspect of the home local area network, a communication protocol is used between the hub and the telephone modules in which the voice signals are transmitted within frames of digital bits from the hub to the modules in the downstream direction and from the modules to the hub in the upstream direction using time division duplex transmission. The downstream and upstream frames include communication timeslots assigned to individual modules for communication between the modules and the hub. The timeslots are assigned such that no two modules have the same timeslot, thereby avoiding collision on the in-home wiring.

According to another aspect of the home local area network, the digital bits are transmitted using a raised cosine pulse signal modulated by a carrier signal at the center of the dedicated frequency band.

In accordance with the invention, a telephone module for communicating between a local hub and a telephone set over telephone wiring includes a digitizer for converting analog voice signals from the telephone set to digital signals at a baseband frequency and a modulator for modulating a carrier signal with the digital signals for transmission in a dedicated frequency band above baseband over the telephone wiring to the local hub.

According to another aspect of the home local area network, a timing recovery mechanism in the absence of a clock that is traceable to the Primary Reference Clock on the public network is robust to clock drift, cell delay variation and cell impairments.

According to another aspect of the invention, a method of configuring a selected ATM endpoint connected to a server across an ATM network for Internet Protocol (IP) over ATM communications comprises transmitting an unsolicited message from the server to the selected ATM endpoint. The message is send at a first transmission interval over an associated virtual circuit and includes a server IP address and an ATM endpoint IP address. At the ATM endpoint, the unsolicited message is received, the server IP address and the ATM endpoint IP address are extracted from the unsolicited message, and an SNMP TRAP message is sent to the server.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 27A–27C are state machine diagrams for a home LAN hub signaling task at the call processing adjunct of FIG. 24.

DETAILED DESCRIPTION OF THE INVENTION

1.0 Virtual Loop Carrier System Overview

Figure 1:
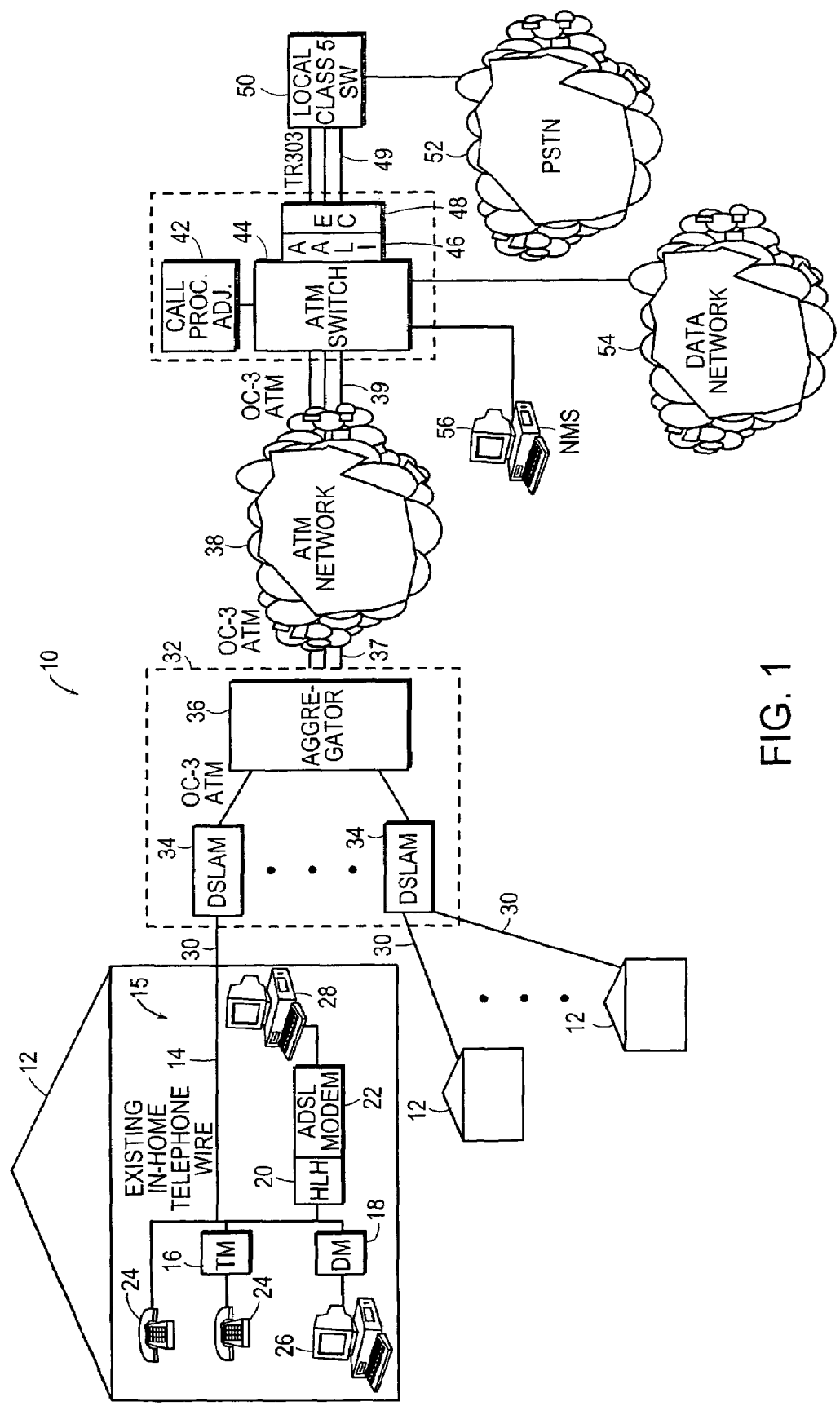
FIG. 1 is a block diagram of an embodiment of a virtual loop carrier system in accordance with the invention.

FIG. 1 is a block diagram that shows the main elements of an embodiment of an exemplary virtual loop carrier system 10 which provides access to voice and data services in accordance with the present invention. The system 10 comprises a number of local area networks (LANs) 15 at homes 12; an access gateway 32 which aggregates voice and data from the home LANs 15 for transport over an ATM network 38; and a virtual loop gateway (VLG) 40 which connects the voice and data between the ATM network 38 and a local digital switch (LDS) 50 or data network 54.

The home LAN 15 includes telephone modules (TMs) 16 and data modules (DMs) 18 connected to a home LAN hub (HLH) 20 over existing in-home telephone wiring 14. For a telephone call, the TM 16 converts analog voice signals from a connected telephone 24 to digital signals in the form of pulse code modulation (PCM) samples. The TMs 16 transmit and receive PCM samples to and from the HLH 20 using a physical layer/media access control layer protocol described further herein. The HLH 20 converts the PCM samples along with channel associated signaling (CAS) into an ATM cell format optimized for transport of voice. The embodiment described herein uses an ATM cell format known as ATM Adaptation Layer 1 (AAL1). Other signaling and management information and data is formatted by the HLH 20 according to ATM Adaptation Layer 5 (AAL5). It should be noted that the PCM voice samples can alternatively be formatted according to AAL2 or AAL5.

The AAL1 and AAL5 formatted cells are transmitted to the access gateway 32 over a local copper loop 30 using an asynchronous digital subscriber line (ADSL) modem 22. It should be noted that in alternate embodiments described further herein, the local loop 30 can be a cable television transmission facility, the ADSL modem 22 can be a cable modem and the voice samples can be converted to Internet Protocol (IP) packets rather than ATM cells. The ADSL modem 22 can also be an xDSL device or a wireless access device.

The access gateway 32 includes digital subscriber line access multiplexers (DSLAMs) 34 which terminate the ADSL connections 30 and an ATM aggregator 36 which aggregates the AAL1 and AAL5 cells received from the HLHs 20 for transport over the ATM network 38 to the virtual loop gateway 40 through SONET based transmission facilities 39. The DSLAM 34 and ATM aggregator 36 can be conventional networking equipment such as Cisco Systems equipment numbers 6100/6200 and 6400, respectively.

At the virtual loop gateway 40, the AAL1 and AAL5 cells are converted to a standard format known as GR-303 that is compatible with standard loop carrier interfaces 49 on the LDS 50. The GR-303 standard (formerly known as TR-303) is a Bellcore-defined interface between a local digital switch (LDS) and systems that provide network access to local loop telephone subscribers. In particular, the AAL1 cells are routed through ATM switch 44 and converted by AAL1 module 46 to PCM samples for insertion into DS0s of the GR-303 interfaces 49. In addition, the AAL5 cells are routed to a call processing adjunct (CPA) 42 which converts these particular cells to GR-303 call processing messages. These conversions enable subscribers at homes 12 to access well-known services and custom calling features offered by the LDS 50 in a transparent manner, thereby obviating the need for access service providers to develop and deploy their own software and services.

It should be apparent that while the foregoing overview has described the handling of voice and data transport from the home LAN 15 towards the LDS 50, i.e., in the "upstream" direction, the system 10 also provides voice and data transport from the LDS 50 towards the home LAN 15 in the "downstream" direction in a similar manner.

The system components, including the home LAN 15 and the VLG 40, are now described in more detail.

2.0 Home LAN

The home LAN 15 includes telephone modules 16 and data modules 18 connected to a home LAN hub 20 over the existing in-home telephone wiring 14. The home LAN 15 is shown in more detail in the functional block diagram of FIG. 2. In a particular embodiment, the home LAN 15 accommodates up to four telephone modules 16A–16D and one or more data modules 18.

The HLH 20 connects to the home wiring 14 to transmit and receive voice and data. As described further herein, voice signals associated with the TMs 16A–16D are carried on the home wiring 14 according to a physical (PHY) layer/media access control (MAC) layer protocol that is terminated in a PHY/MAC block 56. The PHY/MAC block 56 provides PCM voice samples and signaling in the upstream direction using time division multiple access from the TMs to a multi-service chip (MSC) device 64 which includes an ATM adaptation layer circuit 64A that is configured to convert the PCM samples to AAL1 cells and the signaling to AAL5 cells. These AAL1 and AAL5 cells are multiplexed via an ATM multiplexer 64B which in this embodiment is part of the MSC device 64.

Data signals associated with the DMs 18 are carried separately over the home wiring 14 using a known protocol such as the Home Phoneline Networking Alliance (HomePNA) specification. These data signals are applied to a data module 58 which includes a data interface 60 for converting the HomePNA data signals to Ethernet frames. An Ethernet hub 62 coupled to the data interface 60 connects these Ethernet frames to a SAR/AAL5 device 68 which provides segmentation and reassembly to AAL5 cells for inclusion in the multiplex signal 65 provided by the ATM multiplexer 64B. The Ethernet hub 62 also terminates an Ethernet connection to a local data terminal 66. The multiplex signal 65 provided by the ATM multiplexer 64B is applied to the ADSL modem 22 which connects to the access gateway 32 (FIG. 1) over the local loop 30. Downstream ATM signals are received from the access gateway 32 through the ADSL modem 22 and demultiplexed by ATM multiplexer 64B to AAL1 and AAL5 cells. These received downstream AAL1 and AAL5 cells are converted to PCM voice samples and signaling by ATM adaptation layer circuit 64A for transport on the home wiring 14 via PHY/MAC block 56.

2.1 Components

2.1.1 Home LAN Hub

The HLH 20, as shown in FIG. 1, provides a gateway function for communication between devices on the home LAN 15 and the wide area network (WAN) that includes the access gateway 32, ATM network 38, the virtual loop gateway 40, the LDS 50 and other networks including the PSTN 52 and data networks 54. The HLH 20 has been described above with reference to the functional block diagram of FIG. 2. An embodiment of a home LAN hub is shown in FIG. 3A. The HLH 20A includes an analog front end (AFE) 70 which connects to the home wiring 14 (FIG. 1) on line 71 for transmitting and receiving voice signals according to the home LAN physical (PHY) layer that is described further herein. An HLH controller 82, which can be implemented as a field programmable gate array (FPGA), is connected to the AFE 70 and provides an interface to the home LAN MAC layer also described further herein.

The MSC 64, which can be an Ericsson device number PBM-990-08-1, provides the AAL1/AAL5 and ATM multiplexing functions described above with reference to FIG. 2. In particular, the MSC 64 provides conversion between AAL1 cells and PCM voice samples and aggregates ATM-25 data from an external PC 66A, Ethernet data from Ethernet to ATM adaptation block 62', and PCM voice from the HLH controller FPGA 82 in the upstream (i.e., to the network) direction. The MSC 64 accesses an external RAM 80. The HLH controller FPGA 82 throttles the total upstream traffic to the maximum upstream data rate of the ADSL modem 22. This allows the MSC 64 to give higher priority to the time-critical voice traffic through a quality-of-service buffer therein. The HLH controller FPGA 82 also adapts the internal clocking of PCM data in the HLH 20A to track the rate of data received from the network over the ATM-25 PHY interface 84.

The HLH 20A includes a power feed 86 which converts AC power to the internal voltages required by the HLH and to provide power to the telephone modules 16 (FIG. 1) through a second line 87 in the two-pair wiring arrangement typical of most homes. Note that the first line 71 in the two-pair wiring arrangement is used for voice and data according to the PHY/MAC layer protocol aspect of the present system.

The HLH 20A further includes a CPU 74 with synchronous DRAM 78, SRAM 83, flash memory 76, RS-232 interface 75 and clock generator 79. The CPU 74 configures and monitors the HLH 20A.

As noted above, the MSC 64 provides circuit emulation with channel associated signaling (CAS). The following describes an improvement which allows the MSC chip to support CAS for T1 type circuits.

A standard E1 multiframe comprises 16 consecutive frames numbered from 0 to 15 with a multiframe repetition rate of 500 Hz. The frame includes 32 channel timeslots numbered from 0 to 31 with a frame repetition rate of 8 KHz. Each channel timeslot is composed of 8 bits numbered 1 to 8. A multiframe alignment signal comprising the value 0000 occupies bit positions 1 to 4 of channel timeslot 16 in frame 0.

For channel associated signaling in the E1 interface, channel timeslot 16 in frames 1 to 15 is assigned for CAS (i.e., ABCD bit allocation) as follows:

Channel timeslot 16 in frame 1—ABCD (for channel 1), ABCD (for channel 16)

Channel timeslot 16 in frame 2—ABCD (for channel 2), ABCD (for channel 17)

and so on down to:

Channel timeslot 16 in frame 15—ABCD (for channel 15), ABCD (for channel 30)

In a PCM mode of operation of the MSC 64, a frame sync signal PCM_FS and four data valid signals along with clock and data signals are used to suit different types of codec circuits. The frame sync signal is used to identify frame boundaries. To identify multiframe boundaries and to support CAS signaling in structured circuit emulation, a multiframe sync signal PCM_MFS is included. The timing transitions on PCM_MFS and PCM_FS are made the same. The repetition period of the PCM_MFS signal is 2 ms. The PCM_MFS signal indicates the start of the 2 ms multiframe and points out the first channel timeslot in the first frame. The CAS signaling bits can be located within the multiframe boundaries as follows:

ABCD bits for channel 1 are sampled during channel timeslot 16 in frame 1;

ABCD bits for channel 2 are sampled during channel timeslot 16 in frame 2;

ABCD bits for channel 3 are sampled during channel timeslot 16 in frame 3;

ABCD bits for channel 4 are sampled during channel timeslot 16 in frame 4; etc.

Note that the A signaling bits for channels 1 to 4 occupy bit position 1 (MSB) of each corresponding channel timeslot 16.

Cell coding for T1 is now described in relation to CAS. In AAL1 CAS mode, the payload part of the structure is one multiframe in length. For 64 kbps T1 with extended superframe (ESF) framing, this portion of the AAL1 structure is 24 bytes in length. In an E1 PCM interface, the payload portion in one multiframe is 16 bytes in length. Therefore, a mapping mechanism is needed when providing circuit emulation in the MSC. In particular, a cell encoding from PCM to AAL1 is as follows. 16 bytes from E1 multiframe 1 and 8 bytes from E1 multiframe 2 are collected to form AAL1 payload block 1. AAL1 payload block 2 is formed by collecting the remaining bytes from E1 multiframe 2 and 16 bytes from E1 multiframe 3. The succeeding payload blocks are formed in the same manner. A problem is that two different ABCD signaling bits can be extracted from multiframe 1 and multiframe 2 while collecting bytes from two different multiframes. To avoid this problem, the previous signaling status can be selected at the price of 2 ms signaling transition delay.

A cell decoding from AAL1 to PCM is as follows. 24 bytes from AAL1 payload block 1 are divided into 16 bytes and 8 bytes. The first 16 bytes are used for E1 multiframe 1. The remaining 8 bytes and 8 bytes from AAL1 payload block 2 are used for E1 multiframe 2. The remaining 16 bytes from AAL1 payload block 2 are used for E1 multiframe 3. The signaling bits from AAL1 payload block 1 are used for E1 multiframes 1 and 2. The signaling bits from AAL1 payload block 2 are used for E1 multiframe 3. This results in the same 2 ms signaling transition delay.

The MSC 64 is provided with a PCM multiframe which is converted into AAL1 blocks as shown in the following table:

| T1 Superframe | | | PCM Multiframe | | | AAL1 Block | | |
|---|---|---|---|---|---|---|---|---|
| No. | Data Octets | Sign Bits | No. | Data Octets | Sign Bits | No. | Data Octets | Sign Bits |
| M | T1 (1–24) | S1 | N | T1 (1–16) | S1' | M | T1 (1–16) & T1 (17–24) | S1" |
|  |  |  | N + 1 | T1 (17–24) & T2 (1–8) | S2' |  |  |  |
| M + 1 | T2 (1–24) | S2 | N + 2 | T2 (9–24) | S3' | M + 1 | T2 (1–8) & T2 (9–24) | S2" |

An important consideration is the relationship between the signaling bytes {S1, S2}, {S1', S2',S3'} and {S1", S2"}. It is preferable that S1"=S1 and S2"=S2 under all circumstances.

Even if the relative alignment between the PCM Multiframes and the AAL1 blocks changes, it is still preferable to carry all of the signaling bytes correctly (e.g., alignment can change if N+1, N+2 and N+3 multiframes are mapped into M and M+1).

The simplest way to achieve this is by mapping S1 into S1', S2 into S2' and entering an invalid ABCD code into S3' (for example, invalid code 1010). In the MCS, mapping the signaling bytes from the PCM multiframe into AAL1 blocks requires that only the legal ABCD code words be inserted into the AAL1 blocks and that the invalid 1010 code be deleted. In other words, the MSC looks at the incoming signaling bytes and ignores all ABCD codes with the code 1010.

When mapping the T1 superframe into PCM multiframe, every third signaling byte inserted is invalid and the MSC strips this off, thereby always transporting all the legal signaling bytes.

In the reverse direction, when the MCS generates the PCM multiframe from the received AAL1 blocks, the MSC inserts the illegal code 1010 as the extra signaling byte which is stripped off to generate the T1 superframe from the PCM multiframe.

The VLC system 10 uses AAL1 to deliver voice services. Voice over AAL1 is a constant bit rate (CBR) service that implies that, in an ideal network, cells arrive at the receiver at a constant pre-determined rate. The receiver must lock on to this constant rate and stay synchronized to this network clock rate. In a real network, any clock synchronization algorithm on the receiver has to contend with cell delay variation (CDV), clock drift and cell impairments caused by delays or congestion through the network. As a result of these problems, the cell arrival rate at the receiver is no longer constant (cells may even be dropped) leading to an unacceptable drop in voice quality. A network clock synchronization algorithm and implementation that is robust in the face of CDV, clock drift and cell impairments is now described.

The basic clock drift problem is first described. The ADSL modem 22 that sources the ATM stream entering the HLH 20 has no clock available that is traceable to the Primary Reference Clock on the network. The main clock oscillator on the HLH has a frequency of 32.768 MHz and a tolerance of 100 ppm. Over a period of time, any local reference clock generated from this clock will drift with respect to the network clock, causing ATM cell buffers to overflow or underflow. The only source of network timing information on the HLH 20 is from the arrival of ATM cells containing AAL1 Circuit Emulation (CE) data. Therefore, it is necessary to devise a mechanism to infer network timing from the arrival of AAL1 cells containing voice samples, in the presence of both CDV and cell impairments.

In order to provide such a network timing mechanism, several assumptions are made regarding the delivery of ATM cells from the access gateway 32 and ATM network 38 (FIG. 1). In particular, it is assumed that quality of service (QoS) is available at the DSLAM 34, that CES uses the structured data transfer (SDT) method with channel associated signaling (CAS) to transfer voice on AAL1 and that there is no padding of AAL1 ATM cells.

In the downstream direction (i.e. from the network), ATM cells from the ADSL modem 22 are received through the ATM-25 PHY 84 into the HLH controller 82 and then into the MSC 64. The MSC 64 requires a stable 8 KHz clock derived from the network clock. Clock synchronization is provided in the HLH controller 82 as described further herein.

The nominal rate of arrival of cells at the HLH 20 is first calculated. The SDT method uses two formats for transmitting AAL1 user data. In the first format (referred to as P format), there are 2 bytes of SAR overhead and 46 bytes of user data per cell. The first byte of overhead is a SAR header, consisting of a Sequence Number (SN) field, CS Layer indicator and a Sequence Number Protection (SNP) field. The second byte of overhead is a pointer. The second format (non-P format) includes the SAR header, followed by 47 bytes of user data per cell. A sequence of 8 ATM cells will contain one P format cell and seven non-P format cells. The AAL1 user data consists of superframes, each containing 24 bytes of TDM (voice) data belonging to one voice channel and one byte of CAS information.

From the foregoing, the following calculations can be made. In a sequence of 8 cells, there are 46 bytes (P format)+47*7 bytes (non-P format)=375 bytes of user data. Since there are 25 bytes per superframe, there are 375/25 =15 superframes in a sequence of 8 cells. Hence, the number of TDM bytes in 8 cells is 15*24=360. Since each TDM byte represents 125 us, the 8 cell sequence should arrive in 360 bytes*125 us/byte=45 ms, and the average time per ATM cell for each voice channel is 45 msec/8 cells=5.625 ms/cell.

The actual rate of cell arrival at the HLH 20 is different from the average cell rate calculated above due to CDV and cell impairments. Next, the maximum CDV is calculated.

A measure of CDV at the HLH 20 can be determined by considering the following. In an embodiment in which the HLH 20 supports four independent voice calls, an ATM cell from one call can be queued behind one cell each from the three other calls, together with an additional cell of data, for a total of four cell delays. With a nominal link rate of 384 Kbits/sec between the DSLAM 34 and the ADSL modem 22, the delay for four cells is given as (53 bytes/cell*8 bits/byte*4 cells)/(384 Kbits/sec)=4.417 msec (also referred to as a cell delay of 4.417/5.625=0.7852 cells). Hence, ATM cells at the input to the HLH controller 82 experience CDV between 0 and a maximum of 4.417 ms. This CDV can be positive or negative with respect to the previous received cell, but its total cumulative value cannot exceed the value 4.417 ms. The external SRAM 83 is used for the purpose of cell buffering to smooth out the random variations in the cell arrival rate.

The clock adjustment method described herein tracks the arrival of ATM cells from a virtual circuit (VC) carrying CES data and compares it against the rate of data being transferred to the TDM output (via the MSC 64, FIG. 3). As the local clock drifts with respect to the network clock, the fullness of the cell buffers in the SRAM 83 (or alternatively the fullness of a virtual buffer maintained in the HLH controller 82), either exceeds or falls below a nominal value, and can be used either to speed up or slow down the 8 KHz reference clock input to the MSC 64. Note that selecting the nominal buffer fullness is a tradeoff between the delay that can be tolerated and the susceptibility to buffer overflow/ underflow due to CDV and reference clock drift.

The 8 KHz reference clock is generated by dividing the nominal oscillator clock (32.768 MHz) by 4096. The oscillator has a tolerance of 100 ppm or 3276.8 Hz, so the actual frequency is between 32.7647 MHz and 32.7713 MHz. Dividing these frequencies by 4096 gives a reference clock between 7999.2 Hz and 8000.8 Hz, causing a drift between this clock and the network clock. To adjust this clock, first note that simply dividing by 4095 or 4097 to speed up or slow down the clock, respectively, is to be avoided since abrupt changes in reference frequency adversely affects voice quality. So, a half-cycle clock stretch is used to get the proper clock adjustment.

For example, if the oscillator 79 is running at the lower tolerance value of 32.7647 MHz then starting with the nominal divisor of 4096, provides a reference clock of 7999.2 Hz and a buffer fill rate of (8000−7999.2)=0.8 bytes/sec. Over time, the buffer fills causing cells to be dropped. When the buffer fullness exceeds a high threshold, the divisor is changed to 4095. In addition, the high portion of the reference clock is stretched by half a cycle of the oscillator clock. In this example, the oscillator clock halfcycle is 15.2603 ns. Hence the reference clock period is 30.52063 ns*4095+15.2603 ns=124.99724 us, and the reference frequency is 8000.18 Hz. At this frequency, the buffer empties at the rate of 0.18 bytes/sec, eventually causing the nominal buffer fullness threshold to be reached. When the actual fullness is less than the nominal fullness, a change is triggered to a divisor of 4096 with no clock stretch and the reference clock returns to the original reference frequency (7999.2 Hz). In the case that the oscillator is operating at the higher tolerance value, the procedure is similar, except that only the half cycle clock stretch is needed and not a change in the divisor. In this case, the buffer fullness varies between the nominal value and a low threshold, while the reference frequency changes from 8000.8 Hz to 7999.8 Hz.

Thus, the same buffer used to smooth out CDV is also used to adjust the local reference clock to the network clock such that there is no cell overflow or underflow.

As noted above, selection of buffer thresholds is a tradeoff between cell delay and probability of overflow/underflow. The clock adjustment algorithm described herein above calls for three buffer thresholds: a nominal threshold, a low threshold and a high threshold. These thresholds are calculated next.

The nominal threshold is set to be two cells based on the delay that can be tolerated on the voice samples (11.25 ms).

Figure 3A:
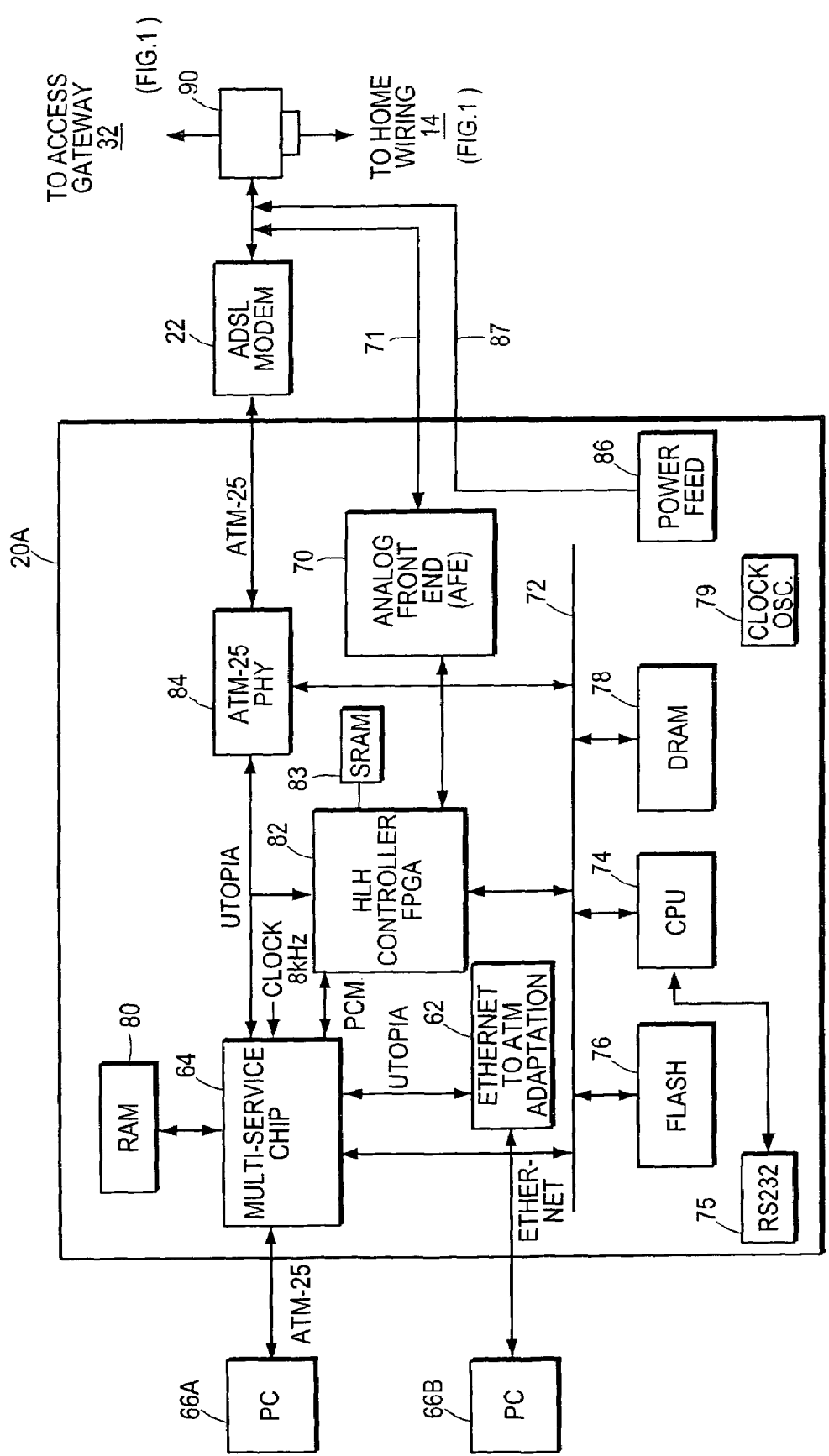
FIG. 3A is a block diagram of an embodiment of a home LAN hub for use in the system of FIG. 1.
Figure 3B:
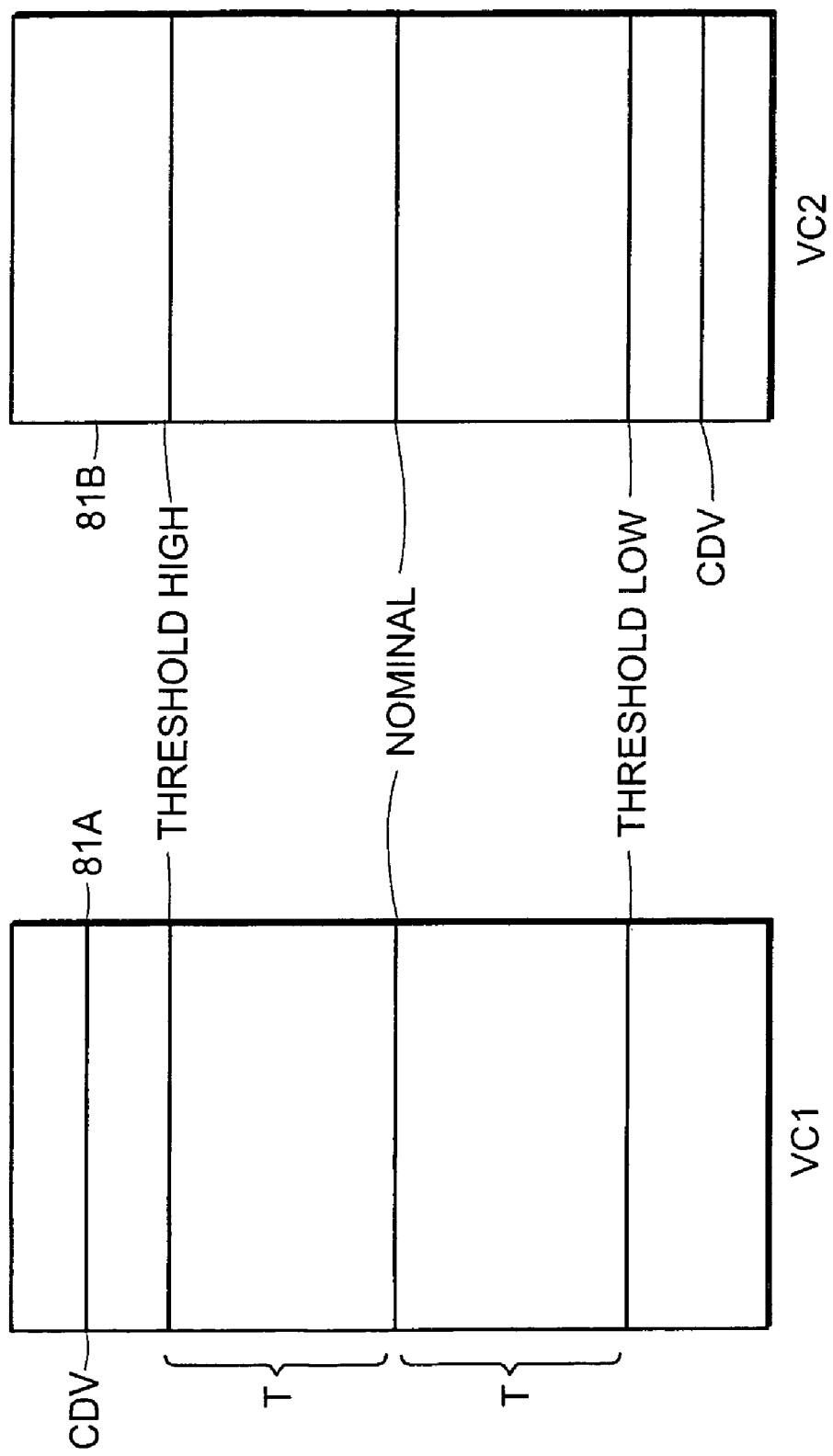
FIG. 3B is a block diagram showing buffer fullness thresholds used in a timing recovery mechanism in the home LAN hub.

Assume that the high and low thresholds are symmetric about the nominal with a difference of T from the nominal, NOM. If two VCs (VC1 and VC2) are active, the maximum difference in the buffer thresholds of the VCs is 2*MaxCdv+ T, where MaxCdv denotes the maximum cell delay variation. This is true because CDV is independent for the two VCs (i.e. VC1 can experience a positive CDV of MaxCdv and VC2 can experience a negative CDV of MaxCdv). Additionally, the fullness can differ by up to T based on when VC2 became active in relation to VC1. Thus VC1 can have a buffer fullness of NOM+T+MaxCdv while VC2 can have a fullness of NOM−MaxCdv. Assuming that clock adaptation is enabled for VC1, the clock will be speeded up, causing buffers for both VC1 and VC2 to drain down. This will continue until VC1's buffer drains down below NOM (a change of T+MaxCdv), at which time the clock is set back to nominal. VC2's buffer drains down by the same amount and hence is at the level NOM−MaxCdv−(T+MaxCdv). To avoid underflow, this quantity must be greater than 0. Solving this inequality with NOM set to 2 cells and MaxCdv to 0.7852 cells (4.417/5.625), yields T<0.4295 cells (53 bytes/cell*0.4295 cells=19.328 bytes). Setting T to 16 bytes satisfies this requirement. Thus, the nominal threshold is two cells and the high and low thresholds are set, respectively, to +16 bytes and −16 bytes from the nominal. The thresholds for buffers 81A, 81B for VC1, VC2, respectively are shown in FIG. 3B.

It was calculated earlier that with zero CDV, a voice channel should receive 360 bytes of TDM data every eight ATM cells. Therefore, a natural place to check for buffer fullness is at an eight-cell boundary (or a multiple of it). However, the effect of a CDV of 4.42 ms is to change the actual fullness by about +/−0.7852 cells. If CDV is not accounted for, there will be many rapid and unnecessary clock adjustments. The effect of CDV is averaged out over a large number of cells, but at any one point, the fullness can be off by up to +/−0.7852 cells. Averaging is necessary to nullify the effect of CDV. One way to perform averaging is to check the buffer fullness multiple times, and make a clock adjustment only if the fullness is above or below threshold for all of the checks.

An embodiment of the algorithm requires the fullness to be above or below the threshold for 16 consecutive cells before clock adjustment is initiated and sets the nominal buffer threshold (NOM) to two cells and the upper and lower thresholds (T) to be +16 bytes and −16 bytes respectively from nominal. The algorithm starts with the nominal clock rate (no clock stretch and divisor equal to 4096). As long as (NOM−16)<=buffer fullness<=(NOM+16), the clock remains at the nominal rate. When buffer fullness exceeds NOM+16 for sixteen consecutive cell arrivals, the fast clock is chosen (clock stretch and divisor equal to 4095). The clock rate remains fast until the buffer fullness is less than NOM for sixteen consecutive cell arrivals. At this point, the clock rate switches to nominal. Similarly, if the buffer fullness <NOM−16 for sixteen consecutive cell arrivals, the slow clock is chosen (clock stretch and divisor equal to 4096). The clock rate remains slow until buffer fullness exceeds NOM for sixteen consecutive clock cycles, at which point the clock rate switches back to nominal.

Figure 3C:
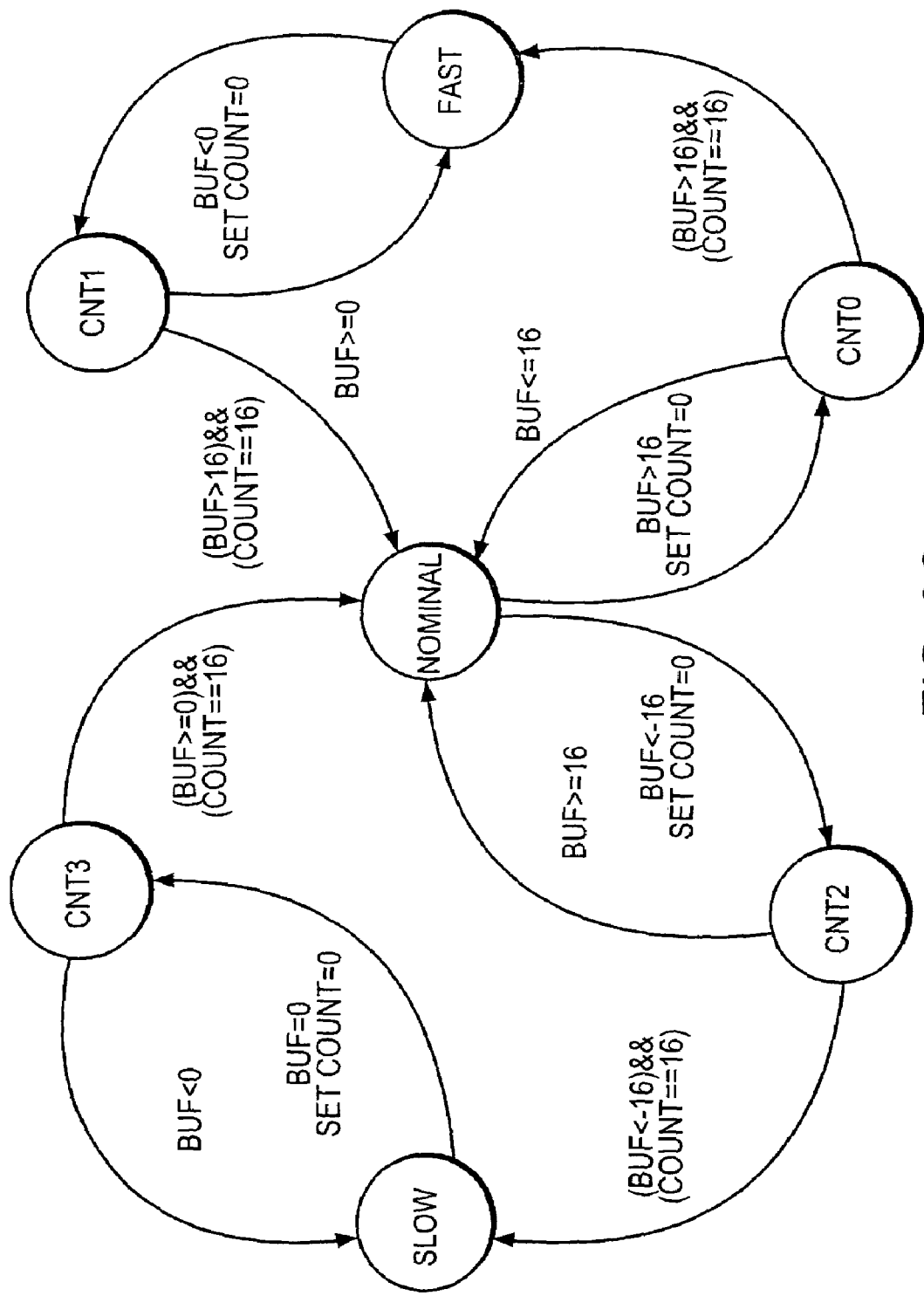
FIG. 3C is a state diagram illustrating adaptive clock recovery for the timing recovery mechanism in the home LAN hub.

Referring now to FIG. 3C, an adaptive clock recovery state diagram is shown. In the state diagram, "buf" is the buffer fullness relative to NOM (i.e., if buf is zero, the fullness is NOM). The variable "count" refers to the count of incoming ATM cells. The states include Nominal, Slow, Fast, and count states CNT0, CNT1, CNT2, CNT3.

In an embodiment, the HLH 20 can handle four simultaneous voice calls, implying that the ATM stream can carry TDM data for four separate VCs. In addition, incoming cells also carry signaling and data cells, which contain no timing information. These cells are not considered for network timing. The cell stream of each VC contains the same network timing information. In the absence of any voice calls, no TDM bytes are available for timing adjustment, and the reference clock is derived from the clock oscillator without adjustment. When multiple voice calls are in progress, one VC must be chosen for performing clock adjustment. Since clock adjustment is needed most for long-lived calls, it makes sense to use the VC corresponding to the first established call for clock adjustment. In an embodiment, fullness information is maintained for all four VCs since the first established call can be terminated at any time. In the event that the call used for clock adjustment is terminated, the algorithm switches the clock adjustment to look at the VC corresponding to the call that was established second. Note that it is not necessary to maintain fullness information for all AAL1 VCs. A single hypothetical buffer can be used for all voice calls provided buffer threshold selection and averaging are done as described herein above and impaired cells are handled as described herein below. In an embodiment, the HLH controller 82 has registers that the CPU 74 can write to identify the four AAL1 VCs. In addition, the CPU also identifies the VC that is currently used for clock adjustment.

Generation of a constant cell stream is now described. Incoming cells to the HLH controller 82 are buffered in the external SRAM 83. The HLH controller 82 partitions the SRAM into FIFO queues that are maintained per VC. It was calculated earlier that an ATM cell must be provided to the MSC 64 and the TMs 16 every 5.625 ms, which translates to 45 clock periods of the adjusted 8 KHz reference clock. Internal to the HLH controller 82, timers clocked by the adjusted reference clock are provided for each AAL1 VC. These timers become operative when the nominal threshold has been reached (i.e., two cells have been received for that AAL1 VC and placed in its queue), generating a timeout signal every 45 clock periods of the reference clock. When the timeout occurs, the HLH controller 82 reads the cell at the head of the queue and outputs it to the MSC 64. Since the adjusted reference clock is used to clock the timers, the rate of cell transfer is synchronized to the network and is constant (to within the +/−1 Hz required to correct the clock drift). Thus, as long as the queues maintained in SRAM 83 do not overflow or underflow due to cell impairments, the MSC 64 and the TMs 16 will receive a constant cell stream synchronized to the network.

The effects of cell impairments and their nullification are now described. ATM cells in a real network are subject to several kinds of impairments such as cell delay greater than the maximum CDV calculated above, cells being dropped and cells becoming corrupted. The timing recovery algorithm described herein above relies on timely arrival of cells with delay less than the maximum CDV. The effect of the impairments described above is an interruption in the constant cell stream, leading to cell underflows. The HLH controller 82 detects cell impairments and missing or corrupted cells, drops the offending cell (the MSC 64 substitutes the voice samples in dropped cells with silence) and modifies the buffer fullness information to maintain bit integrity and to prevent cell underflows. The SAR header of AAL1 cells contains a 3-bit sequence number which increments modulo 8 with each successive cell. The sequence number (SN) field is protected by a 4-bit sequence number protection (SNP) field. Additionally, the ATM layer has a header error check (HEC) byte which protects the ATM header. Thus, out of sequence and corrupted cells can be detected and cell underflow prevented.

An embodiment which implements the timing recovery mechanism is now described. The CPU 74 controls the following timing-recovery related registers in the HLH controller 82:

VP_ID: 12 bits—Identifies the Virtual Path common to all VCs.
VC0_ID: 16 bits: Identifies VC0
VC1_ID: 16 bits: Identifies VC1
VC2_ID: 16 bits: Identifies VC2
VC3_ID: 16 bits: Identifies VC3
VC_SEL: 2-bit pointer: Identifies VC currently used for clock adjustment
VC_ENA[3:0]—Setting a bit enables buffer tracking for the corresponding VC.
CLK_ADJ_ENA: 1 bit —Enables clock adjustment using VC selected by VC_SEL.

The CPU 74 sets up registers on the HLH controller 82 for proper operation. Some registers, such as VC {0–3}_ID and VP_ID, are set up once at the beginning of operation. The VC_SEL, VC_ENA and CLK_ADJ_ENA registers are set by the CPU at the time a voice call is set up or torn down. VC_ENA enables buffer tracking on a per-VC basis. VC_SEL identifies which of the four VCs is selected for clock adaptation and CLK_ADJ_ENA enables clock adaptation.

The HLH controller 82 maintains separate cell buffers in SRAM 83 for the four voice channels and the signaling and data channels. There is an eight-cell buffer for each voice channel, a 512-cell buffer for the signaling channel and a 1024-cell buffer for the data channel. The HLH controller 82 maintains two bits of state information for each of the 8 cells of an AAL1 cell sequence: a cell arrival tag bit and a drop cell indicator (DCI) bit. Initially, both bits are reset for the entire 8-cell sequence. Additionally, three variables related to sequence numbers are maintained per-VC: last received sequence number (lrsno), current sequence number (csno) and transmit sequence number (xsno). When the first cell for a VC is received, its lrsno is set equal to csno and the xsno is set to 0. Note that these three variables vary between 0 and 7 corresponding to the 8 sequence numbers.

When an AAL1 cell arrives at the input of the HLH controller 82, ATM header and AAL1 SAR header error checks are performed. The HLH controller 82 examines the header of the incoming cell. A 3-bit VC-identifier (VC_ID) is internally generated to specify which VC the current cell belongs to (four voice channels, one signaling channel or one data channel). A cell is determined to be a valid voice cell and is written to the tail of the queue (in SRAM 83) corresponding to VC_ID if all the following are true:

(1) it is a non-OAM AAL1 cell whose VPI/VCI field matches the VP_ID and the ID in one of the VC{0–3}_ID registers;
(2) no ATM or AAL1 SAR header error is detected;
(3) the cell has the correct sequence number;
(4) The DCI bit for that cell is reset.

The tag bit for that cell is also set and a start of cell (SOC) indication is provided to the buffer fullness algorithm described below. If one of the above four checks fails, the cell is dropped (i.e. it is not written into the queue), and the tag bit for that cell is reset. A drop cell count for that VC is also incremented. If checks (1) and (2) pass, the DCI bits for all 8 cells in an AAL1 cell sequence are reset.

As described earlier, the four voice VCs are provided with timers which generate timeouts every 45 clock periods of the adjusted reference clock (8 KHz). When a timeout is generated for a VC (identified by VC_ID), the tag bit corresponding to xsno is examined. If the tag bit is set, a cell is read out from the head of the queue in the SRAM and sent to the MSC 64. If the tag bit is not set, no cell is read out, the DCI bit corresponding to xsno is set, and a SOC indication is sent to the buffer fullness logic. The latter action guarantees that in the absence of incoming cells at the HLH controller 82 (due to cell impairments), passage of time is recognized by the buffer fullness algorithm.

The buffer fullness algorithm described earlier is implemented as follows. Each AAL1 VC has a block that is provided with an 8-bit counter and an 8-bit accumulator called Level Register. The Level Register is cleared when VC_ENA for that VC is turned on. It was calculated earlier that on the average each AAL1 cell carries 45 bytes of voice data. When VC_ENA for a particular VC is on, and a SOC indication is received and the VC_ID matches the VC for a block, the counter is pre-loaded with 45. The counter is decremented by the adjusted 8 KHz clock. When the next cell arrives for the VC in question, the counter value is added to the Level Register. When the local clock is exactly synchronized with the network clock, the counter value will be zero at the arrival of every new cell and hence on the average, the Level Register will remain close to zero. If local clock deviates from the network clock, the counter will have a non-zero positive or negative value (a counter underflow resulting in values between hex FF and hex80 is treated as a negative number). The Level Register thus starts to deviate from zero and over time crosses the threshold limit of +/−16 bytes. If the Level Register remains outside the threshold limits for 16 consecutive cell periods for that VC, clock adaptation takes place if the VC_SEL field has been set to this VC and CLK_ADJ_ENA is on. The adaptation follows the state diagram shown in FIG. 3C.

In addition, a priority arbitration scheme with timers can be implemented to read cells out of SRAM 83 to the MSC 64. The four voice channels, the signaling channel and the data channel all have independent timers. The voice channel timers generate a request every forty-five 8 KHz clocks. The setting of the signaling and data channel timers is under microprocessor control. When multiple requests are present, the highest priority request is selected for service. The priority order from highest to lowest is: VC0, VC1, VC2, VC3, SIG, DATA. By selecting the timer values appropriately, it can be guaranteed that no channel is starved of service, mimicking a prioritized round-robin queue.

The foregoing sections have described an AAL1 timing recovery mechanism in the absence of a clock that is traceable to the Primary Reference Clock on the network. The algorithm and implementation described are robust to clock drift, cell delay variation and cell impairments.

2.1.2 Telephone Module

Figure 4:
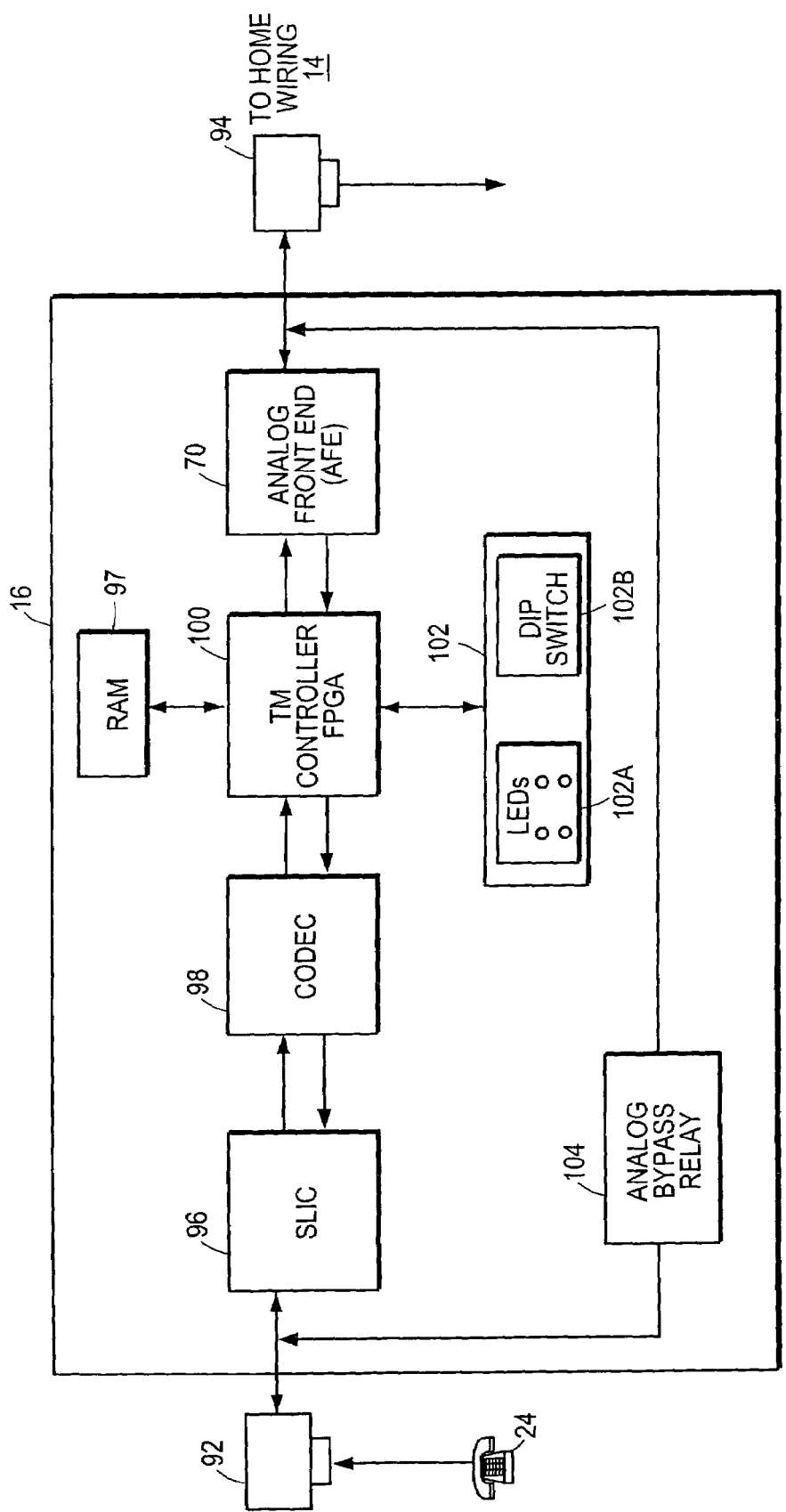
FIG. 4 is a block diagram of an embodiment of a telephone module for use in the system of FIG. 1.

A block diagram of an embodiment of the telephone module (TM) 16 is shown in FIG. 4. The TM 16 connects an analog telephone 24 to the home LAN 15 and includes an analog front end (AFE) 70, TM controller 100, codec 98, memory 97, subscriber line interface circuit (SLIC) 96, line connectors 92, 94, user interface 102 and analog bypass relay 104.

The AFE 70 connects to the home wiring 14 (FIG. 1) for communicating digitized voice, data and signaling information to and from the HLH 20 according to the home LAN physical (PHY) layer that is described further herein. The TM controller 100, which can be implemented as a field programmable gate array (FPGA), connects to the AFE 70 and interfaces to the home LAN MAC layer as a slave device to the HLH 20. The TM controller 100 performs timing recovery on the signal received from the HLH to keep the voice circuits synchronized to HLH clock timing. The codec 98 interfaces to the TM controller 100 using digital time division multiplexed (TDM) data.

The codec 98 and SLIC 96 are standard, off-the-shelf devices which convert between analog voice signals and PCM. In particular, the codec 98 provides analog to digital and digital to analog conversion, and the SLIC 96 provides line interface functions required for standard analog voice services, i.e., POTS.

The bypass relay 104 is provided so that the customer can select the original POTS line for use directly by an analog telephone 24. If power is lost, the relay selects the bypass mode so that lifeline POTS is maintained. The user interface 102 includes LED indicators 102A and a line selection switch (e.g., dip switch or rotary switch) 102B which are described further herein.

2.1.3 Analog Front End

Figure 5:
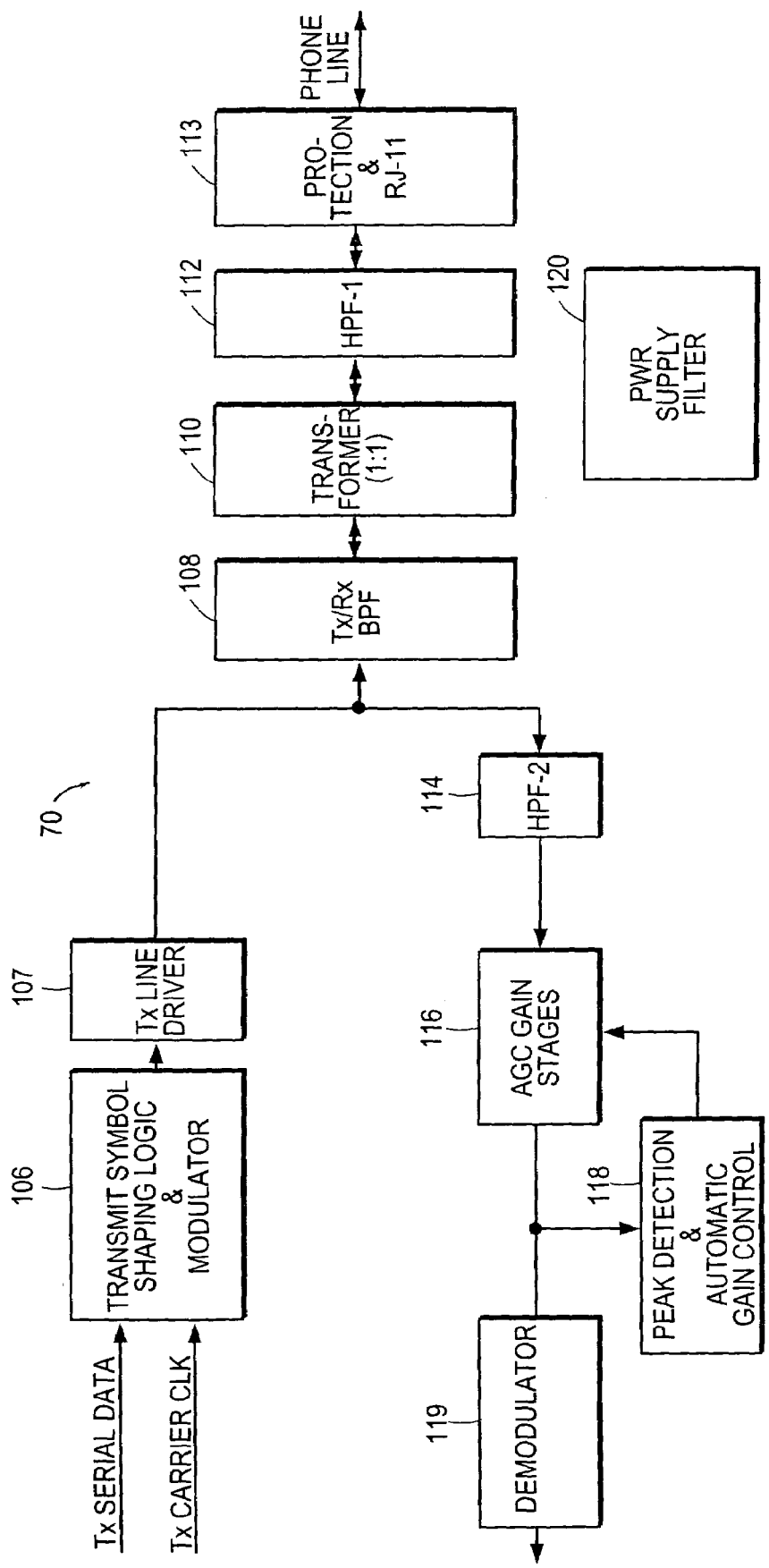
FIG. 5 is a schematic block diagram of analog front end circuitry for use in the home LAN hub of FIG. 3A and the telephone module of FIG. 4.

An embodiment of the AFE 70 is shown in FIG. 5. The AFE 70, common to the HLH 20 (FIGS. 2 and 3A) and the TM 16 (FIG. 4), shifts the frequency range of signals used on the home wiring 14 to a frequency range above that used by analog POTS and ADSL so that the home LAN can use the same wire pair that is used for POTS and ADSL. The AFE 70 includes transmitter, receiver and common sections. The transmitter and receiver operate in a time-division duplex (TDD) fashion. To prevent intersymbol interference (ISI) caused by open termination reflection, a guard space is provided between each modulated symbol as described further herein.

The transmitter section includes a transmit symbol shaping logic/modulator block 106 and a transmitter line driver 107. The receiver section includes a highpass filter HPF-2 114, an automatic gain control (AGC) gain stage 116, an envelope detector/AGC control block 118 and a demodulator 119. The AGC circuitry 116, 118 is described further herein below with reference to FIGS. 7A and 7B. The common section includes line protection and RJ-11 interface 113, a highpass filter HPF-1 112, a transformer 110 and a transmit/receive bandpass filter (BPF) 108. Each of these elements is now described.

Figure 6A:
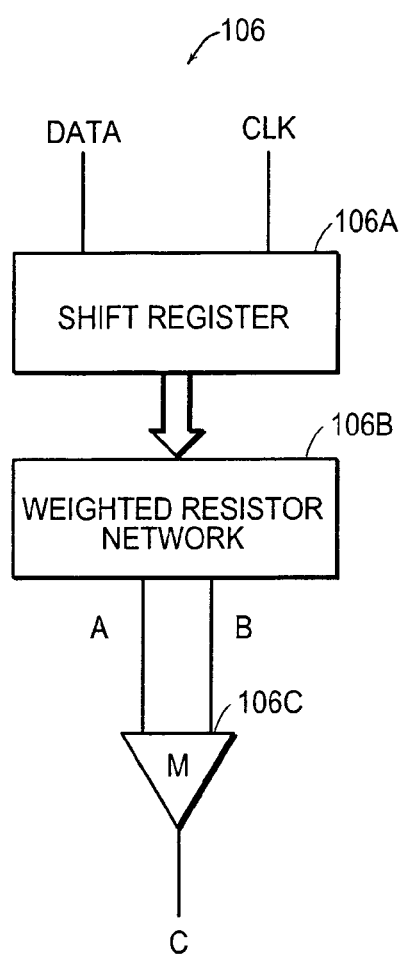
FIG. 6A is a circuit diagram of a transmit symbol shaping logic and modulator circuit for the circuitry of FIG. 5.
Figure 6B:
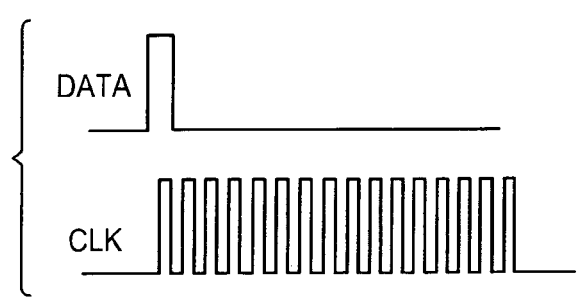
FIG. 6B shows data and clock signal inputs to the circuit of FIG. 6A.
Figure 6C:
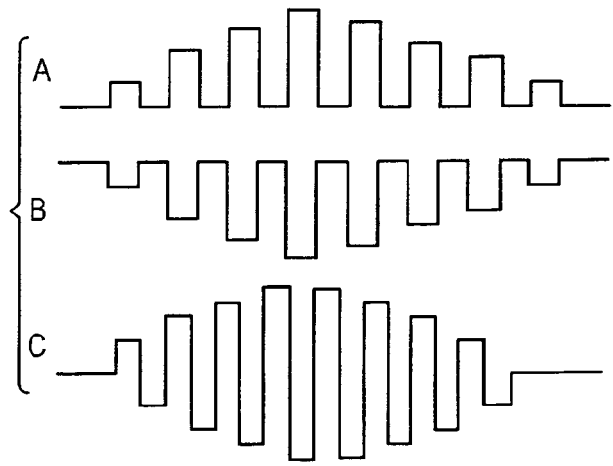
FIG. 6C shows signal outputs of the circuit of FIG. 6A.

The transmit symbol shaping logic and modulator block 106 takes framed data and a 32.768 MHz burst clock pulse from a MAC layer processor, such as HLH controller 82 (FIG. 3A) or TM controller 100 (FIG. 4), to perform symbol shaping in the time domain in accordance with the physical layer characteristics described further herein. To avoid using an expensive digital filter and an analog modulator to shift the baseband data signal to a passband signal for transmission on the home wiring 14, the scheme shown in FIG. 6A is used to achieve accurate pulse shaping and modulation. FIG. 6B shows the framed data signal and clock signal that are input to shift register 106A of FIG. 6A. The output of shift register 106A is coupled to a weighted resistor network 106B to provide shaped signals A and B (FIG. 6C). The shaped signals A and B are summed in summer 106C to provide an output shaped signal C. The pulse shape of signal C is generated only if data is a logic '1', otherwise the signal C remains 0 volts.

Referring again to FIG. 5, the transmitter line driver 107 is a high-speed operational amplifier, which is able to drive a minimum load of 100 ohms. The requirement on slew rate is calculated as follows:

If output peak voltage is +4V for a 16.384 MHz sinusoidal carrier, the time taken to change from 0V to +4V is $t=(1/16.384\text{ MHz})/4=0.01527$ μs and therefore the slew rate is 4V/0.01527 μs=262.1V/μs The Tx line driver delivers the following performance in the 12 MHz to 20 MHz frequency range:
Gain flatness less than 1 dB;
Better than 61 dBc THD if output 8Vp-p at 16 MHz;
Slew rate better than 262.1V/μs;
Nominal output voltage level 8Vp-p across 100 ohm termination.

Figure 8:
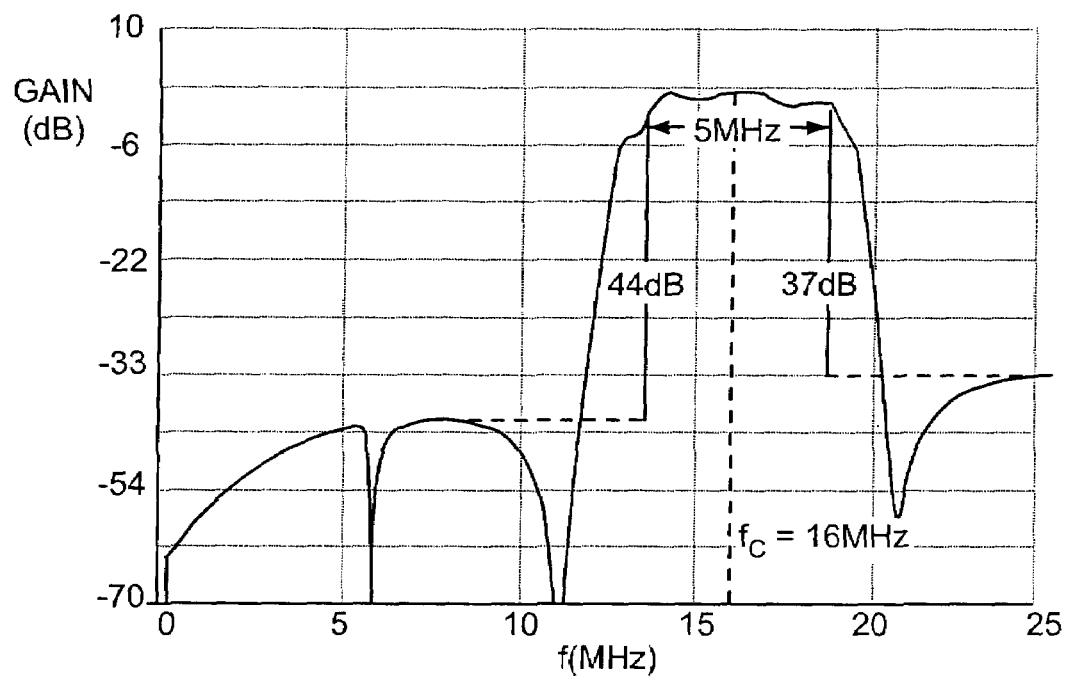
FIG. 8 shows the spectral characteristics of a transmit/receive bandpass filter used in the circuitry of FIG. 5.

The Tx/Rx BPF 108 comprises a passive seventh-order elliptic-function bandpass filter which is designed to provide superior stop band rejection performance. The transmitter and receiver share this bandpass filter. The spectral characteristics of the bandpass filter 108, as shown in FIG. 8, include
Center frequency at 16 MHz
In-band ripple less than 3 dB
3 dB bandwidth of 5 MHz with 3 dB points of 13.5 MHz and 18.5 MHz.

Referring again to FIG. 5, the transformer 110 can be a conventional 100 Base-T Ethernet transformer with a common mode choke built in to reduce common mode noise. In the 12 MHz to 20 MHz range, a preferred transformer provides
Insertion loss <1 dB;
Return Loss>20 dB;
Differential to common mode rejection better than −42 dB;
Hipot safety voltage at least 1500 Vrms.

Figure 9:
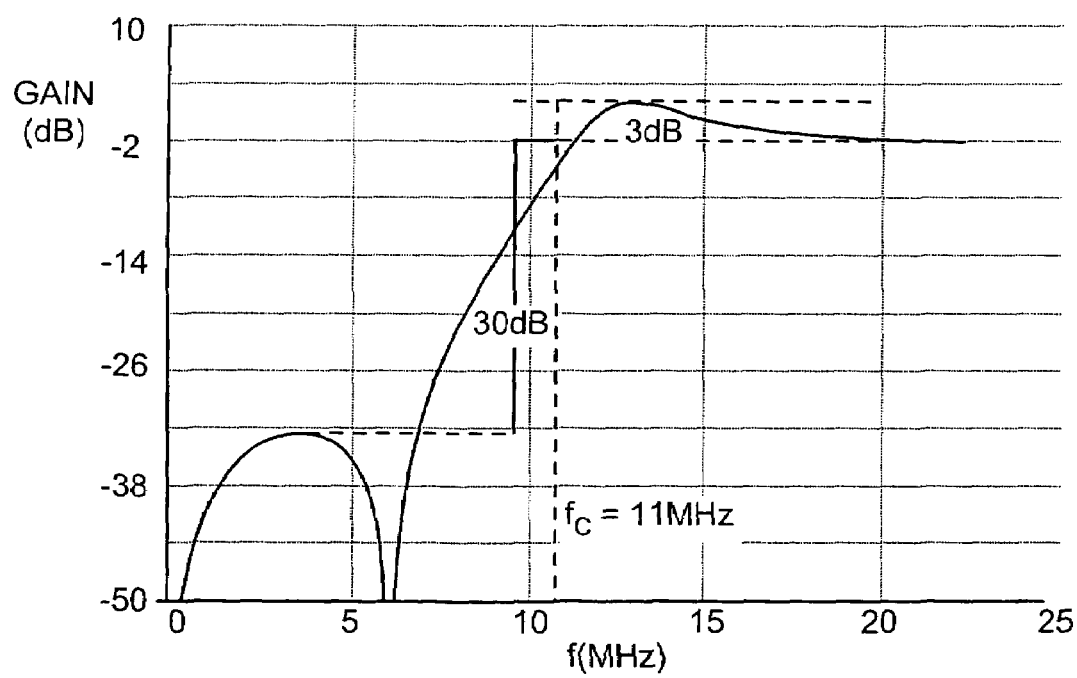
FIG. 9 shows the spectral characteristics of a transmit/receive highpass filter used in the circuitry of FIG. 5.

The HPF-1 112 comprises a third order elliptic-function highpass filter with the spectral characteristics shown in FIG. 9. This highpass filter is located on the 2-wire phone network side of the AFE 70 circuit. The HPF-1 provides low frequency rejection of other signals generated by other applications, such ADSL and HDSL. It also shows high balanced impedance to other applications that may use spectrum below 10 MHz. The spectral characteristics of the HPF-1 include
3 dB cutoff frequency at 11 MHz
Ripple less than 3 dB
30 dB minimum at 3.5 MHz, −56 dB minimum at 6 MHz.

Figure 10:
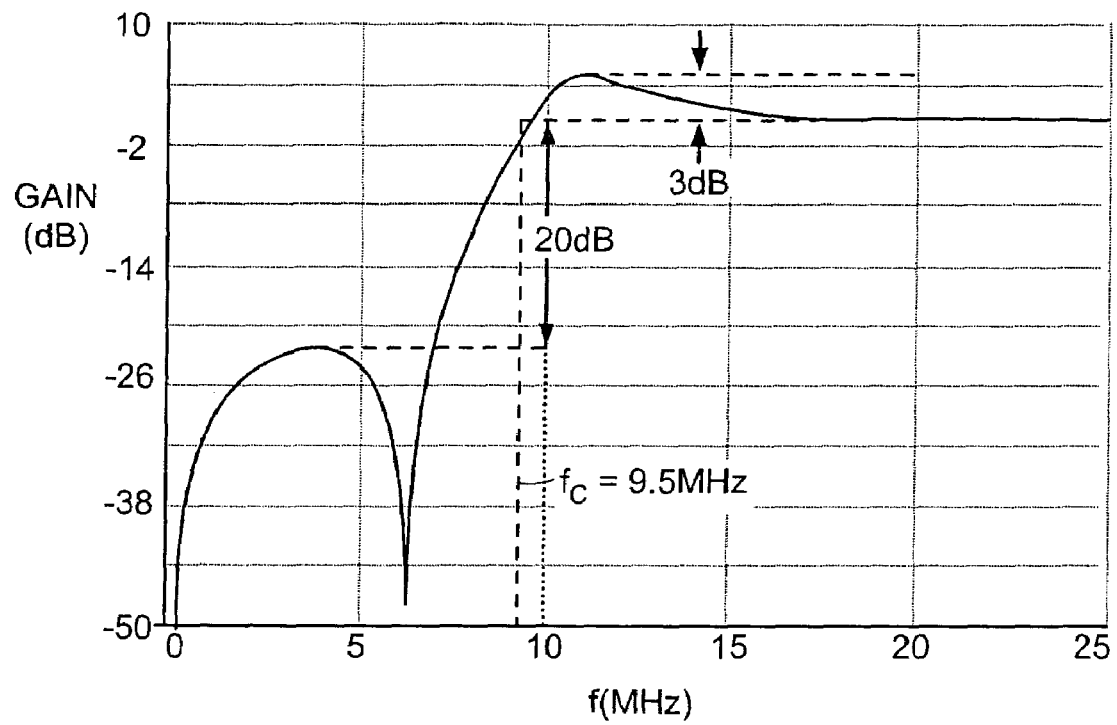
FIG. 10 shows the spectral characteristics of a receive highpass filter used in the circuitry of FIG. 5.

The HPF-2 (FIG. 5) comprises a third order elliptic-function highpass filter with the spectral characteristics shown in FIG. 10. This highpass filter is designed for the receiver section to provide additional low frequency rejection of other signals generated by other applications, such ADSL and HDSL. The spectral characteristics of the HPF-2 include
3 dB cutoff frequency at 9.5 MHz
Ripple less than 3 dB
20 dB minimum at 3.5 MHz, −46 dB minimum at 6 MHz.

The home LAN 15 (FIG. 1) is a point-to-multipoint communication system. In this system, the HLH 20 receives signals from the TMs 16 which are physically located at different distances from the HLH. Thus, the HLH receiver needs AGC to equalize the received signals by adjusting the receiver gain based on received signal strength. As described further herein, the system uses time division multiple access for upstream communication to the HLH from the TMs. To effectively utilize bandwidth on the home LAN, transient time between two adjacent timeslots should be minimized. This requires that the AGC be able to rapidly track a received signal that varies in signal strength from timeslot to timeslot. Another challenge is that if the received signal envelope is not constant, the receiver has to be able to lock and hold the gain, which is based on an average of received signal strength, so as to keep the "fast tracking" AGC from unnecessarily tracking the changing envelope of the received signal.

Figure 7A:
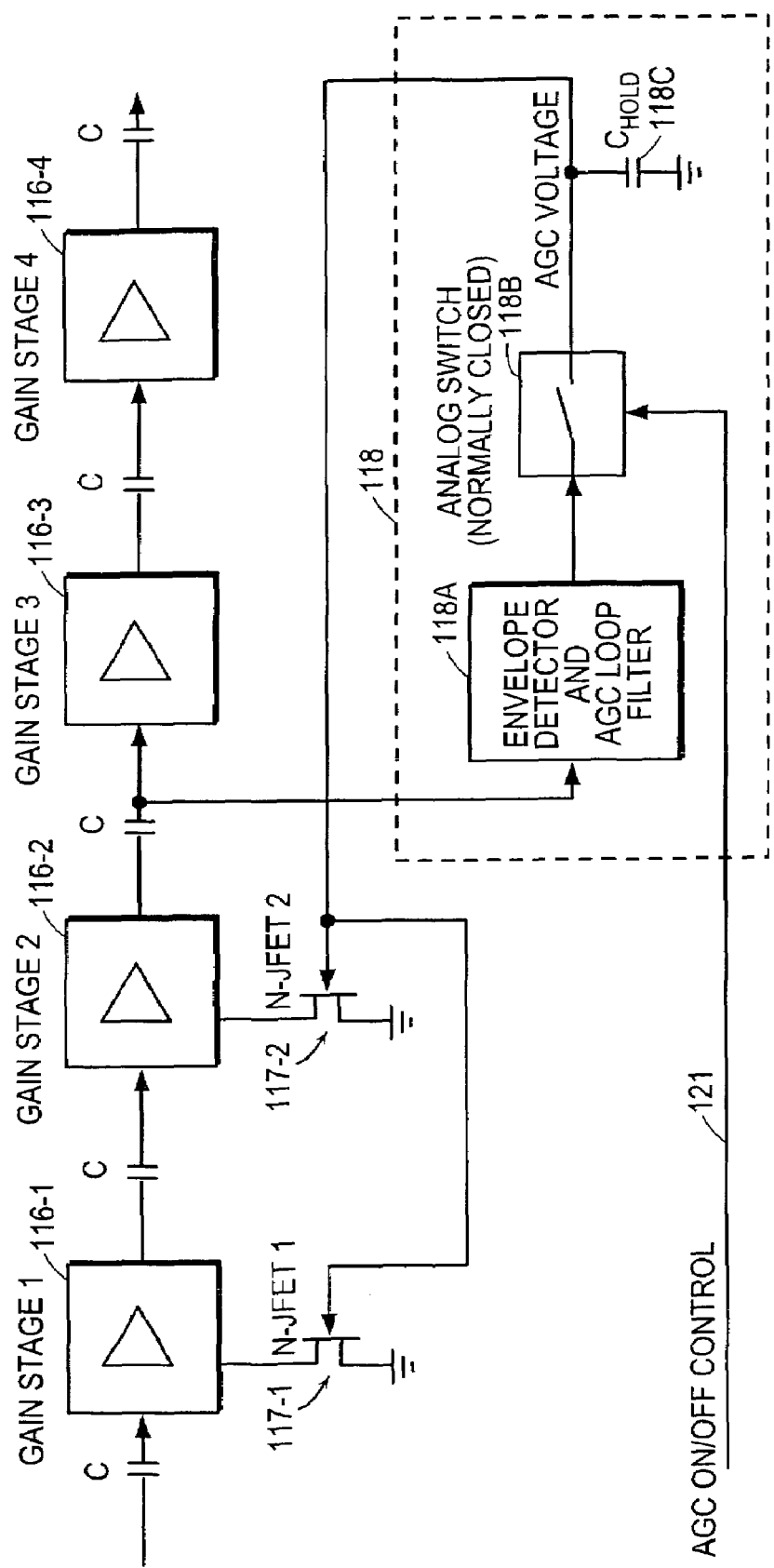
FIG. 7A is a schematic block diagram of automatic gain control circuitry of the circuitry of FIG. 5.

The AFE 70 (FIG. 5) includes AGC circuitry 116, 118 that overcomes the challenges associated with fast tracking and locking. Referring now to FIG. 7A, the AGC gain stage block 116 preferably includes four gain stages, two that are AGC gain stages 116-1, 116-2 and two that are fixed gain stages 116-3, 116-4. The AGC control block 118 includes envelope detector and AGC loop filter 118A, analog switch 118B controlled by AGC on/off control line 121 and holding capacitor 118C. The two AGC gain stages 116-1, 116-2 are used to equalize time-varying attenuation caused by the particular wiring topology employed. Since the AFE 70 receives signals from other AFE modules (e.g., other TMs 16 and the HLH 20) located in different positions on the in-home wiring, the AGC has to be robust and must react fast enough such that the gain can be changed from maximum to minimum within a relatively short time interval, e.g., a guard space of two timeslots as defined in the MAC layer described further herein. Two N-channel JFET transistors 117-1, 117-2 are used to control AGC gain stages 116-1, 116-2, respectively to ensure a wide AGC dynamic range and fast tracking ability.

Figure 7B:
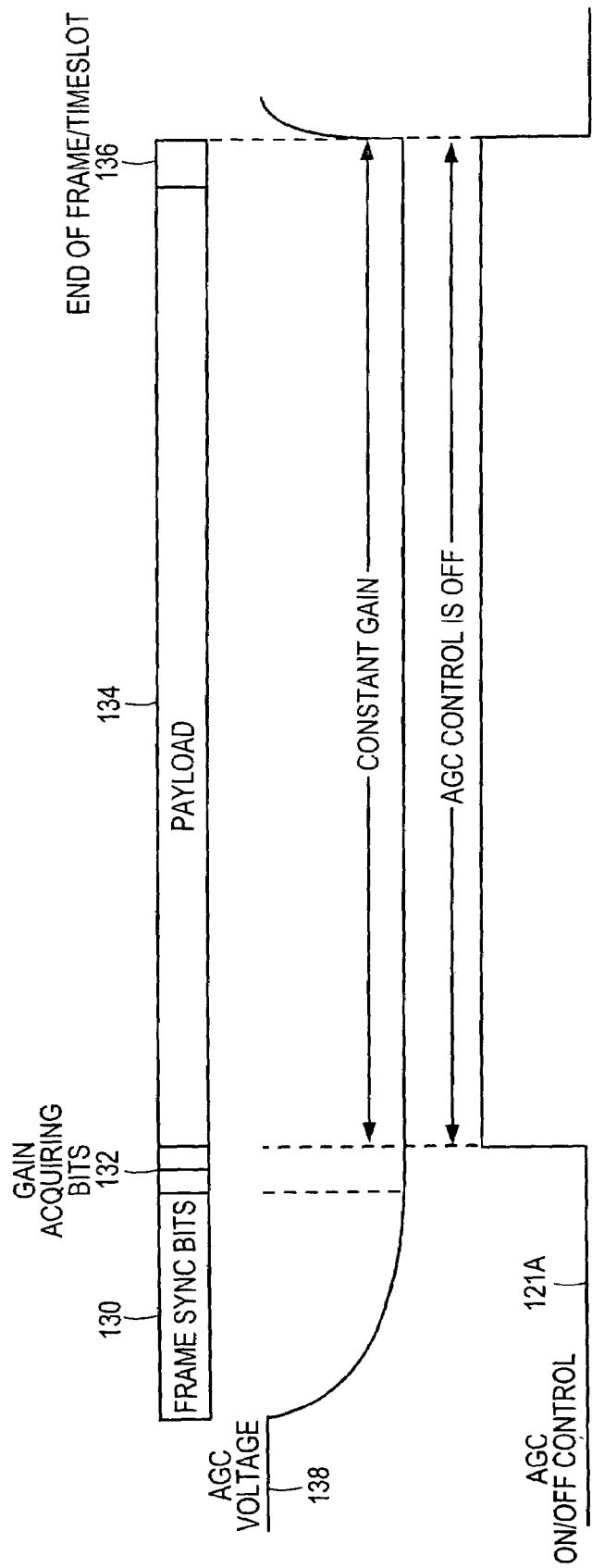
FIG. 7B is a timing diagram illustrating automatic gain control in relation to reception of a downstream frame or an upstream timeslot for the circuitry of FIG. 7A.

Referring now to FIG. 7B, there is shown a timing diagram of AGC gain and control signals in relation to a downstream frame or alternatively an upstream timeslot as described further herein with reference to the MAC layer. The frame or timeslot includes frame sync bits 130 followed by gain acquiring bits 132, payload 134 and end of frame/timeslot 136. The frame sync bits 130 are used to help the AGC circuitry converge quickly. The gain acquiring bits 132 are used to assist the AGC circuitry to achieve high locking accuracy of automatic gain control. Once AGC converges, the AGC gain is held constant during the period corresponding to the payload 134. The control signal 121 indicating payload time from the MAC layer is used to open the analog switch 118B. Capacitor 118C is used to hold and lock gain control such that the receiver remains a constant gain during transmission time of the payload.

The AGC circuitry 116, 118 has the following characteristics:
Overall gain 60 dB min;
AGC control range better than 40 dB;
AGC maximum gain settling time less than 21 μs;
AGC minimum gain recovery time less than 21 μs;
Nominal output level 8 Vp-p.

The demodulator 119 demodulates the equalized signal received from the AGC circuitry 116, 118 to a baseband signal. For on-off keying modulation, the envelope of the equalized signal is actually the transmitter baseband pulse shape. The demodulator includes an envelope detector which extracts the signal envelope. Since channel distortion and additive noise are superimposed on the envelope, the demodulator includes a likelihood decision circuit which compares the envelope with a detection threshold. The detection threshold is generated adaptively by a peak average filter, which continuously monitors the envelope peak and the biggest eye opening.

2.2 Physical Layer

The AFE 70 (FIG. 5) described above implements the physical layer on the home wiring 14. The theory of operation for the physical layer is now described.

To avoid an expensive echo canceller, the transmitter and receiver operate in a time-division duplex (TDD) fashion. This means that when a transmitter is sending, the receiver on the same AFE circuit does not receive signals from any other AFE circuit on the home LAN. Likewise, when a receiver is receiving signals, the transmitter on the same AFE circuit does not send any signals to any other AFE circuit on the home LAN.

To multiplex five 64 kb/s voice channels and other control signaling, a TDM framing format is used downstream toward the TMs while TDMA is used upstream. All frame formatting and frame control and timing is controlled by the MAC layer processor, and is described in the MAC layer section further herein.

The modulation used in the embodiment of AFE 70 is on-off amplitude shift keying with a carrier frequency of 16 MHz. As noted above, a guard space is provided between each modulated symbol to prevent ISI caused by open termination reflections. In an embodiment, the symbol period is given as symbol period=2$T$+guard band space=2×244 nsec+ 732 nsec=1.22 usec symbol rate=1/symbol period=1/1.22 μsec=820 kbps where T is the pulse width of a symbol.

Figure 11:
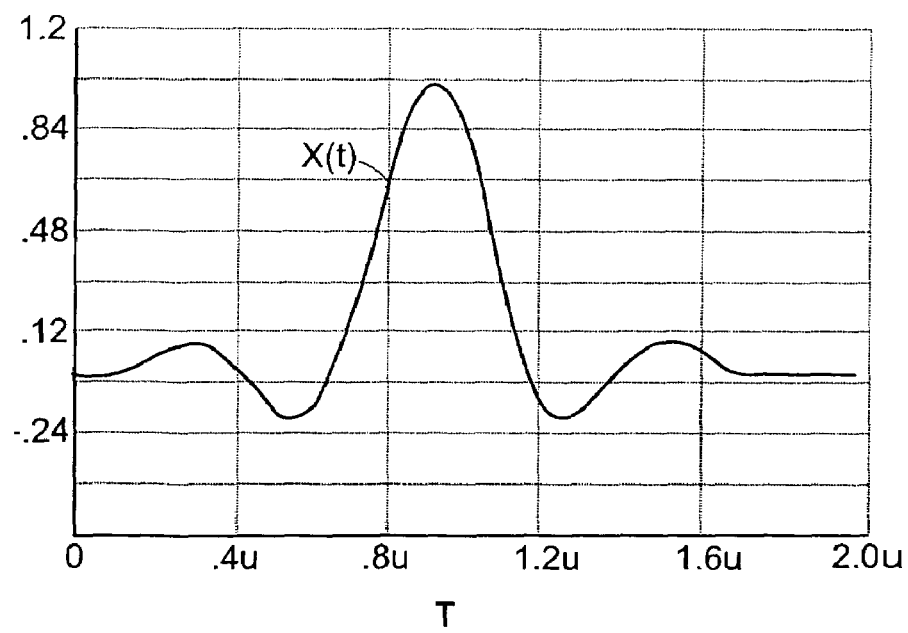
FIG. 11 shows a simulated baseband data signal X(t) in the time domain.

To avoid ISI in a band-limited system, a raised cosine spectrum-shaping approach is used. If u(t) is the binary digital signal, the baseband signal can be expressed as $X(t)=u(t)*[(\sin\pi t/T)/(\pi Tt/T)]*[(\cos \beta\pi t/T)(1-4\beta^2 t^2/T^2)]$ FIG. 11 shows the simulated baseband signal X(t) in the time domain (T=244 nsec).

The raised cosine spectral characteristic X(f) of the baseband pulse is defined as:

$X(f)=T, 0 \leq |f| \leq (1-\beta)/2T$ $$X(f) = \frac{T}{2}\left[1 - \sin\pi T\left(f - \frac{1}{2T}\right)/\beta\right], (1-\beta)/2T \leq |f| \leq (1+\beta)/2T$$

Figure 12:
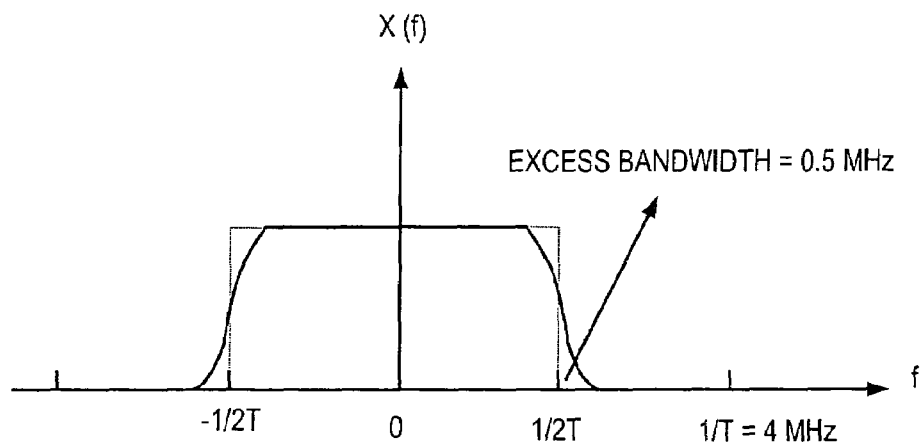
FIG. 12 shows the frequency spectrum X(f) for the simulated baseband data signal of FIG. 11.

For the characteristic X(f), shown in FIG. 12, the excess bandwidth=β/2T=0.5 MHz, where roll-off parameter β=0.25 (25%); 1/T=4.096 MHz; and T=244 nsec.

The baseband signal is modulated by a sinusoidal carrier signal ($f_c$=16 MHz) and shifted to a passband signal centered around 16 MHz with 4 MHz passband bandwidth. The passband signal in the time domain is defined as Xtx(t):

$Xtx(t)=X(t)*\sin(2\pi f_c*t+\theta)$

Figure 13:
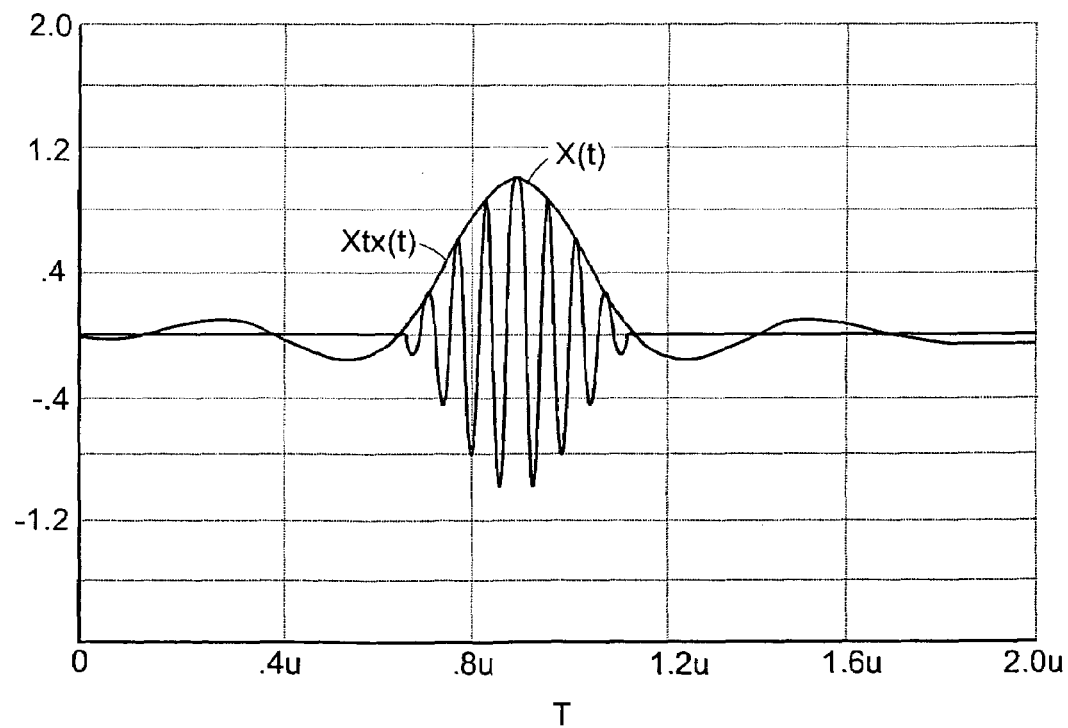
FIG. 13 shows a passband signal Xtx(t) in the time domain.

FIG. 13 shows the passband signal Xtx(t) in the time domain (T=244 nsec). In the frequency domain, the passband signal is defined as Xtx(f):

$Xtx(f)=X(f+f_c)$

Figure 14:
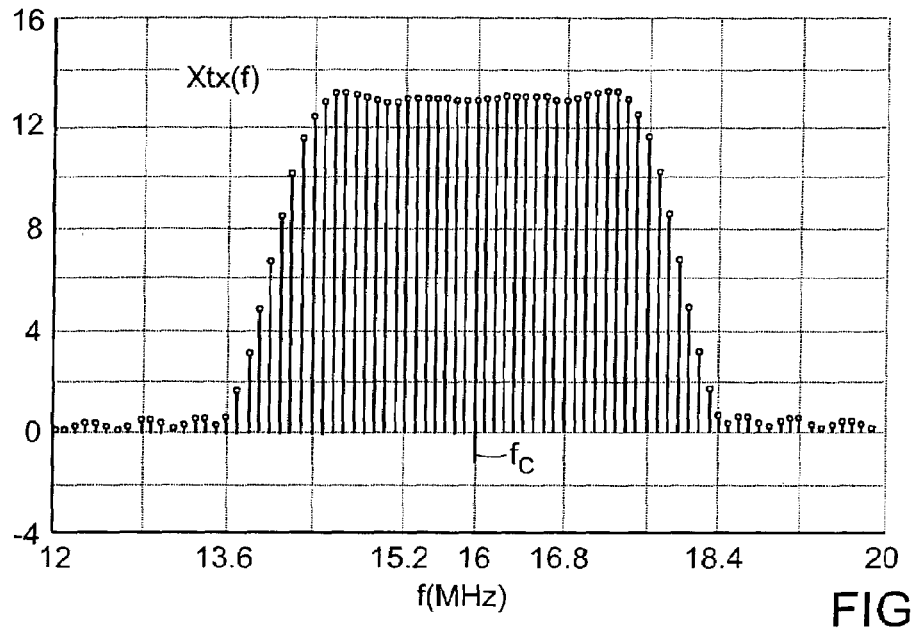
FIG. 14 shows the frequency spectrum for the passband signal Xtx(f).
Figure 15:
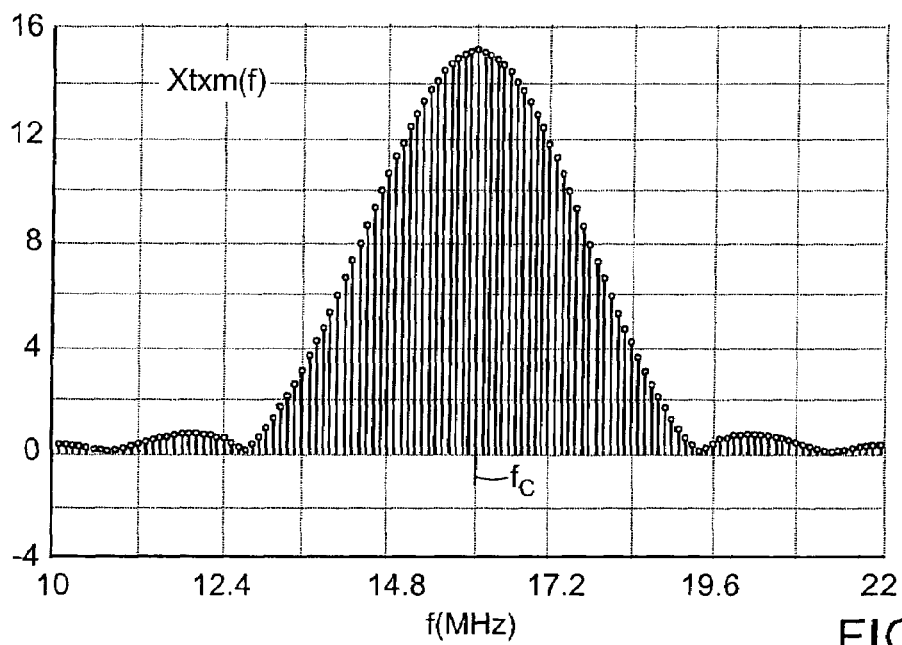
FIG. 15 shows a simulated spectrum for passband signal Xtxm(f).

FIG. 14 shows the theoretical spectrum of Xtx(f). A simulated spectrum Xtxm(f) for the passband signal implemented in the embodiment of AFE 70 (FIG. 5) is shown in FIG. 15. This signal spectrum corresponds to the shaped pulse signal in the time domain shown in FIG. 6C.

In terms of demodulation, the received on-off keying modulated signal can be expressed as:

$Xrv(t)=K(t)*Xtx(t)+n(t)$ where n(t) is additive noise and K(t) is time-varying channel distortion caused by echo and non-linear attenuation. Since a guard space is used between transmitted symbols, K(t) is mainly represented by time-varying attenuation. As noted above with respect to the embodiment of AFE 70 (FIG. 5), two AGC gain stages with fast tracking control capabilities are used to equalize the K(t) attenuation. Following equalization, the 16 MHz carrier is removed by an envelope detector as noted above in the description of AFE 70. The envelope detector output is then sliced by a hard decision circuit. The threshold level for the hard decision circuit is adaptively adjusted based on signal eye openings. The output of the hard decision circuit is a regenerated TTL compatible binary digital data signal.

Figure 16:
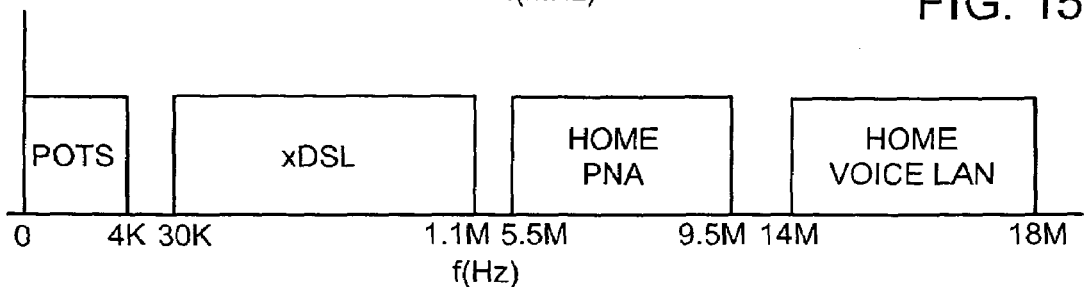
FIG. 16 illustrates a spectrum arrangement on the in-home wiring which accommodates voice signals in a dedicated passband located above existing communication services.

In the embodiment of the home LAN physical layer described herein, operation occurs in the frequency range between 14 and 18 MHz. This location in the frequency spectrum is above that used by other services that can coexist on the wiring, such as POTS ("plain old telephone service") (0 to 4 Hz), xDSL (30 KHz to 1.1 MHz) and HomePNA (5.5 to 9.5 MHz), as shown in the spectrum diagram of FIG. 16.

2.3 MAC layer

Figure 17:
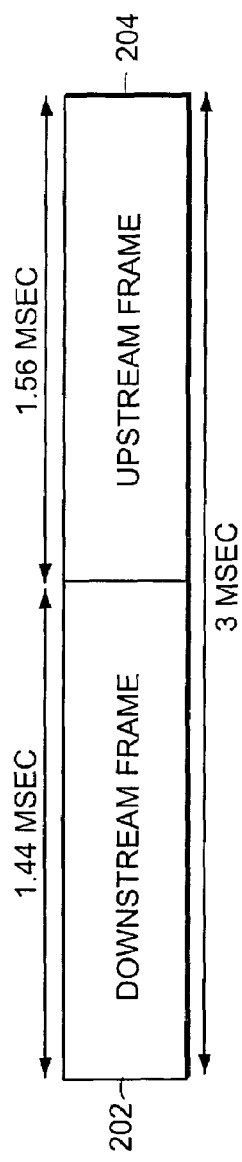
FIG. 17 shows media access layer framing for the home local area network.

Communication to the HLH 20 upstream from the TMs 16 (FIG. 1) and downstream from the HLH to the TMs is provided in frame structures: one structure for the downstream direction and another for the upstream direction. As shown in the diagram of FIG. 17, a downstream frame 202 is of 1.44 ms duration and an upstream frame 204 is of 1.56 ms for a total transmission time of 3 ms.

Figure 18:
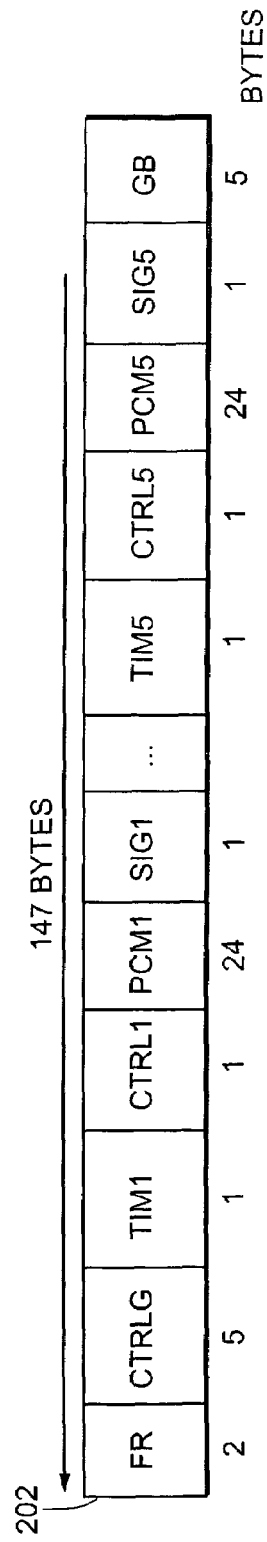
FIG. 18 shows a framing format for the downstream frame shown in FIG. 17.

In the downstream direction, only the HLH transmits. The downstream frame structure of five timeslots is shown in FIG. 18 and includes 147 bytes in fields defined as follows:

FR field of two framing bytes which allows the TMs to adjust their gain levels and to derive their timing from the HLH;

CTRLG field of 5 bytes used for non-call associated control and OAM functions;

TIM1, . . . ,TIM5 fields each comprising a timing byte which further helps the TMs to gain timing;

CTRL1, . . . ,CTRL5 fields each comprising a control byte associated with corresponding telephone modules TM1, . . . ,TM5;

PCM1, . . . ,PCM5 fields each comprising 24 bytes of voice information from the HLH to corresponding telephone modules TM1, . . . ,TM5; the PCM fields are used to exchange messages between the HLH and a TM while the particular TM is not connected on a call;

SIG1, . . . ,SIG5 fields each comprising a signaling byte used for call associated signaling (ABCD bits) for corresponding telephone modules TM1, . . . ,TM5; the lower nibble includes CRC for the ABCD bits;

GB field of five bytes which provides a guard band to avoid false framing.

Figure 19:
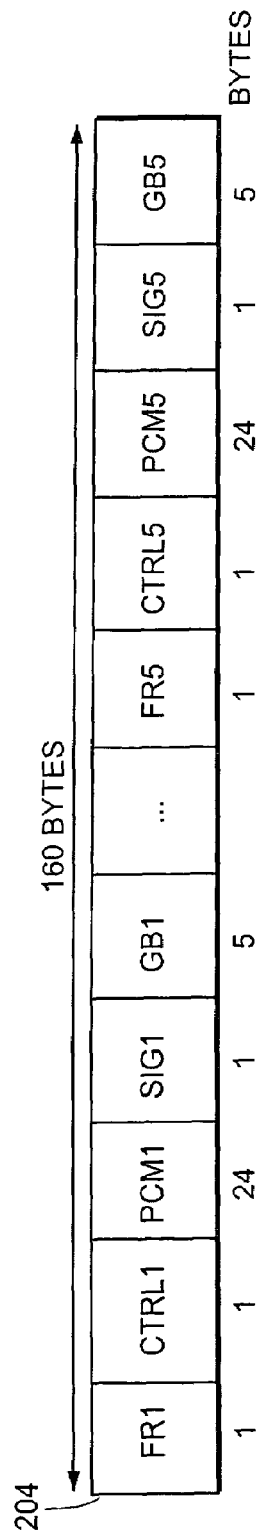
FIG. 19 shows a framing format for the upstream frame shown in FIG. 17.

The upstream frame structure of five timeslots is shown in FIG. 19 and includes 160 bytes in fields defined as follows:

FR1, . . . ,FR5 fields each comprising a framing byte to enable the HLH to lock on to the power level and timing of transmitted signals from a particular TM;

CTRL1, . . . ,CTRL5 fields each comprising a control byte for non-call associated control and OAM functions;

PCM1, . . . ,PCM5 fields each comprising 24 bytes of voice information to the HLH from corresponding telephone modules TM1, . . . ,TM5;

SIG1, . . . ,SIG5 fields each comprising a signaling byte used for call associated signaling (ABCD bits) for corresponding telephone modules TM1, . . . ,TM5;

GB1, . . . ,GB5 fields each comprising five bytes which provides a guard band to avoid false framing.

The TMs are slaved to the HLH. The TMs use the framing information sent by the HLH to derive timing. Upon power-up, each TM waits to see the downstream framing bytes FR which are set to 0xF6F6 (i.e., two bytes as opposed to the upstream framing bytes from other TMs which are only one byte long). Each TM determines four pieces of information to derive framing, namely:

the framing bytes in the FR field are set to 0xF6F6;
the framing bytes follow a guard band GB of 5 bytes;
the timing bytes in the TIM1, . . . ,TIM5 fields are each set to 0xEB and occur at pre-specified positions with respect to the framing bytes; and
the next guard band in the GB field occurs 140 bytes following the framing bytes FR.

Furthermore, to prevent the possibility of achieving false framing by the TMs, the following steps are taken. First, the TM declares that framing has been achieved only after seeing three consecutive downstream frames with the correct framing bytes in field FR. Second, all of the payload bytes included in the CTRLG, CTRL1, . . . ,CTRL5, PCM1, . . . ,PCM5 and SIG1, . . . ,SIG5 fields are scrambled using a self-synchronous scrambler. This scrambling minimizes the probability of the payload bytes being equal to the framing bytes in successive frames either by accident or by design (e.g., a malicious user). Only the framing and timing bytes are in the clear and are not scrambled.

Once the TM achieves framing, it declares itself to be in the synchronization state. In this state the TM continues to look for framing bytes (FR field) at the beginning of every downstream MAC frame 202. If the TM does not see framing bytes in three consecutive frames, it declares itself out of synchronization and enters the synchronization hunt state (i.e., the state at power up).

Note that the framing byte in fields FR1, . . . ,FR5 used in the upstream direction by each TM is only one byte long. This helps the TMs distinguish between upstream transmissions from other TMs versus downstream transmission from the HLH.

The values of the particular fields defined in the downstream frame 202 are preferably set as follows:

The framing bytes in the FR field are set to 0xF6F6.
The global control bytes in the CTRLG field are defined below:

| 5 bytes | | | |
|---|---|---|---|
| 1 byte idle status | 1 byte provisioned status | 1 byte reserved | 2 bytes CRC |

| 1 byte - idle status | | | | | |
|---|---|---|---|---|---|
| 3 bits | 1 bit | 1 bit | 1 bit | 1 bit | 1 bit |
| reserved | TS1 | TS2 | TS3 | TS4 | TS5 |

| 1 byte - provisioned status | | | | | |
|---|---|---|---|---|---|
| 3 bits | 1 bit | 1 bit | 1 bit | 1 bit | 1 bit |
| reserved | TS1 | TS2 | TS3 | TS4 | TS5 | where TS1, . . . ,TS5 in the idle status byte indicate whether a timeslot is currently being used for a voice call (1) or is on-hook or idle (0) and where TS1, . . . ,TS5 in the provisioned status byte indicate whether a timeslot is currently provisioned (1) or not (0).

The control byte in fields CTRL1, . . . ,CTRL5 can be used to exchange OA&M messages between TMs and the HLH.
The PCM bytes in fields PCM1, . . . ,PCM5 include the PCM values (u-law encoded) for the previous 3 ms. While the telephone 24 connected to a particular TM 16 (FIG. 1) is on-hook, this field can be used to send information from the HLH 20 to the corresponding TM.
The signaling byte in fields SIG1, . . . ,SIG5 can have one of the following values as defined in GR-303 for ABCD signaling:

| ABCD Code | Comments |
|---|---|
| 0000 | -R Ringing |
| 0010 | DS0 AIS |
| 0100 | Reverse Loop Current Feed |
| 0101 | Loop Current Feed |
| 0111 | DS0 Yellow |
| 1111 | Loop Current Feed Open |

The timing byte in fields TIM1, . . . ,TIM5 is set to 0xEB.
The guard bytes in field GB are each set to 0x00.
The values of the particular fields defined in the upstream frame 204 are preferably set as follows:
The framing byte in fields FR1, . . . ,FR5 is set to 0xF7.
The control byte in fields CTRL1, . . . ,CTRL5 can be used to exchange OA&M messages between TMs and the HLH.
The PCM bytes in fields PCM1, . . . ,PCM5 include the PCM values (u-law encoded) for the previous 3 ms. While the phone is on-hook, this field can be used to send information to the HLH.
The signaling byte in fields SIG1, . . . ,SIG5 can have one of the following values as defined in GR-303 for ABCD signaling:

| ABCD Code | Comments |
|---|---|
| 0010 | DS0 AIS |
| 0101 | Loop Open |
| 0111 | DS0 Yellow |
| 1111 | Loop Closed |

The guard bytes in fields GB1, . . . ,GB5 are each set to 0x00.

The MAC layer is the only means of communication between the HLH and TMs. The MAC layer is used to convey signaling information (e.g., on-hook, off-hook events), PCM formatted voice information, as well as OAM functions between the HLH and TMs. The home LAN system includes a message based communication protocol to automatically "discover" TMs and monitor any error conditions that may arise as a result of misconfiguration by the end user. For example, each TM is assigned a timeslot to operate in, as determined by a dip switch setting 102 (FIG. 4) on the TM. A registration process is provided to discover TMs once they are plugged into the RJ-11 jack, and to ensure that TMs with the same dip switch setting are not allowed to use the timeslot which has already been assigned to another TM already connected to the home LAN. The state machines governing this process for the HLH and TMs are described further herein.

The PCM fields in the upstream and downstream frames can be used to exchange messages between the HLH and TMs. The message format is defined as follows:

| 24 bytes | | |
|---|---|---|
| Header | Data | CRC |
| 2 Bytes | 20 Bytes | 2 Bytes | where the message header is defined as:

| Header | |
|---|---|
| Reserved | 4 bits |
| Message ID | 4 bits |
| Reserved | 1 byte | and where the reserved fields are set to zero.

The following messages are defined:

| Message Name | Message ID | Direction |
|---|---|---|
| REG_REQ | 0x1 | HLH→TM |
| REG_RESP | 0x2 | TM→HLH |

The REG_REQ message is sent from the HLH to the TM and is defined:

| REG_REQ (msg_id = 0x1) | |
|---|---|
| mask | 6 bytes |
| serial number | 6 bytes |
| reserved | 8 bytes |

By manipulating the mask, the HLH can use the REG_REQ message to request the serial number of a registered TM or it can be used to perform a collision resolution. Once this message is received by a TM, the TM performs the following. It XNORs the serial number received in the message with its own serial number and ORs the result with the mask. The bits of the result are ANDed together and if the result is 1, the TM responds with a REG_RESP message. Otherwise, the TM does not respond.

The REG_RESP message is sent from the TM to the HLH in response to a REG_REQ message received. The serial number sent in the REG_RESP message is the serial number of the responding TM. The REG_RESP is defined as:

| REG_RESP (msg_id = 0x2) | |
|---|---|
| serial number | 6 bytes |
| reserved | 14 bytes |

The following assumptions are made with respect to the messaging format:
 each TM has a unique serial number (48 bits);
 each TM locks into the timeslot indicated by its dip switch setting and receives and transmits accordingly;
 TMs do not transmit any packets while the connected telephone is on-hook unless they are asked to do so by the HLH;
 upon a power-up/reset, the HLH attempts to register all TMs; no timeslots are assigned until the registration process (per TM) is complete.

As noted above, each TM includes LED indicators for indicating the operational status of the TM. The information received from the HLH via the MAC layer informs the TM of any of the following conditions: whether the timeslot on which the TM wants to operate is provisioned; whether the TM is registered with the HLH and is allowed to operate; and whether there are misconfigured TMs on the home LAN.

As noted herein above, each telephone module 16 is provided with a dip switch 102 (FIG. 4) that is used to fix the timeslot that the TM needs to transmit to the HLH. The dip switch setting selects a port number which corresponds to a particular timeslot number. A customer with multiple TMs is expected to set the dip switches such that no two TMs occupy the same timeslot on the HLH. However, mistakes can occur with the result that two or more TMs may end up having the same dip switch setting. In such a case, when the two TMs start to transmit at the same time, collisions can occur garbling the message received at the HLH. In accordance with the invention, a protocol and procedure is provided so that no two TMs are allowed access to the same timeslot. Furthermore, LEDs are provided, which clearly indicate the misconfiguration problem so that the user can rectify the problem.

The misconfiguration problem is complicated by the fact that when two TMs that are misconfigured to transmit in the same timeslot, send transmissions at the same time, collisions may not be detected by the HLH. Two TMs transmitting in the same timeslot are likely to be at different distances from the HLH. The HLH will receive greater energy from the TM that is closer and will adjust its automatic gain control to receive signals from this TM. The weaker signal arriving from the TM that is farther away will not be detected by the HLH and therefore, no collision will be detected. This situation creates a profound problem for the farther TM whose existence may not be recognized by the HLH.

Therefore, the protocol must work irrespective of whether detectable collisions occur on the HLH when multiple TMs transmit on the same timeslot. A detailed description of the misconfiguration protocol follows.

When the telephone modules are in the on-hook condition (i.e., no calls are in progress), the MAC layer frames are being transported back and forth in the upstream and downstream directions as previously noted. At this time, no information is being transported in the timeslots assigned to the telephone modules. Therefore, during the on-hook condition, the information timeslots can be used to prevent and/or detect misconfiguration. This is accomplished in two phases—steady-state operation and transient operation.

In the steady-state, only one TM is legitimately allowed to operate on a given timeslot. Each TM registers with the HLH for a given timeslot using its unique electronic serial number (e.g., 48 bits). The HLH will only allow the registered TM to operate on that timeslot. In the on-hook condition, the TM that is registered with the HLH transmits its electronic serial number with an appropriate CRC to the HLH. The HLH verifies the CRC and in the downstream frame echoes the serial number of the registered TM. When a new TM is subsequently plugged into the system and has a dip switch setting equal to that of the registered TM, the first step for the new TM is to look at the timeslot in the downstream direction (from the HLH). If this timeslot carries an electronic serial number other than its own, then the new TM lights an LED red, showing that the timeslot is already taken. Furthermore, to help with fault diagnosis, multiple LEDs are provided on each TM, each corresponding to a separate timeslot. For example, if a TM is unable to access timeslot number 3 because some other TM has already been registered on it, then LED number 3 for the unregistered TM lights up red. On the registered TM, LED number 3 lights up green. These LED indications can help the user visually identify that the registration problem is with the dip switch setting.

When a new TM is plugged into the home LAN with an erroneous dip switch setting, it is possible that the registered TM is off-hook with a call in progress. As noted above, the first control byte from the HLH (i.e., field CTRLG in downstream frame 202, FIG. 18) indicates the status of calls (whether or not in progress) in each of the timeslots. If the new TM sees a call in progress on its timeslot, it immediately lights the LED corresponding to that timeslot red.

It is quite possible that a user might want to replace an older TM with a new TM. When the user unplugs the old TM, this TM no longer sends its electronic serial number to the HLH. The HLH waits to see this serial number for some number (e.g., five) consecutive frames and then declares that the timeslot is open and available by transmitting a default electronic serial number in the downstream direction. When the user plugs in the new TM, the TM sees the indication from the HLH that the timeslot is open and sends its electronic serial number and registers with the HLH.

In the manner described above, only one TM is uniquely and unambiguously allowed access to a timeslot, thereby preventing the possibility of collisions. In addition, by lighting LEDs, error indications are given with respect to TMs having erroneous dip switch settings.

The transient operation phase arises at initial power-up of a multiple TM system. Consider the case where multiple TMs with erroneous dip switch settings are plugged into the home LAN and the HLH is powered up. At power up, the HLH indicates in the downstream frame that all of the timeslots are available for registration by any TM. At that time it is possible that one or more TMs with the same dip switch settings will transmit their electronic serial numbers in the upstream frame. There are two possible scenarios. In the first scenario, due to the AGC adjustment at the HLH, one of the TMs successfully registers and the signals from the other contending TMs are ignored. In this case, the HLH echoes this serial number. The other TMs observe that a TM has already registered and each lights the LED corresponding to that timeslot red. The registered TM lights the corresponding LED green.

In the second scenario, signals from two or more TMs interfere with each other and produce a CRC failure at the HLH. A binary search approach is used whereby the HLH issues commands to the TMs to respond if their electronic serial numbers begin with a specific string of bits. The HLH uses the responses to perform a directed binary search and issues a refined command after every response. The HLH continues in this vein until it receives a correct electronic serial number as verified by the CRC. The HLH then registers the TM and echoes its serial number in the downstream direction. Immediately, the other TMs each light the LED red corresponding to the timeslot.

Figure 20:
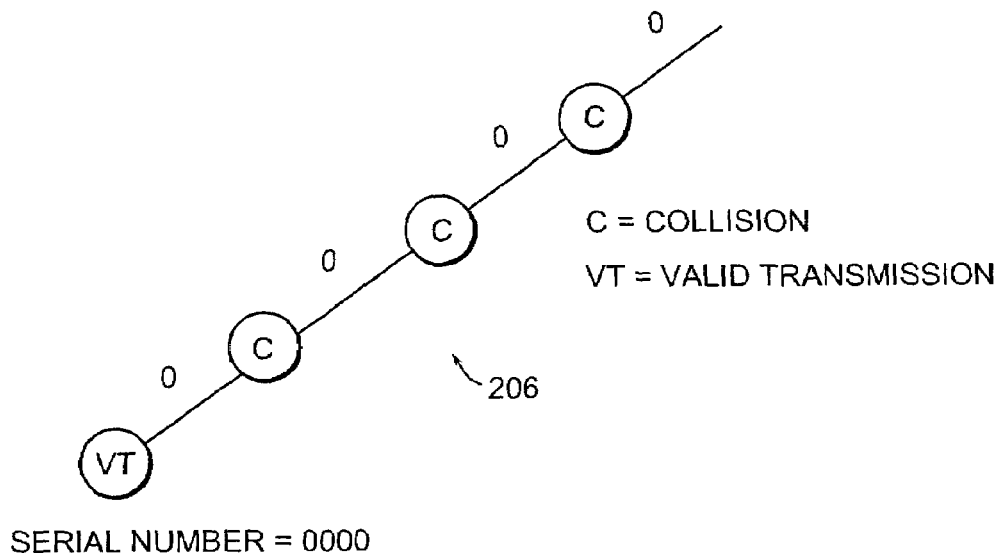
FIG. 20 illustrates a partial binary tree used in determining misconfigured telephone modules.

The binary search approach can be illustrated with a simple example in which four TMs with 4-bit serial numbers 0000, 0001, 0101 and 1101 each attempt to occupy the same timeslot. The serial numbers of the TMs can be considered the terminals of a binary tree. FIG. 20 shows the partial binary tree 206 for the four 4-bit serial numbers.

The HLH traverses this tree with the feedback from the TMs. The HLH starts, for example, by asking all the TMs whose serial numbers begin with a 0 to transmit their respective serial number during the next upstream frame. In our example, the three TMs with serial numbers 0000, 0001, 0101 would respond during the next upstream frame by sending their serial numbers together with a series of protection bits. There are three possibilities for each timeslot during the next upstream frame: (1) valid transmission—the HLH detects a valid sequence. Thus one TM has transmitted in that timeslot and the HLH now knows its serial number. (2) No transmission—there was no TM with a serial number satisfying the condition specified by the HLH. (3) Collision—more than one TM satisfied the condition specified by the HLH and responded on the same timeslot causing the collision.

In the above example, there is a collision between the three TMs with serial numbers starting with 0. The HLH then tries again, asking TMs with serial numbers starting with 00 to respond. The TMs with serial numbers 0000 and 0001 will still collide, causing the HLH to ask for response from TMs with serial number 000. The same two TMs will still collide and the HLH will then ask for response from TMs with the serial number 0000. At this point, there is only one TM satisfying the condition, and there will be a valid transmission with serial number 0000 unambiguously identifying the first TM.

When the HLH detects a "no transmission", it tries the other branch of the node. When the HLH detects a "valid transmission" (VT), the HLH registers the corresponding serial number and the search is terminated. For a serial number of size 48 bits, the worst case performance for this procedure is 96 MAC layer frames which translates to about 300 ms. In 300 ms, the transient condition is resolved and the steady state operation can begin. Accordingly, the contending TMs light up the LEDs corresponding to this timeslot red.

Sometimes the user may not have requested service for all four telephone modules. For example, a specific user may have requested service only for two telephone modules. In this case, the service provider provisions two telephone numbers and two telephone slots and the remaining timeslots are not provisioned. If the user sets up a dip switch setting to a non-provisioned timeslot, then it is important to give a visual indication of this problem. In fact, the user could set dip switches on multiple TMs to a timeslot that has not been provisioned. This scenario is resolved as follows.

The HLH is required to send a message in the downstream timeslot that the timeslot has not been provisioned. Each TM is required to first look at the downstream timeslot before sending a registration message. When the TM sees that a timeslot has not been provisioned, it immediately lights up the LED corresponding to that timeslot flashing red. In this manner all of the TMs with dip switch settings on the non-provisioned timeslots light up with flashing red indications. This helps both the user and the service provider in troubleshooting. This procedure is quite consistent with the misconfiguration resolution system previously described.

When a TM powers up, it must first look at the corresponding downstream timeslot. If the downstream timeslot indicates a non-provisioned timeslot, then the TM immediately lights up the LED corresponding to that timeslot flashing red. If the downstream timeslot indicates that it is a provisioned timeslot and that it is available for registration, then all the TMs listening to that timeslot try to register and ultimately, as per the collision resolution procedure described above, one of them finally registers and the others light the LEDs corresponding to that timeslot continuous red.

The foregoing has described an embodiment of the MAC layer operation in which each of four possible TMs correspond to a specific phone number and a specific timeslot is uniquely assigned in the upstream and downstream directions based upon a dip switch setting at the individual TMs. Two alternate embodiments of the MAC layer operation are now described.

In a second embodiment of the MAC layer operation, up to eight telephone modules are allowed to attach to the home LAN with each TM capable of supporting multiple phone numbers. In this embodiment, there is no hard assignment of timeslots to the TMs. Rather, timeslots are assigned on an as needed basis in a soft manner to the TMs. Using the same framing structure described above with respect to FIGS. 17 to 19, four simultaneous voice calls are allowed from among the eight TMs.

Figure 21:
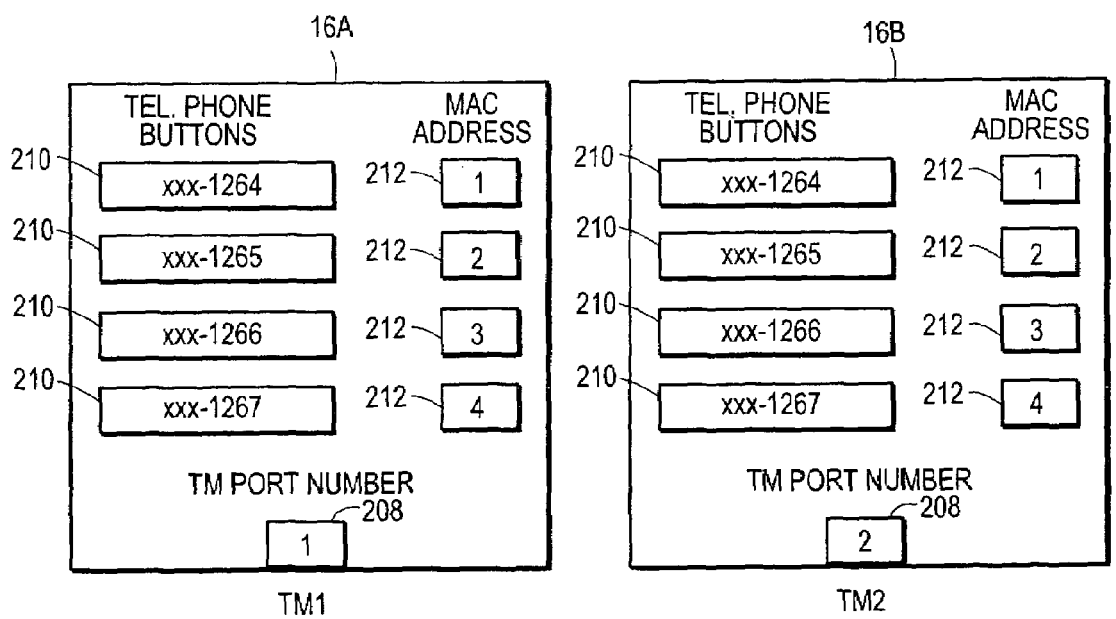
FIG. 21 illustrates a configuration arrangement for a pair of telephone modules.

Referring now to FIG. 21, two TMs 16A and 16B are shown with corresponding port numbers 208, telephone numbers 210 and MAC addresses 212. Note that while eight TMs can be provisioned in this second embodiment of the MAC layer operation, only two TMs are shown for simplicity. Each TM has a specific TM port number 208 that is set using the dip switch 102 (FIG. 4) which is represented as a 3 bit port address. Each telephone number 210 is associated with a specific MAC address 212. A given phone number has the same MAC address across all the telephone modules. When a TM goes off-hook with a specific telephone number (there can be a default number provisioned for each TM), the TM writes into a 1 byte request field (REQ-FLD) defined as:

| REQ_FLD | | | |
|---|---|---|---|
| OFF-HOOK | MAC ADDRESS | PORT ADDRESS | PARITY |
| 1 bit | 3 bits | 3 bits | 1 bit |

The MAC address 212 corresponds to the phone number being used to make the call and the port address 208 corresponds to the TM port number selected by the user. To send the request upstream, the REQ_FLD is included in a three byte TM_REQ message which includes a framing byte as a header and a guard byte as a trailer.

In the second MAC layer embodiment, the fifth upstream timeslot consisting of 24 bytes i.e., the upstream PCM5 field (FIG. 19), is used to send the TM_REQ message from the TMs to the HLH. The fifth upstream timeslot is subdivided into eight 3 byte fields so that 8 telephone modules can send requests. Each TM makes its request in a different position of the PCM5 field based on its port address so that there is no possibility of collisions. For example, the telephone module with port address 1 always sends its requests in the first three bytes, the telephone module with port address 2 sends its requests in the next three bytes and so on. Upon receiving these requests, the HLH uses CTRLG bytes to assign voice timeslots to the requesting TMs.

In the second embodiment of the MAC layer, soft timeslot assignment for TMs is supported by explicitly using requests from the TMs. However, one upstream timeslot must be set aside for making the requests. This timeslot could have been used for a voice call.

In a third embodiment, MAC layer operation provides for all timeslots to be used for voice calls. In particular, when one or more timeslots are idle and are not being used currently for voice calls, then one of these slots is used for making requests. In every downstream frame (FIG. 18), the first byte of the CTRLG field is used to show the status of each timeslot, regardless of whether a timeslot is being used (for a voice call), and is defined as follows:

| STAT_FIELD | | | | | |
|---|---|---|---|---|---|
| POS1 | POS2 | POS3 | POS4 | POS5 | RSVD |
| 1 bit | 1 bit | 1 bit | 1 bit | 1 bit | 3 bits |

A single bit set to one in bit position 1 indicates that timeslot 1 has been assigned to one of the TMs. If the bit is set to 0, then the timeslot is available (unassigned). A TM that goes off-hook immediately knows by looking at the STAT-FIELD which timeslots are available and which are taken. The TMs use the last available unassigned timeslot in the next upstream frame to request timeslots from the HLH.

Each TM is allowed to make its request in a pre-specified portion of the available timeslot. Suppose the STAT_FIELD byte indicates that timeslot 5 is available. Then TM1 can make its request in the first 3 bytes of timeslot 5, TM2 in the next 3 bytes of timeslot 5 and so on. If the STAT_FIELD byte indicates that all five timeslots are assigned, then there is no need to entertain any more requests and a TM that goes off-hook immediately applies a busy tone.

The following is a description of the state machines for the HLH and the TMs (FIG. 1) in relation to the first embodiment of the MAC layer operation described herein above. The HLH includes four state machines, one for each telephone module. Referring to the state diagrams of FIGS. 22A to 22H, the description that follows relates to the state machine for an individual TM.

Figure 22A:
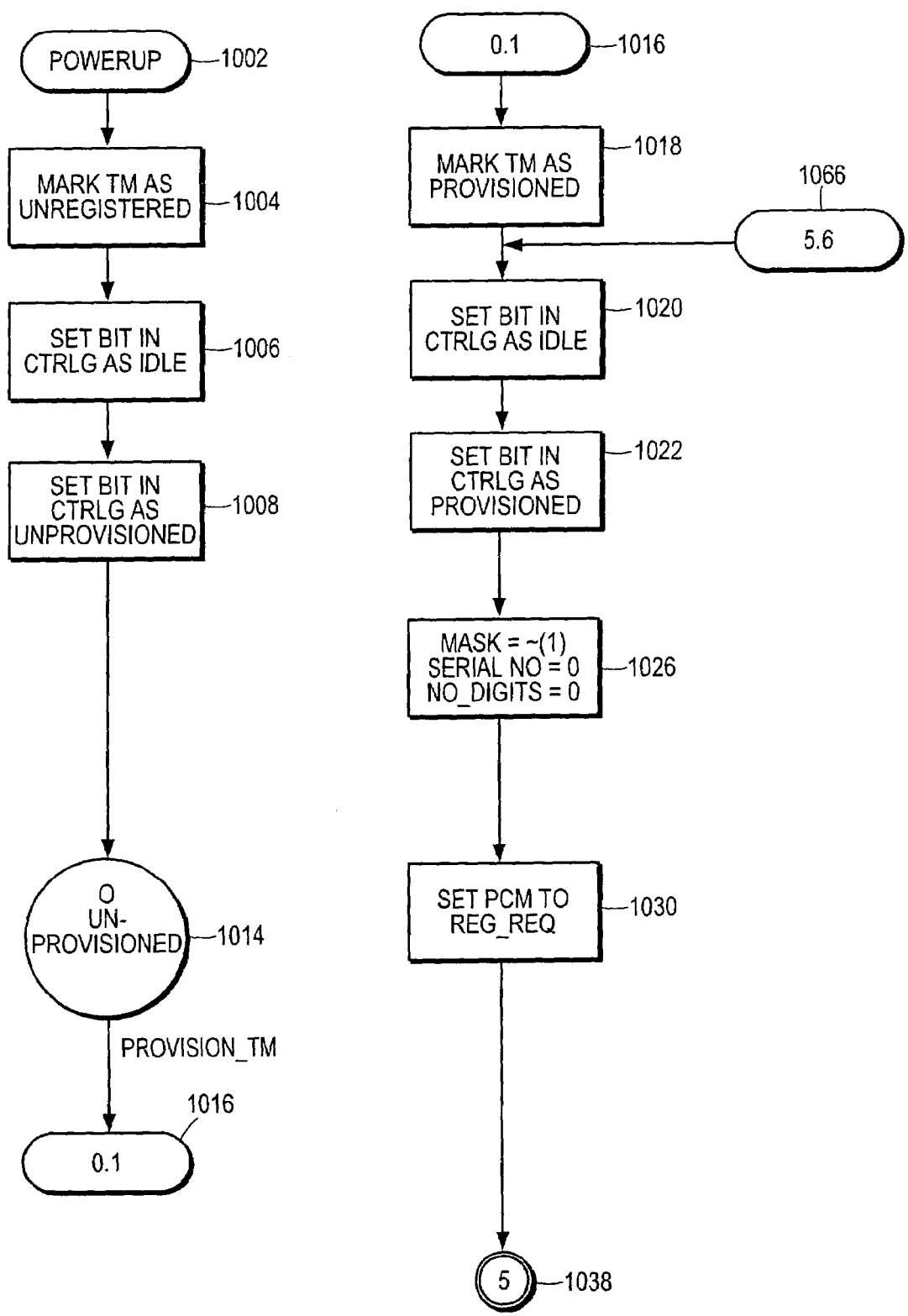
FIGS. 22A–22H are state machine diagrams for the home LAN hub of FIG. 3A.

There are four states for each TM: unprovisioned (state 0), not connected (state 1), connected (state 2) and unregistered (state 5). Referring to FIG. 22A, at block 1002 the HLH powers up. A series of actions denoted by blocks 1004, 1006, 1008 are performed by the HLH prior to reaching the unprovisioned state at block 1014. The first action in block 1004 is to mark the particular TM as unregistered in the HLH memory. At block 1006, an idle/busy bit in the CTRLG field of the downstream frame is set to idle. A provisioned/unprovisioned indicator bit in the CTRLG field of the downstream frame is set as unprovisioned in block 1008.

There is only one event that causes transition out of the unprovisioned state at block 1014. This event is a provision_TM message wherein the HLH receives such a message from an external management interface to indicate that service is to be turned on for this particular TM. The actions in relation to the provision_TM event begin at block 1016. At block 1018 the HLH marks the particular TM as provisioned in its memory. At block 1020 the idle/busy bit in the CTRLG field of the downstream frame is set to idle. The provisioned/unprovisioned bit in the CTRLG field is set to provisioned at block 1022. At block 1026 a mask value is initialized and two variables labeled serial_no and no_digits are initialized to zero. A REG_REQ message is set into the PCM field of the downstream frame at block 1030. A transition is made to the unregistered state (state 5) at block 1038.

Figure 22B:
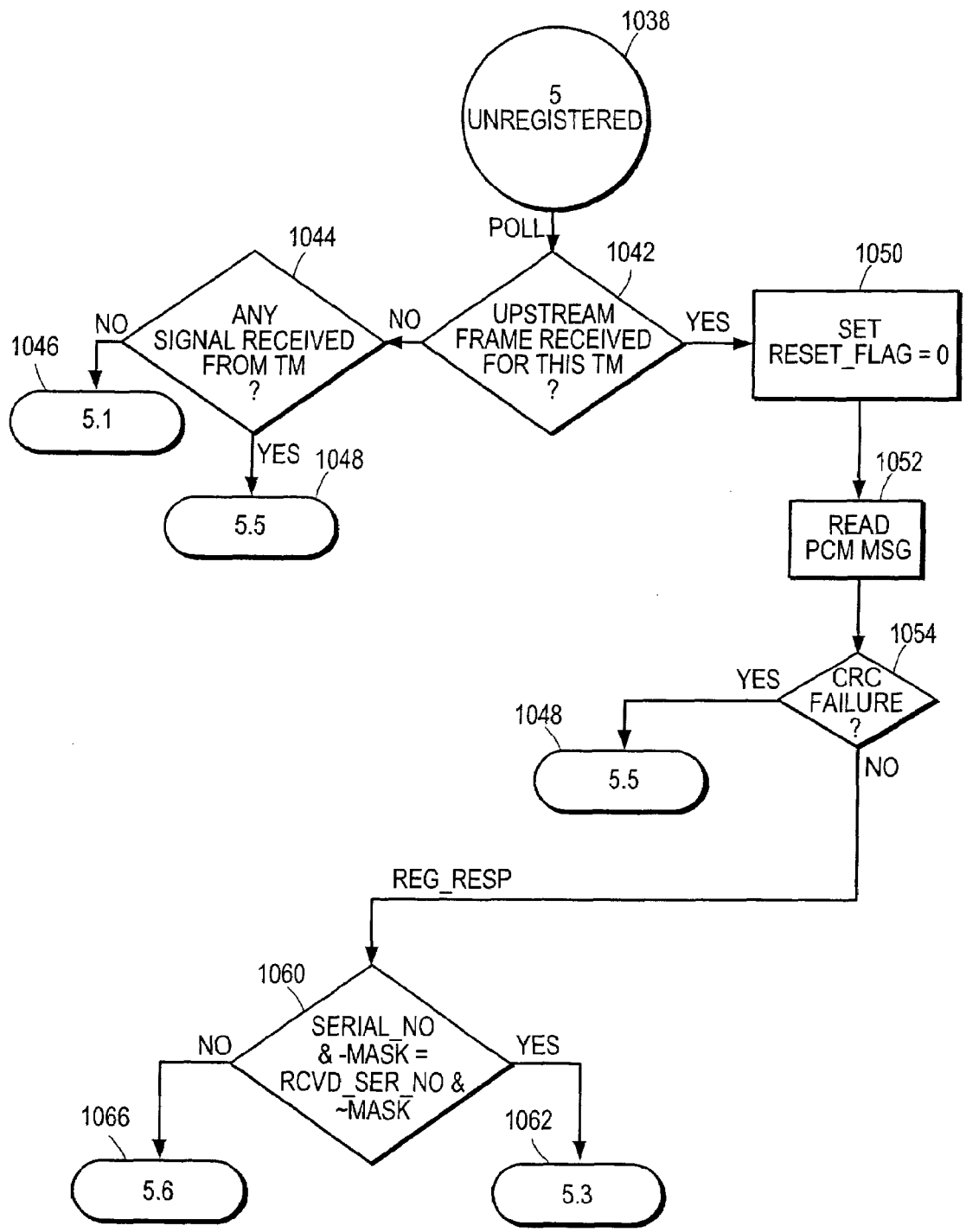

Referring now to FIG. 22B, the events and actions relating to transition from the unregistered state are described. As described above for the preferred embodiment, every three milliseconds an upstream frame is received at the HLH; however, the HLH processor does not need to look at every frame. Instead the HLH processor preforms polling at a given timer interval. At block 1042 the HLH determines whether an upstream frame has been received for this particular TM. If the HLH determines that no upstream frame has been received, the HLH can interpret this as an indication that either a frame was received with a bad CRC or that no frame at all was received (i.e., no TMs are likely connected to the system). At block 1044 the HLH determines whether any signal has been received from the TM. If no frame has been received, it is likely that no TMs are connected and processing continues at block 1046 described further below. If the HLH determines that a signal was received from the TM at block 1044, then it is likely that a frame was received with bad CRC and processing continues at block 1048 describe further below.

Referring again to block 1042, if the HLH determines that an upstream frame has been received, then processing continues along the right portion of FIG. 22B. At block 1050 a reset_flag is set to zero. At block 1052 the HLH reads a message from the PCM field of the upstream frame. At block 1054 the HLH checks the CRC value associated with the PCM message. If there is a bad CRC then processing continues at block 1048 described further below. If the CRC is good then the HLH expects to see a REG_RESP message. If the REG_RESP message is received then at block 1060 the HLH determines whether the serial number received from the TM in the REG_RESP message matches with an expected serial number up to a certain number of bites indicated by the mask value. If there is a match then processing continues at block 1062 described further below; otherwise, processing continues at block 1066 (FIG. 22A).

Figure 22C:
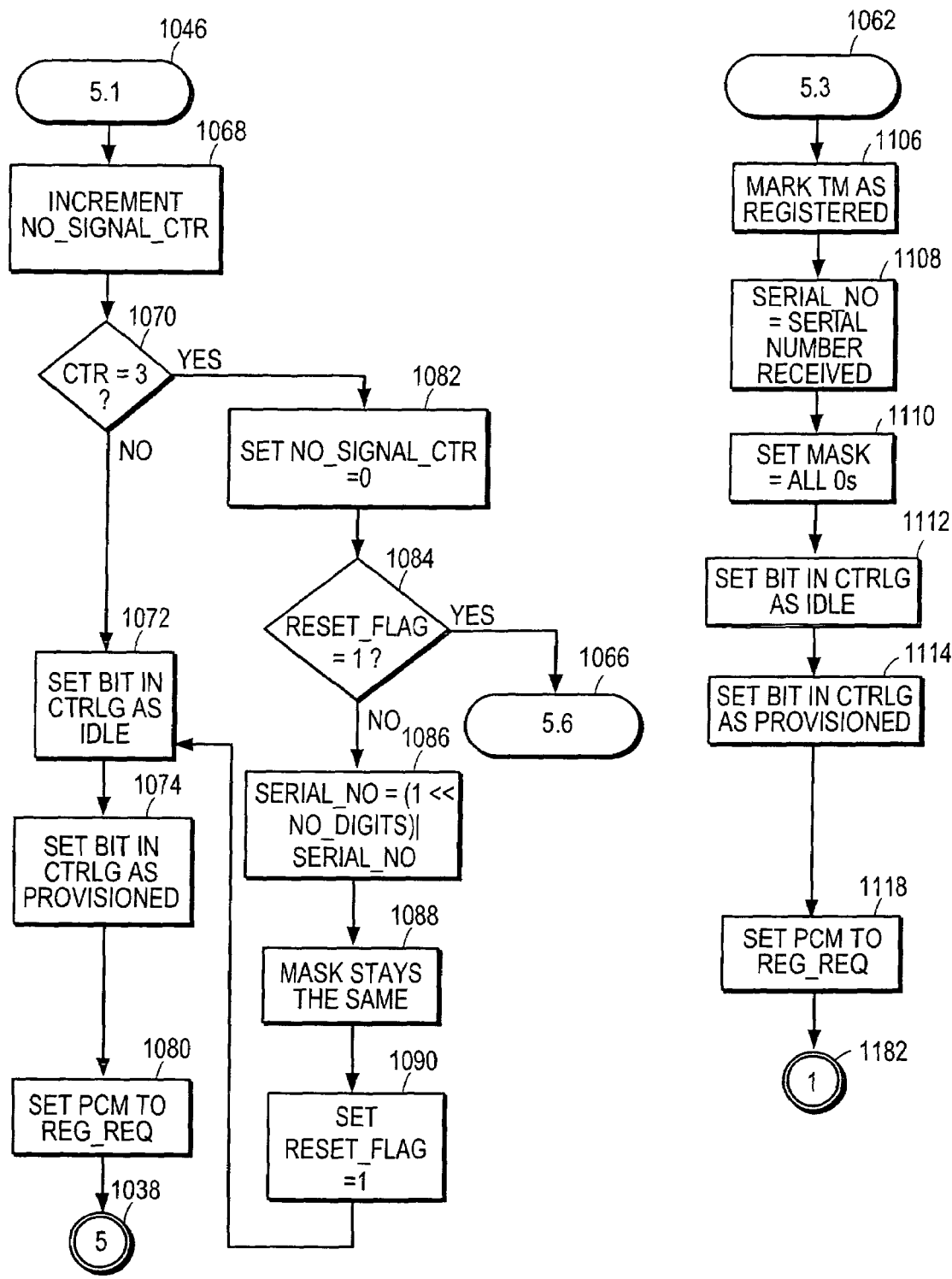

Referring now to FIG. 22C, there are shown two branches continuing from the processing shown in FIG. 22B. The branch on the left beginning with block 1046 relates to actions taken when the HLH determines that no signal was received on the particular TM at block 1046 (FIG. 22B). At block 1068 a counter labeled no_signal_ctr is incremented. At block 1070 this counter is tested to determine if it has reached a threshold value (e.g., 3). If the counter is not yet at the threshold, then processing continues at block 1072 and at block 1074 respectively wherein the appropriate bits in the CTRLG field are set to idle and provisioned. The REG_REQ message is set in the PCM field in the downstream frame at block 1080. At this point the HLH returns to the unregistered state at block 1038 (FIG. 22B).

If the counter reaches threshold at block 1070, then at block 1082 the no_signal_ctr counter is reset to zero and at block 1084 the reset_flag is checked. If the reset_flag equals 1, then processing continues at block 1066 (FIG. 22B). Otherwise at block 1086 the value of the serial_no variable is changed to flip the most significant bit from zero to one. The mask is kept the same at block 1088 and the reset_flag is set to 1 at block 1090. Processing continues at block 1072 as described above.

Referring now to the right side of FIG. 22C, the processing for the path beginning with block 1062 is described. Recall from FIG. 22B that block 1062 is selected when a match between a serial number received from the particular TM and the serial number expected by the HLH is confirmed. That is, a TM has successfully been registered as indicated at block 1106. At block 1108 the HLH stores the serial number that was received from the TM in variable serial_no. At block 1110 the mask is reset to all zeros, indicating that an exact match for all number of digits in the serial number is required. The following blocks 1112, 1114 and 1118, which correspond to the processing performed at blocks 1072, 1074 and 1080 described above, essentially renew the sending of the message REG_REQ to the particular TM. A transition is made from block 1118 to the not connected state (state 1) at block 1182 described further below.

Figure 22D:
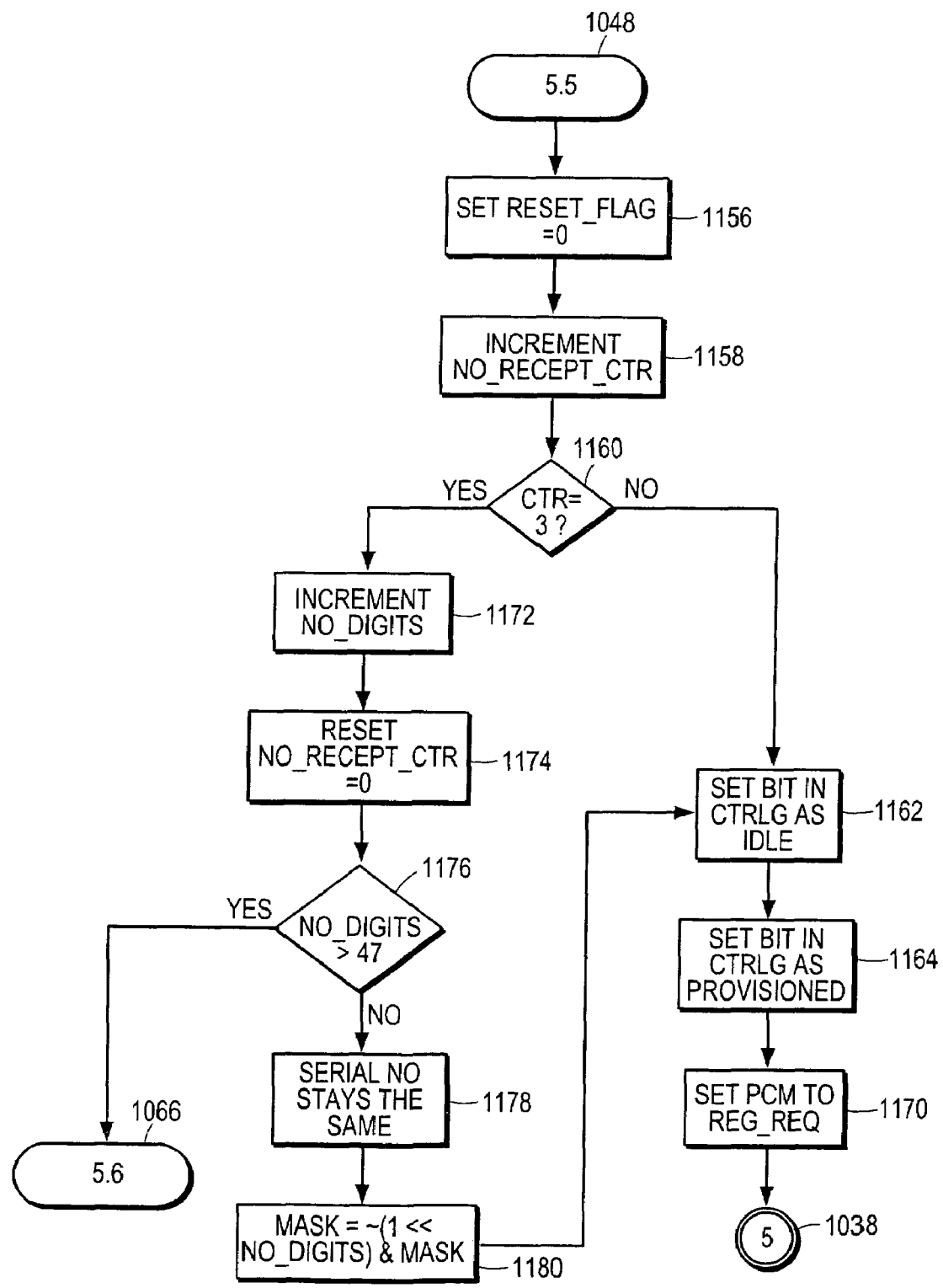

Referring now to FIG. 22D, the path starting at block 1048 is described. This path is encountered when there is more than one TM connected to the home LAN having the same dip switch setting (i.e., misconfiguration has occurred). At block 1156 the reset_flag is set to zero. A counter labeled no_recept_ctr is incremented at block 1158. At block 1160 this counter is tested to determine if it has reached a threshold value (e.g., 3). If the counter is not yet at the threshold, then processing continues at blocks 1162, 1164 and 1170, which correspond to the processing performed at blocks 1072, 1074 and 1080 described above to renew the sending of the message REG_REQ to the TMs. At this point the HLH returns to the unregistered state at block 1038 (FIG. 22B).

If the counter reaches threshold at block 1160, then at block 1172 the variable no_digits is incremented and at block 1174 the counter no_recept_ctr is reset to zero. The no_digits variable indicates the number of digits that need to match in order to have a valid registration. At block 1176 the no_digits is checked to determine if an upper limit (e.g., 47) has been reached. If the upper limit is reached, then processing continues at block 1066 (FIG. 22A); otherwise, processing continues at block 1178. At block 1178 the serial_no variable is kept the same and at block 1180 the mask is manipulated to indicate the number of digits needed to match. Processing then continues at block 1162.

Figure 22E:
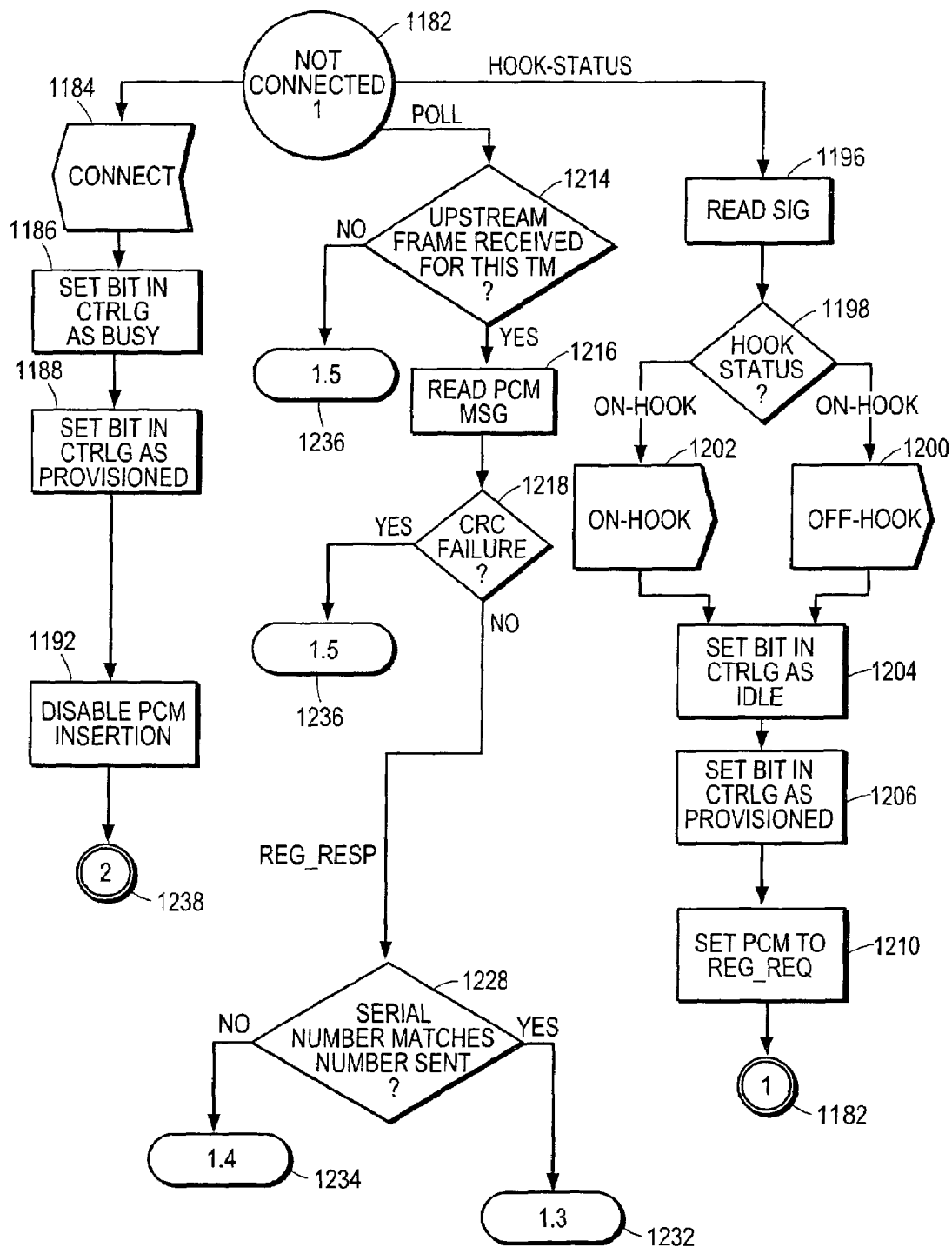

Referring now to FIG. 22E, the events and actions relating to transition from the not connected state (state 1) are described. The path beginning with block 1184 relates to call processing associated with receiving a connect message for an incoming call. At block 1186 the idle/busy bit in the CTRLG field of the downstream frame is set to busy. The provisioned/unprovisioned bit in the CTRLG field is set to provisioned at block 1188. PCM message insertion is disabled at block 1192, meaning that voice samples are to be carried in the PCM field. A transition is made to the connected state (state 2) at block 1238 described further below.

The path beginning with block 1214 relates to polling done by the HLH. If an upstream frame is not received at block 1214, then processing continues at block 1236 described further below. If an upstream frame is received, then at block 1216 the HLH reads a message from the PCM field of the upstream frame. At block 1218 the HLH checks the CRC value associated with the PCM message. If there is a bad CRC then processing continues at block 1236 described further below. If the CRC is good then the HLH expects to see a REG_RESP message. If the REG_RESP message is received then at block 1228 the HLH determines whether the serial number received from the TM in the REG_RESP message matches with the expected (registered) serial number. If there is a match then processing continues at block 1232 described further below; otherwise, processing continues at block 1234 also described below.

The path beginning with block 1196 relates to the HLH action of checking the on-hook/off-hook status of the TM while in the not connected state. In particular, at block 1196 the upstream SIG field (FIG. 19) for that TM is read. The hook status is determined at block 1198 and either an on-hook message (block 1202) or an off-hook message (block 1200) is sent by the HLH into the network for handling by the call processing adjunct 42 (FIG. 1). Meanwhile, the processing in blocks 1204, 1206 and 1210 proceeds as described with respect to blocks 1072, 1074 and 1080 (FIG. 22C) to keep alive the TM registration. This is followed by return to the not connected state at block 1182.

Figure 22F:
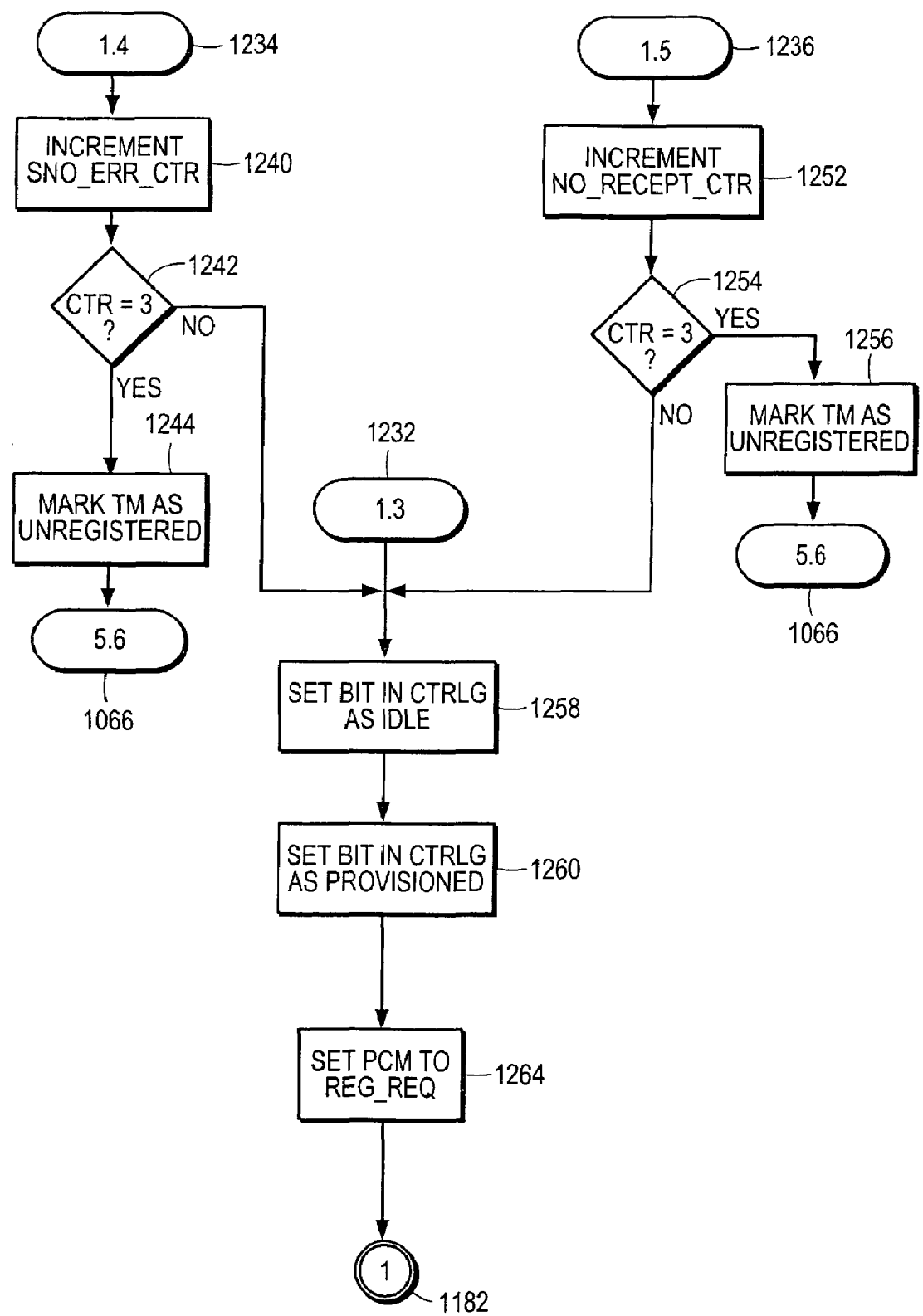

Referring now to FIG. 22F, further processing associated with events occurring in the not connected state are described. In particular, the path beginning at block 1234 increments and checks a serial number error counter sno_err_ctr at blocks 1240, 1242. After three error events, the TM is marked as unregistered at block 1244 and processing returns to block 1066 (FIG. 22A) with transition to the unregistered state. Likewise, the path beginning at block 1236 increments and checks the counter no_recept_ctr at blocks 1252, 1254. After three error events, the TM is marked as unregistered at block 1256 and processing continues at block 1066 (FIG. 22A). The path that begins at block 1232 provides processing in blocks 1258, 1260 and 1264 similar to blocks 1072, 1074 and 1080 (FIG. 22C) to keep alive the TM registration with return to the not connected state at block 1182.

Figure 22G:
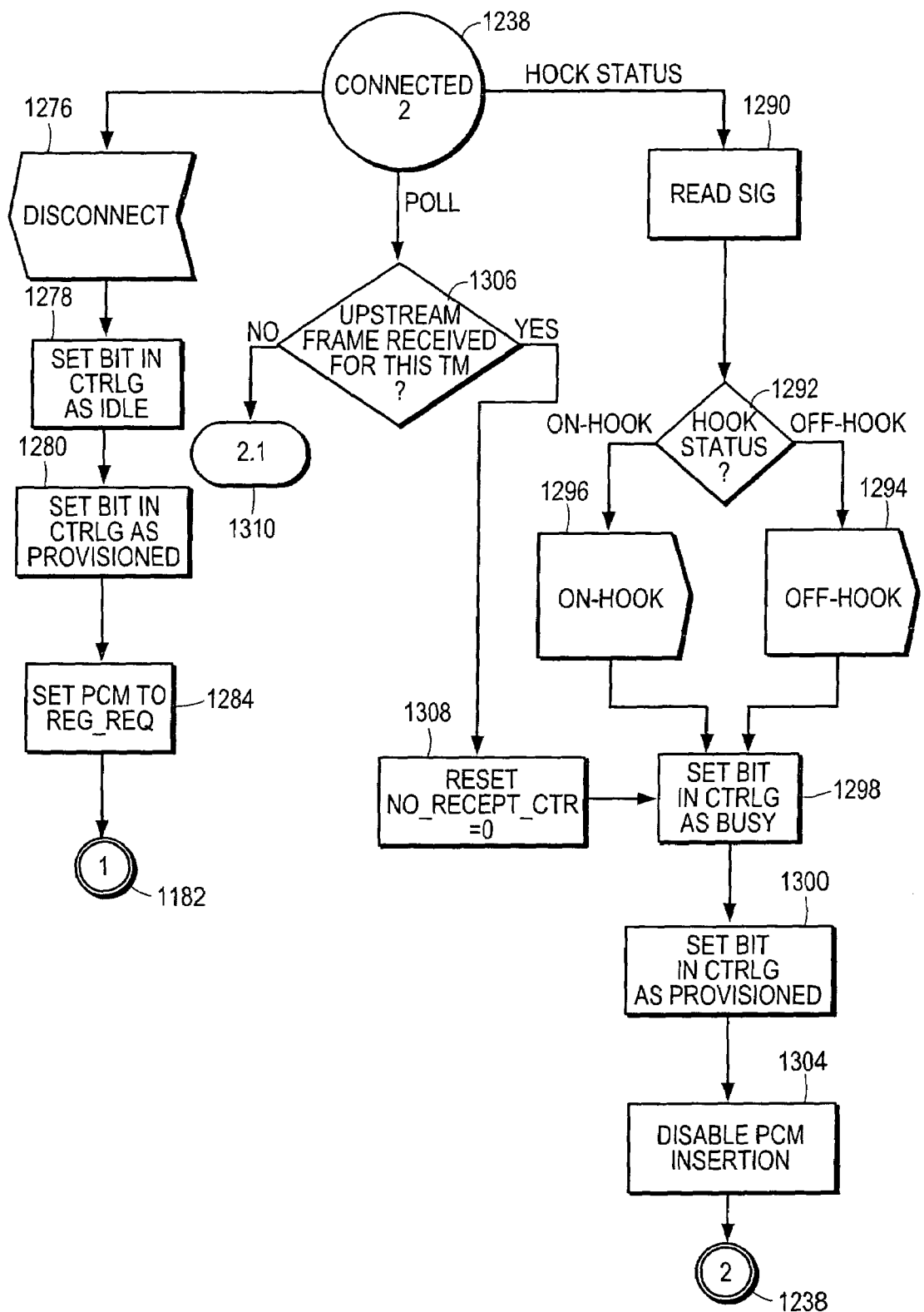

Referring now to FIG. 22G, the events and actions relating to transition from the connected state (state 2) are described. The path beginning with block 1276 relates to call processing associated with receiving a disconnect message for a current call due to either party hanging up. At block 1278 the idle/busy bit in the CTRLG field of the downstream frame is set to idle. The provisioned/unprovisioned bit in the CTRLG field is set to provisioned at block 1280. The REG_REQ message is set in the PCM field in the downstream frame at block 1284. At this point the HLH returns to the not connected state at block 1182 (FIG. 22E).

The path beginning with block 1306 relates to polling done by the HLH. If an upstream frame is not received at block 1306, then processing continues at block 1310 described further below. If an upstream frame is received, then at block 1308 the counter no_recept_ctr is reset and processing continues at blocks 1298, 1300 and 1304 which are similar to blocks 1186, 1188 and 1192 described above with respect to FIG. 22E. That is, voice samples continue to flow and the processing returns to the connected state block 1238.

The path beginning with block 1290 relates to the HLH action of checking the on-hook/off-hook status of the TM while in the connected state. In particular, at block 1290 the upstream SIG field (FIG. 19) for that TM is read. The hook status is determined at block 1292 and either an on-hook message (block 1296) or an off-hook message (block 1294) is sent by the HLH into the network for handling by the call processing adjunct 42 (FIG. 1). Meanwhile, the processing continues at block 1298 as described above for the path starting at block 1306.

Figure 22H:
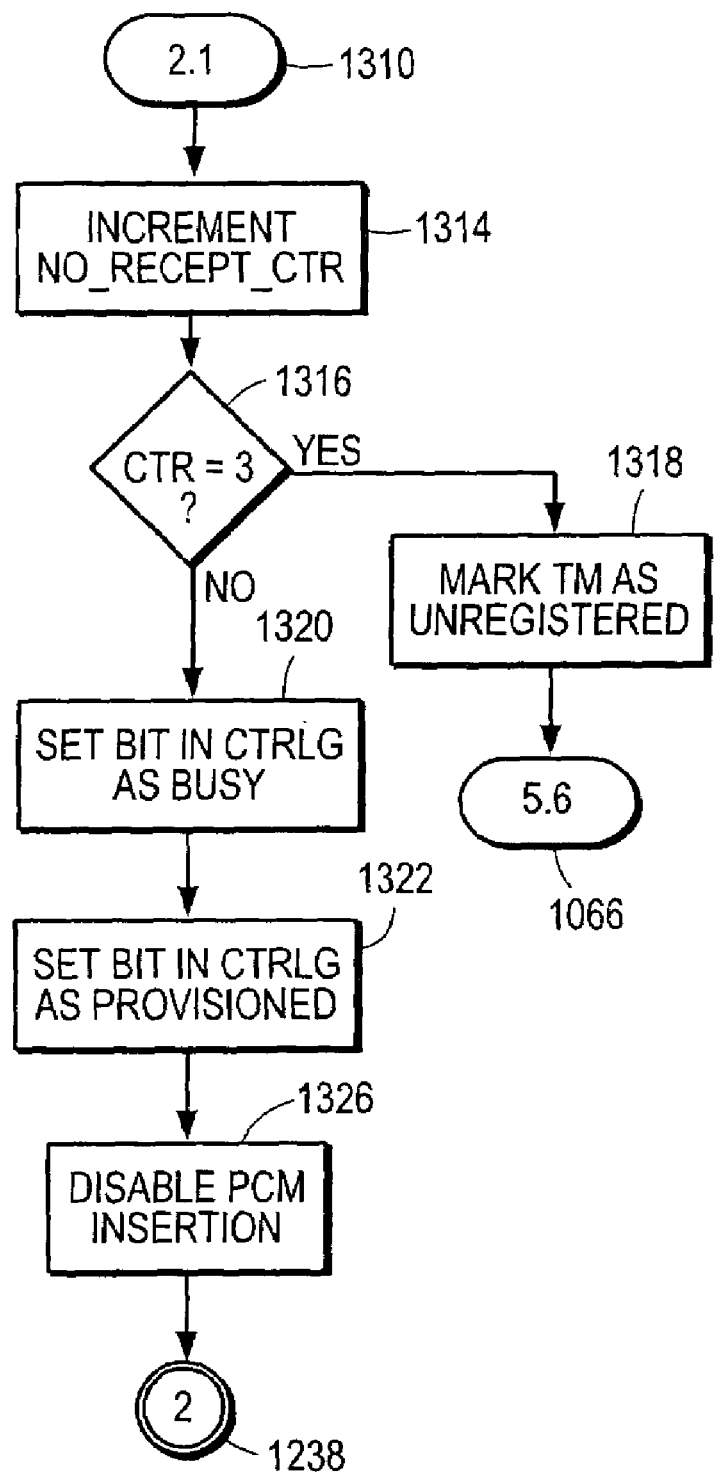

Referring now to FIG. 22H, further processing associated with events occurring in the connected state are described. In particular, the path beginning at block 1310 increments and checks a counter no_recept_ctr at blocks 1252, 1254. After three error events, the TM is marked as unregistered at block 1318 and processing returns to block 1066 (FIG. 22A) with transition to the unregistered state. If there are not yet three error events, processing continues in blocks 1320, 1322 and 1326 similar to blocks 1186, 1188 and 1192 (FIG. 22E) to keep alive the TM registration with return to the connected state at block 1238 (FIG. 22G).

Having described the state machines for the HLH, the state machine for the individual TMs is now described with reference to FIGS. 23A to 23E. As noted herein above, the TMs are slaved to the HLH; thus, the TMs get their operational status (i.e., how they are to operate) from the HLH.

Figure 23A:
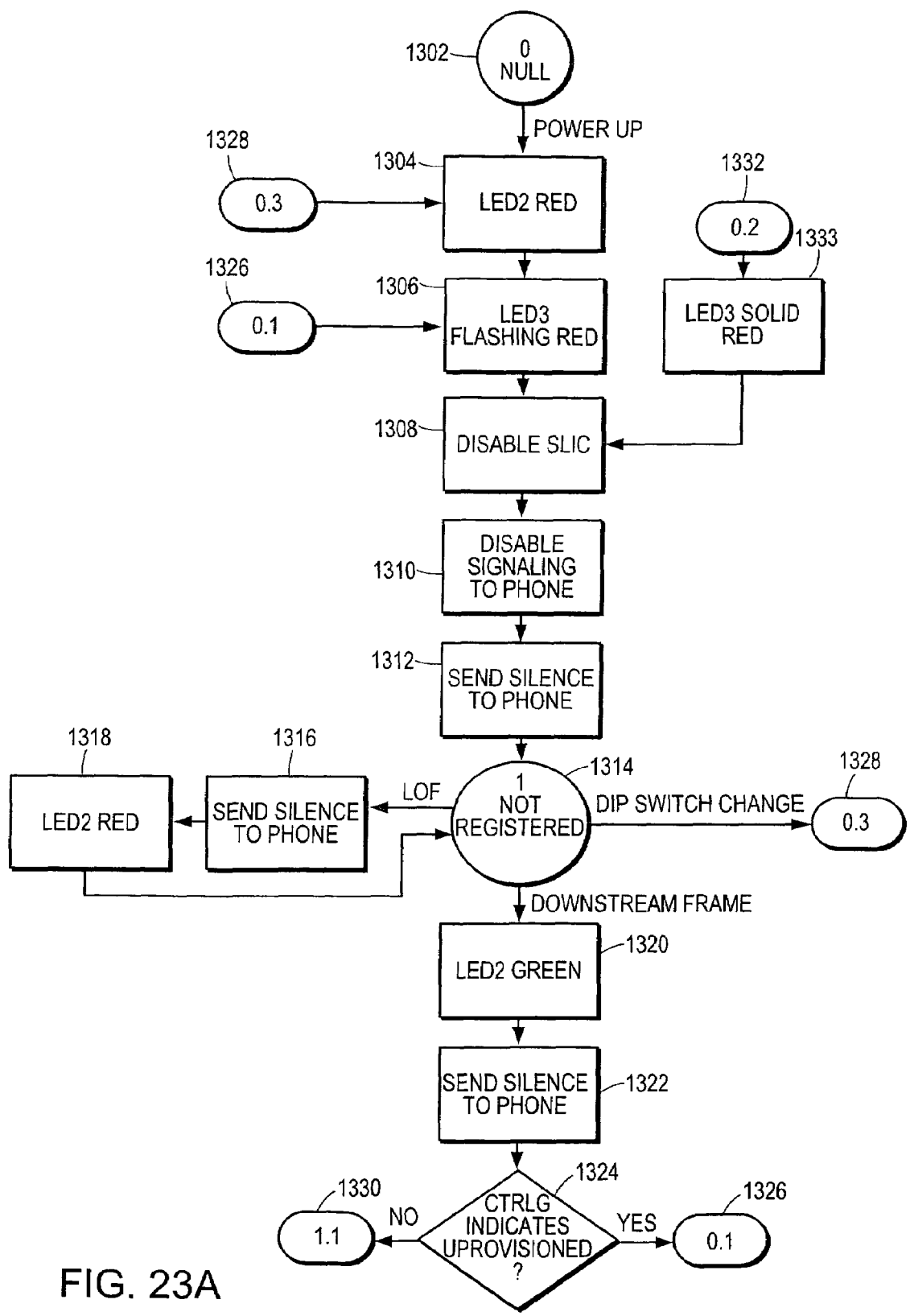
FIGS. 23A–23E are state machine diagrams for the telephone module of FIG. 4.

There are four states for the state machine at the TM: null (state 0), not registered (state 1), not connected (state 2) and connected (state 3). Referring to FIG. 23A, the TM powers up from the null state at block 1302. A series of actions denoted by blocks 1304, 1306, 1308, 1310, 1312 are performed by the TM prior to reaching the unregistered state at block 1314. The first action in blocks 1304, 1306 are to operate LED2 as red (indicating that the TM is not receiving downstream frames from the HLH) and LED3 as flashing red (indicating that the TM is unprovisioned). At block 1308 the SLIC portion 96 (FIG. 4) of the TM is disabled and at blocks 1310, 1312 the TM disables signaling to the connected telephone and sends it silence.

From the not registered state (state 1) there are three possible events: a loss of downstream frame (LOF), a change in dip switch setting of the TM and reception of a downstream frame. If there is loss of frame, the TM sends silence to the telephone at block 1316, operates LED2 as red at block 1318 and returns to the not registered state at block 1314. Upon a change in dip switch setting, the processing continues at blocks 1328, 1304. When a downstream frame is received, LED2 is operated as green at block 1320 (indicating that the TM is receiving downstream frames from the HLH) and silence is sent to the telephone at block 1322. The TM checks the provisioned/unprovisioned bit of the downstream CTRLG field (FIG. 18) at block 1324 to determine whether the HLH has marked the TM as provisioned or unprovisioned. If the TM is unprovisioned, then processing continues at blocks 1326, 1306. If the TM is provisioned, then processing continues at block 1330.

Figure 23B:
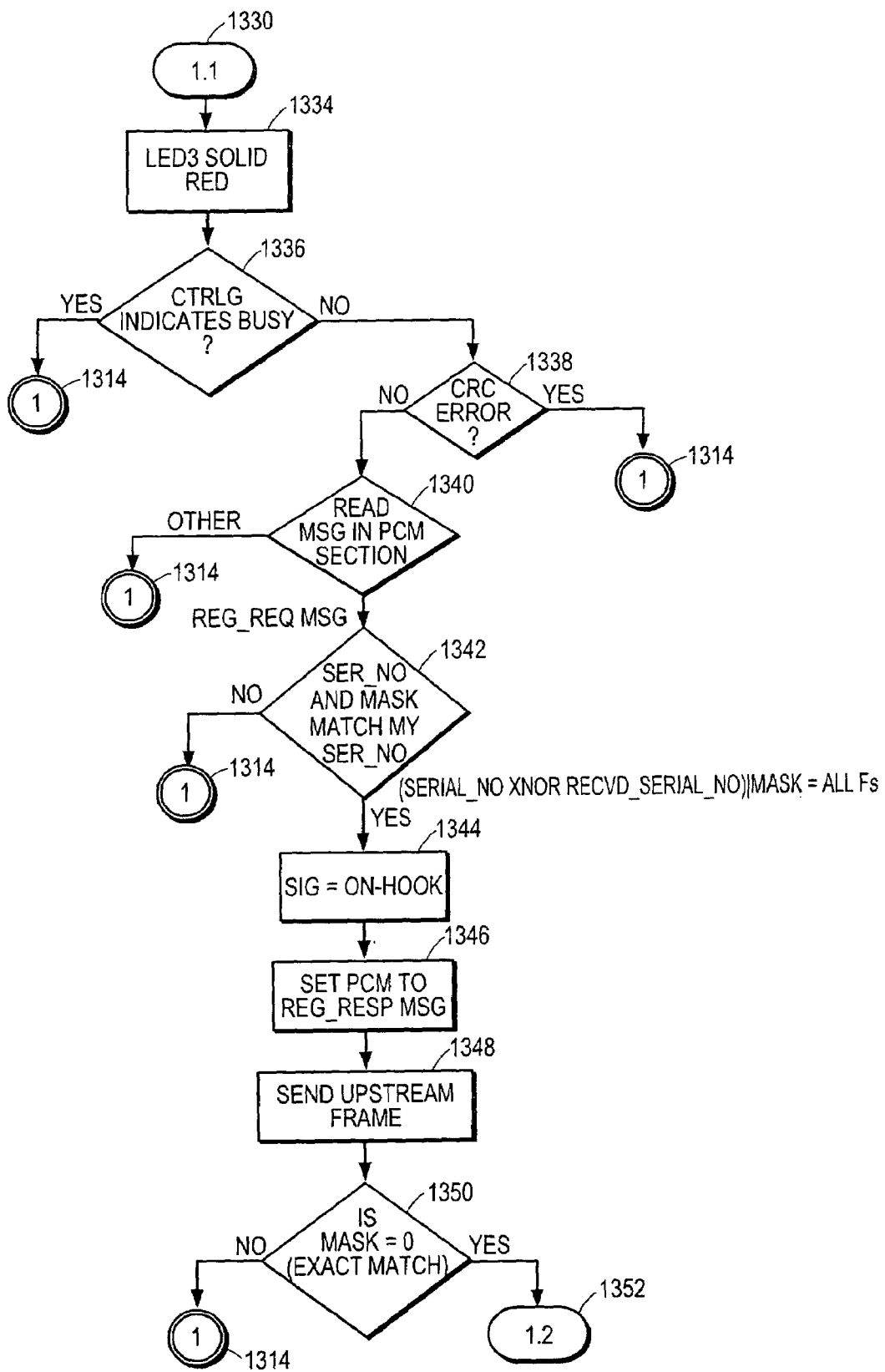

Referring now to FIG. 23B, the processing that begins for the provisioned TM at block 1330 is shown. At block 1334, LED3 is operated solid red to indicate that the TM is provisioned but not registered. At block 1336, the TM checks the idle/busy bit of the downstream CTRLG field (FIG. 18). If the status is busy, it is likely that another TM with the same dip switch setting is connected to the home LAN and is using the associated timeslot for a telephone call. The processing returns to the not registered state at block 1314 (FIG. 23A) if the status is busy. If the status is idle, then the TM determines whether there is an error in the CRC in the CTRLG field at block 1338. If there is a CRC error, it is likely that either a bad message was received or another TM having the same dip switch setting is interfering with this particular TM. Processing returns to the not registered state at block 1314 (FIG. 23A) if there is CRC error.

If there is no CRC error, then the TM reads the PCM message at block 1340 and expects to see a REG_REQ message. If this message is not received, then the processing continues at the not registered state at block 1314 (FIG. 23A). At block 1342, the TM checks whether the serial number and mask sent in the REG_REQ message match the serial number of the particular TM. If the TM does not see a match, then a possible misconfiguration has occurred and the processing again returns to the not registered state at block 1314 (FIG. 23A). If there is a match at block 1342, it means that the TM has matched its serial number with the serial number sent by the HLH up to the number of digits requested as indicated by the mask. Next the TM proceeds to set the SIG field in the upstream frame (FIG. 19) to an on-hook condition at block 1344, insert a REG_RESP message in the upstream PCM field at block 1346 and then send the upstream frame at block 1348.

At block 1350 the TM checks whether the mask sent in the REG_REQ message by the HLH is equal to zero (i.e., an exact match). If not true, then it means that the HLH has not registered a TM yet and processing continues at the not registered block 1314 (FIG. 23A). If true, then it means that this particular TM is being registered and processing continues at block 1352.

Figure 23C:
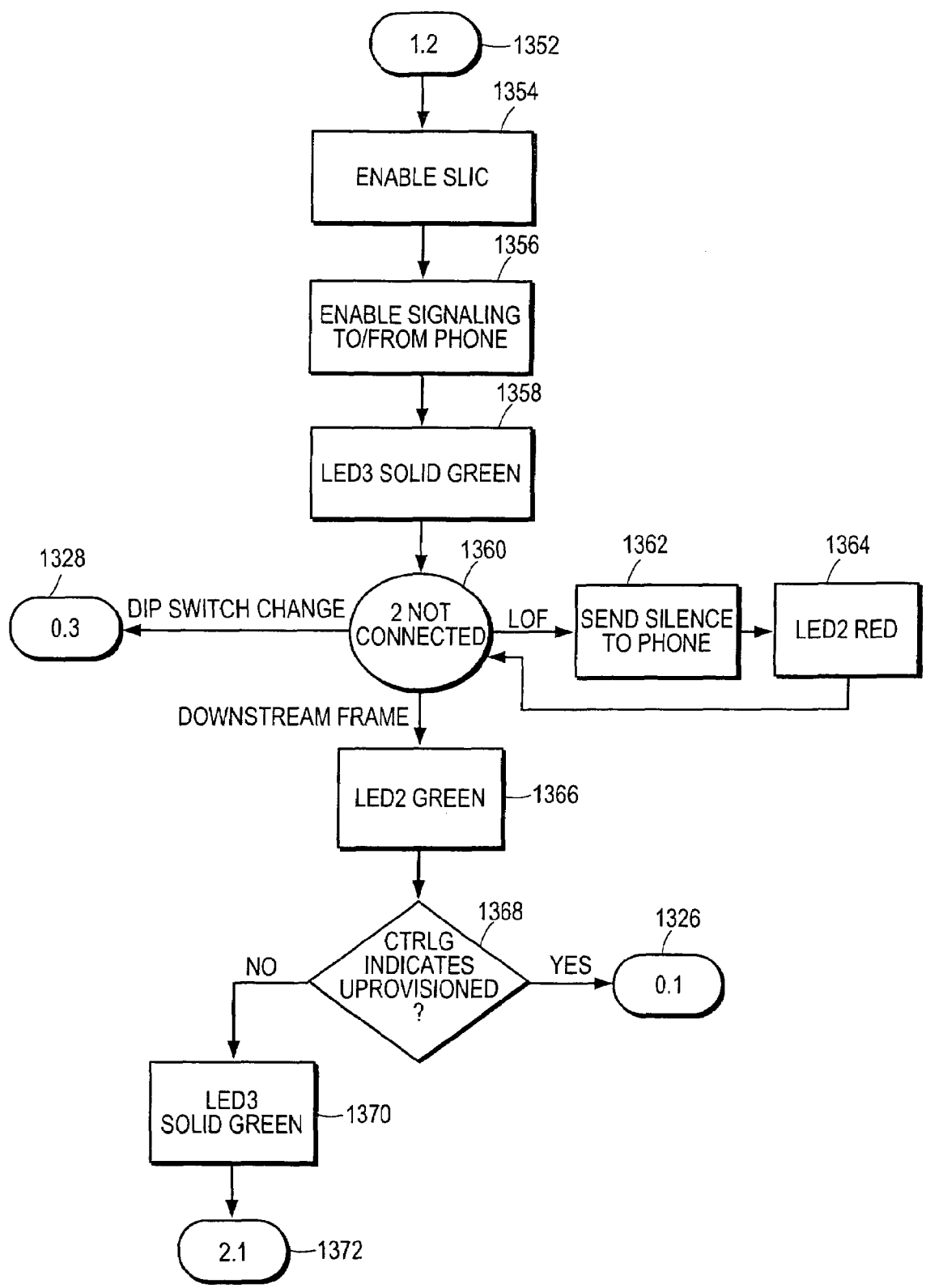

Referring now to FIG. 23C, the processing that begins at block 1352 for a provisioned and registered TM is shown. The TM enables the SLIC portion 96 (FIG. 4) at block 1354 and enables signaling to/from the telephone at block 1356 to allow proper signaling (on-hook, off-hook) to be sent to the HLH using ABCD bits in the upstream frame. At block 1358 LED3 is operated solid green to indicate that the TM is provisioned and registered. The TM transitions to the not connected state (state 2) at block 1360.

From the not connected state (state 2) there are three possible events: a loss of downstream frame (LOF), a change in dip switch setting of the TM and reception of a downstream frame. If there is loss of frame, the TM sends silence to the telephone at block 1362, operates LED2 as red at block 1364 and returns to the not connected state at block 1360. Upon a change in dip switch setting, the TM must be registered again and thus processing continues at blocks 1328, 1304 (FIG. 23A). When a downstream frame is received, LED2 is operated as green at block 1366 (indicating that the TM is receiving downstream frames from the HLH). The TM checks the provisioned/unprovisioned bit of the downstream CTRLG field (FIG. 18) at block 1368 to determine whether the HLH has marked the TM as provisioned or unprovisioned. If the TM is now marked as unprovisioned, then the TM must be registered again and processing continues at blocks 1326, 1306 (FIG. 23A). If the TM is marked as provisioned, then at block 1370 LED3 is operated as solid green (indicating provisioned and registered TM) and processing continues at block 1372.

Figure 23D:
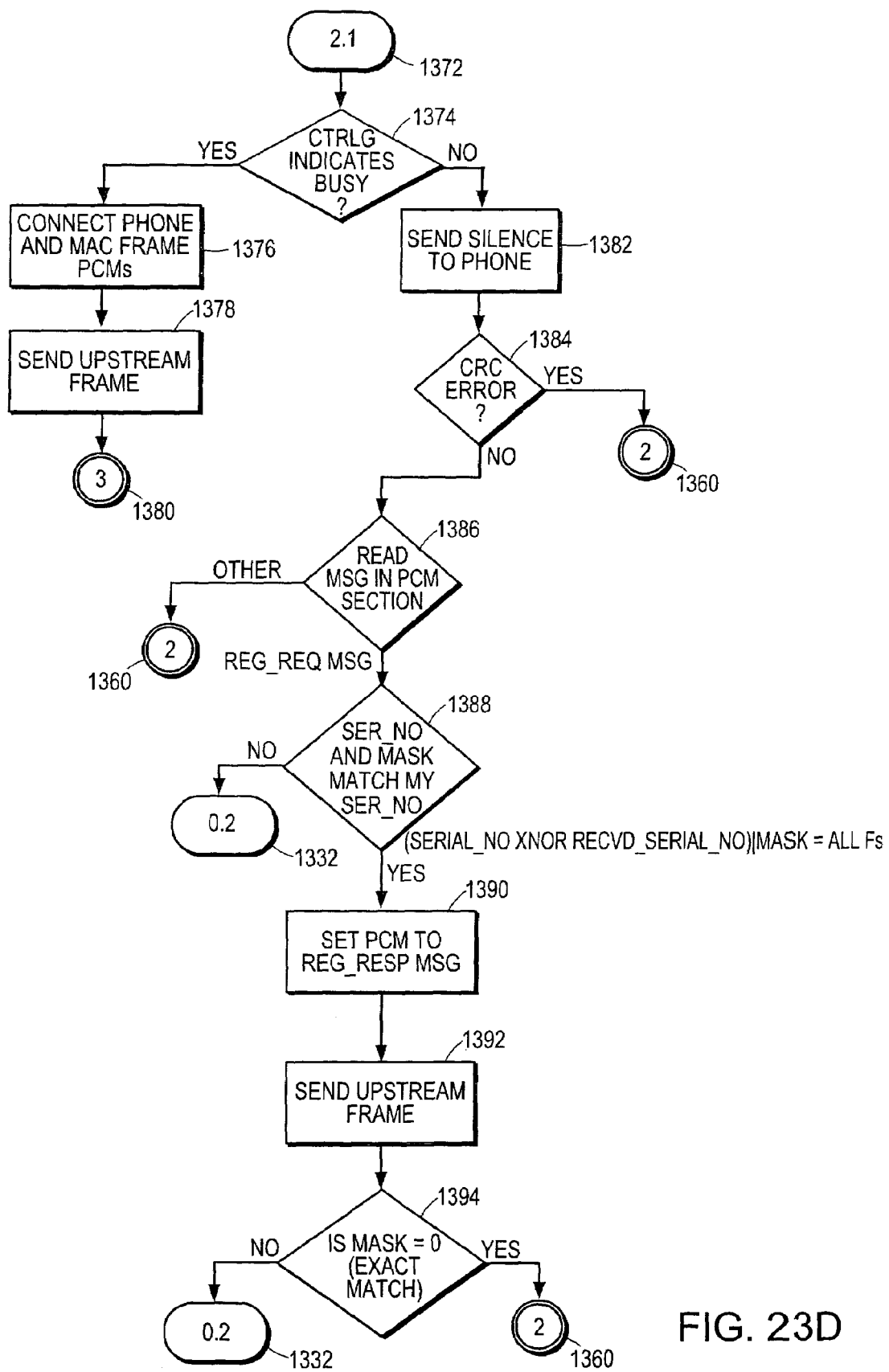
Figure 23E:
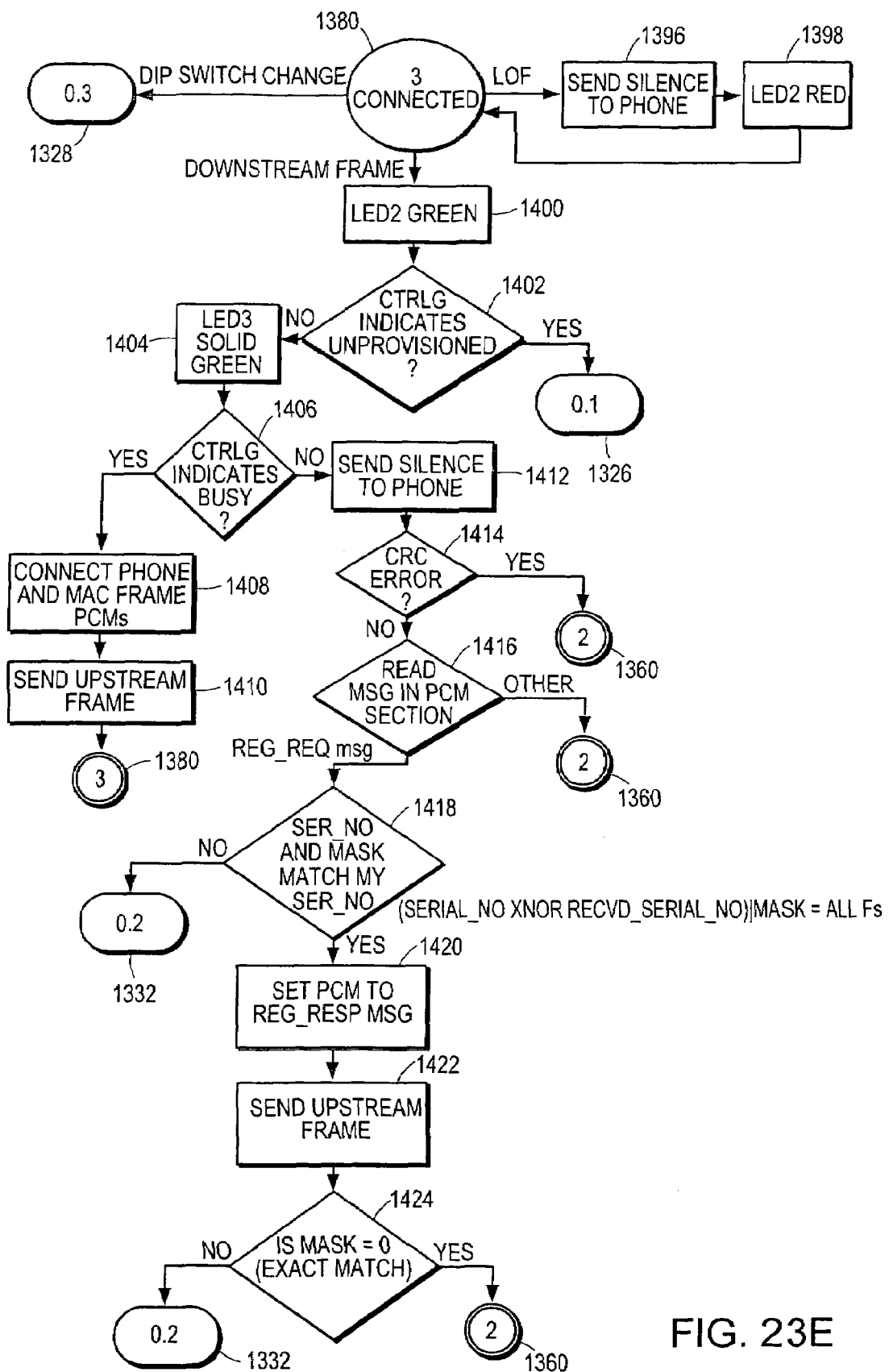

Referring now to FIG. 23D, the processing that begins for the provisioned and registered TM at block 1372 is shown. At block 1374, the TM checks the idle/busy bit of the downstream CTRLG field (FIG. 18). If the status is busy, this means that the HLH has detected an off-hook condition. The TM responds at block 1376 by converting voice samples received in the downstream PCM field to voice signals for the connected telephone. In addition, the TM sends voice samples from the connected telephone in upstream frames at block 1378 and the TM transitions to the connected state (state 3) at block 1380.

If the status at block 1374 is idle, the TM sends silence to the telephone at block 1382 and determines whether there is an error in the CRC in the CTRLG field at block 1384. If there is a CRC error, it is likely that either a bad message was received or another TM having the same dip switch setting is interfering with this particular TM. Processing returns to the not connected state at block 1360 (FIG. 23C) if there is CRC error.

If there is no CRC error, then the TM reads the PCM message at block 1386 and expects to see a REG_REQ message. If this message is not received, then the processing continues at the not connected state at block 1360 (FIG. 23C). At block 1388, the TM checks whether the serial number and mask sent in the REG_REQ message match the serial number of the particular TM. If the TM does not see a match, then a possible misconfiguration has occurred and the processing returns to blocks 1332, 1333 (FIG. 23A) where LED3 is operated as solid red to indicate that the TM is provisioned but not registered. If there is a match at block 1388, it means that the TM has matched its serial number with the serial number sent by the HLH up to the number of digits requested as indicated by the mask. Next the TM inserts a REG_RESP message in the upstream PCM field at block 1390 and sends the upstream frame at block 1392.

At block 1394 the TM checks whether the mask sent in the REG_REQ message by the HLH is equal to zero (i.e., an exact match). If not true, then processing continues at blocks 1332, 1333 (FIG. 23A). If true, then it means that this particular TM is registered and processing returns to the not connected state at block 1360 (FIG. 23C).

From the connected state (state 3) there are three possible events: a loss of downstream frame (LOF), a change in dip switch setting of the TM and reception of a downstream frame. If there is loss of frame, the TM sends silence to the telephone at block 1396, operates LED2 as red at block 1398 and returns to the connected state at block 1380. Upon a change in dip switch setting, the TM must be registered again and thus processing continues at blocks 1328, 1304 (FIG. 23A). When a downstream frame is received, LED2 is operated as green at block 1400 (indicating that the TM is receiving downstream frames from the HLH). The TM checks the provisioned/unprovisioned bit of the downstream CTRLG field (FIG. 18) at block 1402 to determine whether the HLH has marked the TM as provisioned or unprovisioned. If the TM is now marked as unprovisioned, then the TM must be registered again and processing continues at blocks 1326, 1306 (FIG. 23A). If the TM is marked as provisioned, then at block 1404 LED3 is operated as solid green (indicating provisioned and registered TM) and processing continues at block 1406. The processing shown in the remainder of FIG. 23E beginning at block 1406 is identical to the processing described above for FIG. 23D starting at block 1374.

3.0 Virtual Loop Gateway

As described above, the virtual loop gateway 40 (FIG. 1) provides the conversions necessary for transporting, controlling and managing ATM-based connections between the home LAN 15 and standard GR-303 interfaces at the local digital switch 50. Such conversions enable end users to access all of the calling services and features provided by the local digital switch 50 in a transparent manner. The call processing functional elements of the VLG 40 are shown in the end-to-end call control architecture diagram of FIG. 24. In particular, the VLG 40 includes call processing adjunct (CPA) 42 and ATM switch 44. The CPA 42 includes the following processing elements: call processing task 364, HLH task 365, switch controller task 366 and GR-303 timeslot management channel (TMC) agent 368. In addition, the CPA 42 includes the following tables stored in memory: call reference value (CRV) table 370, DS0 table 372 and cross-connect table 374. The CRV table is used to associate an incoming or outgoing call to a TM on an HLH. The DS0 table is used to track the status of a DS0 (i.e., idle, busy). The cross-connect table is used to track the status of cross-connection of a DS0 to a PVC terminating at a TM (i.e., connected, not connected).

The ATM switch 44, which can be a Cisco Systems BPX, includes switch control interface 44A, SONET OC-3 ATM switch interface 44B and AAL1 circuit emulation service module 46. The switch control interface 44A allows an external host, which in this case is the CPA 42, to command setup and tear down of virtual circuits in the ATM switch fabric over Ethernet interface 45. These cross-connect operations using interface 45 can be in accordance with the Multiservice Switching Forum proposed standard Virtual Switch Interface (VSI) protocol. The AAL1 circuit emulation service module 46 maps virtual circuits carrying 64 kbps voice into DS0s 49 for transport and termination on standard integrated digital terminal (IDT) 50A of the LDS 50.

In terms of call processing and communications flow, there are three types of call processing communication that occur: communication between the TMs 16 and the HLH 20; communication between the HLH 20 and the VLG 40; and communication between the VLG 40 and the LDS 50. The communication between the TMs 16 and the HLH 20 includes use of the CTRLG and SIG fields in the downstream and upstream MAC layer frames (FIGS. 18 and 19) as described above. Such TM-HLH communication is denoted by links 361 and call processing task 360 in FIG. 24. Communication between the HLH 20 and the VLG 40 includes call processing messages over home LAN signaling channels 362A and bearer channels 362B for AAL1 virtual circuits. Communication between the VLG 40 and the LDS 50 includes GR-303 signaling over TMC channel 49A and transport of DS1/DS0s 49.

The CPA 42 serves as a logical gateway from the packet or cell-based environment to GR-303 based voice networks. The two principal functions provided by the CPA 42 are to communicate with the LDS 50 using the GR-303 protocol and to communicate with the home LAN 15. In addition, the CPA 42 issues commands to the ATM switch control interface 44A to make and break ATM virtual circuits for bearer channels 362B in response to call processing messages it receives from the LDS 50 over GR-303 TMC channel 49A and from the HLH 20 over home LAN signaling channels 362A. That is, the CPA 42 performs conversion between AAL5 formatted signaling and management information from the home LAN 15 and GR-303 based formats for interfacing with the LDS 50 for call control and signaling.

The call processing communication over the home LAN signaling channels 362A includes call processing messages preferably in accordance with the Media Gateway Control Protocol (MGCP), a proposed Internet Engineering Task Force (IETF) standard that allows the CPA 42 to control the HLH 20 from a control plane (C-Plane) perspective. The use of MGCP for control provides an open, standards-based interface between the switching elements 44, 50 and the CPA 42. This gives service providers the flexibility to upgrade switching elements to next generation technologies without necessarily upgrading the control infrastructure. It should be noted, however, that other protocols can be used such as H.323 and Session Initiation Protocol (SIP).

The CPA 42 is the focal point for supporting end-to-end call control functions and includes a modular software architecture that links sub-system tasks using well-defined application programming interfaces (APIs). The TMC agent 368 handles all GR-303 TMC signaling protocol exchanges with the LDS 50. The TMC agent is linked to the call processing task 364 which in turn is linked to HLH task 365 which uses MGCP signaling towards the HLH 20 as noted above. The call processing task 364 also interacts with switch controller task 366 that initiates virtual circuit to DS0 cross-connect operations with the ATM switch using the VSI protocol. Channel associated signaling (CAS) information is carried in-band over the bearer channel virtual circuits 362B using AAL1 w/CAS encapsulation.

In the embodiment described above, the user plane is provided via ATM (i.e., AAL1 with CAS) terminating on the ATM switch while the control plane is provided via MGCP terminating on the CPA. In an alternate embodiment, the user and control planes can be combined. In particular, the CAS signaling which is transmitted along with the voice packets (e.g., AAL1, AAL2, AA5, IP) is backhauled to the CPA from the ATM switch. The CPA then looks at the CAS signaling (i.e., ABCD bits) and determines whether a telephone module has gone off-hook or on-hook. Thus, in this alternate embodiment, there is no need for MGCP or other control signaling.

Figure 25A:
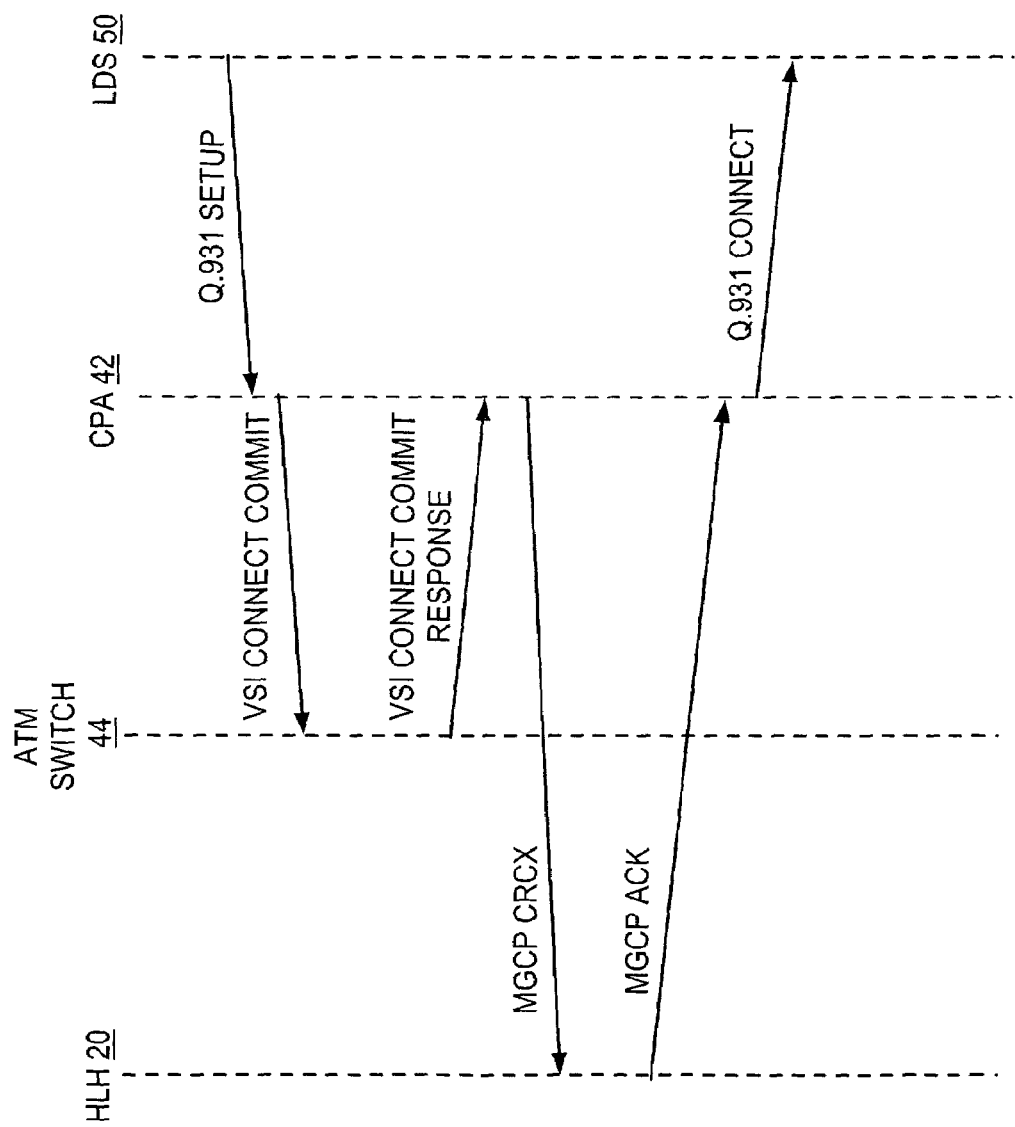
FIGS. 25A–25C show call processing flows for the call processing arrangement of FIG. 24.
Figure 25B:
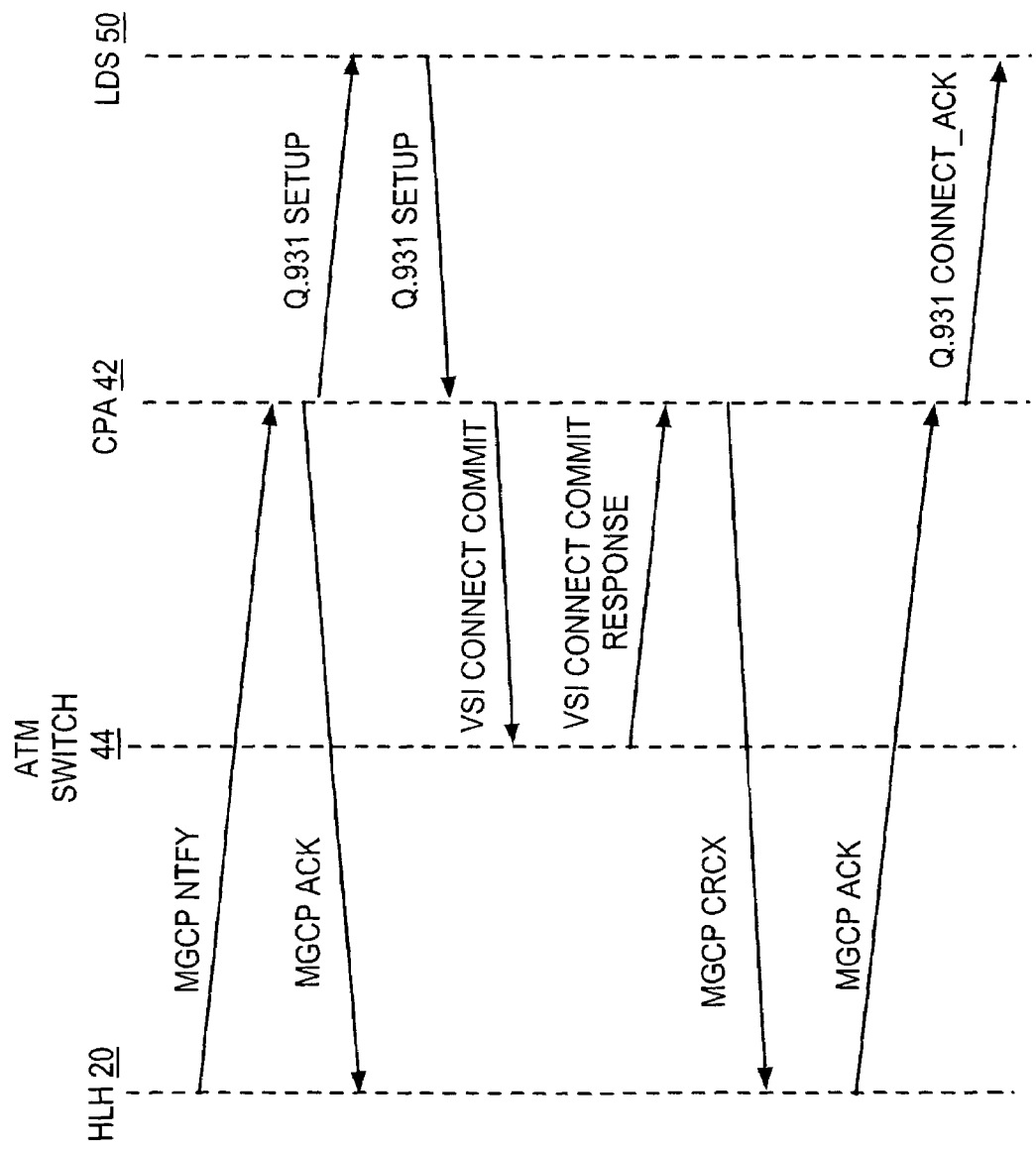
Figure 25C:
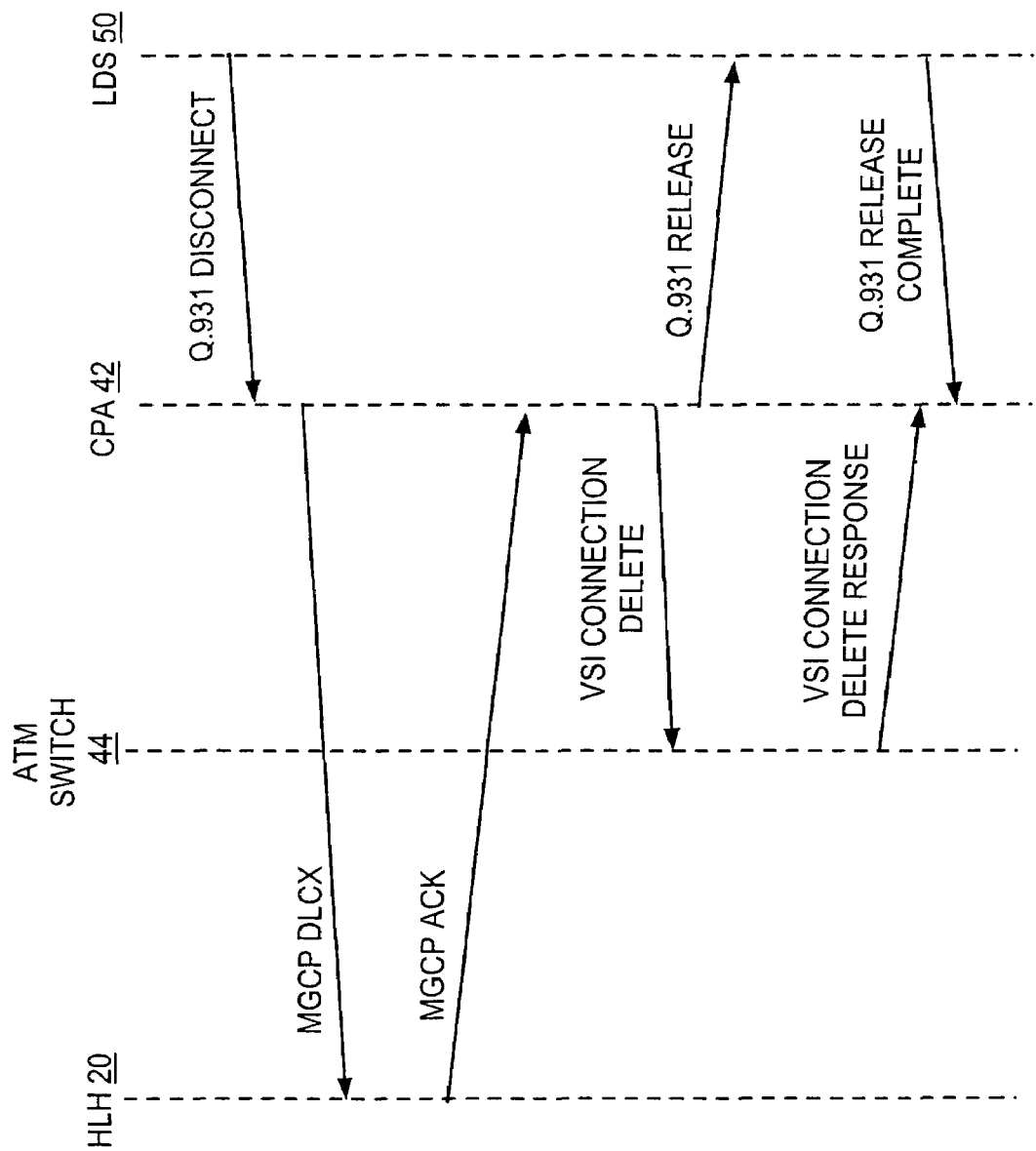

Referring now to FIGS. 25A to 25C, sample call processing flows with specific messaging between the LDS 50, CPA 42, ATM switch 44 and HLH 20 are shown.

Figure 24:
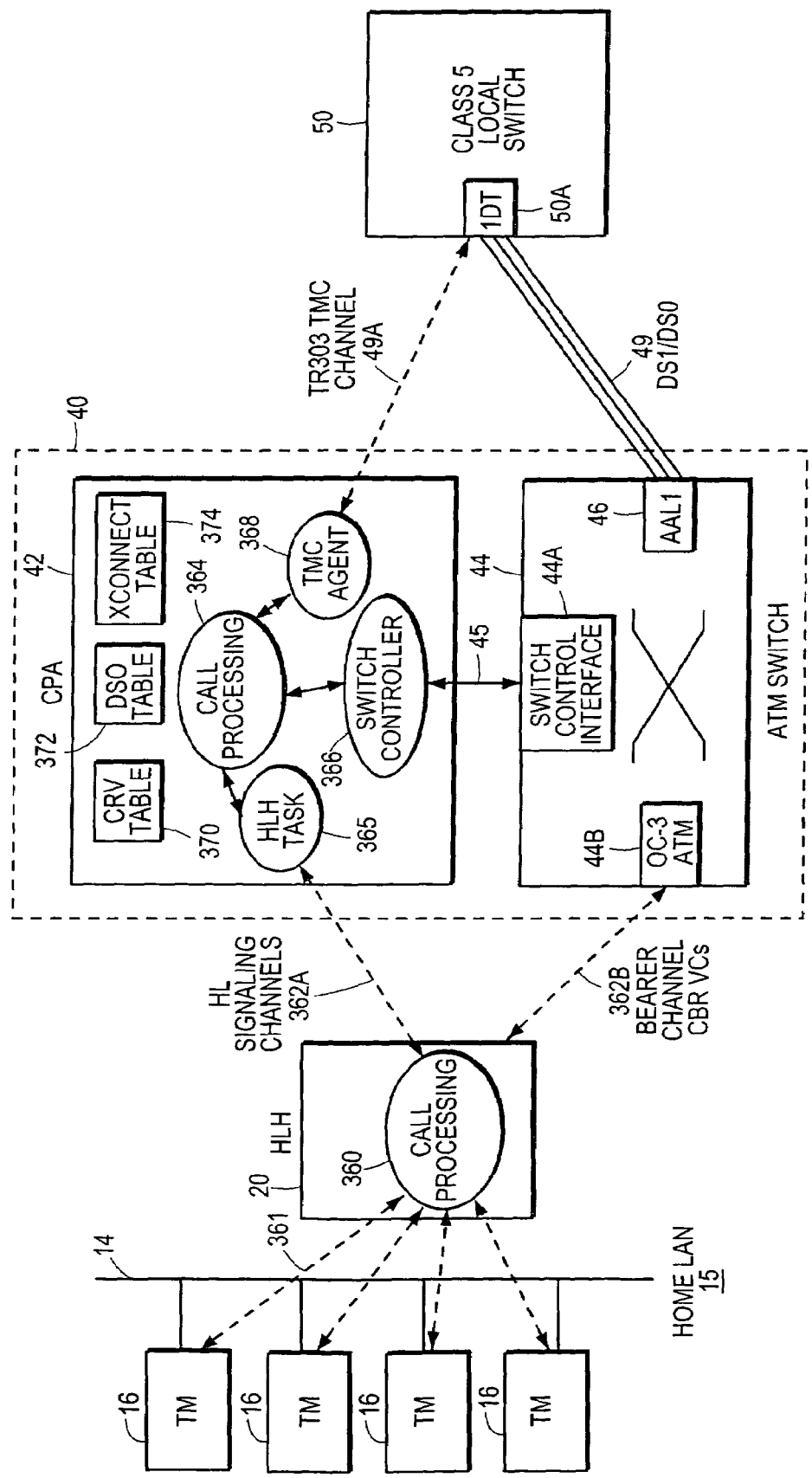
FIG. 24 is a block diagram of a call processing arrangement for the loop carrier system of FIG. 1.

FIG. 25A shows an example call flow for an incoming call. For an incoming call, the LDS 50 sends a GR-303 call setup message to the CPA 42 over the TMC channel 49A (FIG. 24). The CPA sends a connect message using VSI protocol from the switch controller task 366 to the switch control interface 44A of the ATM switch 44 to effect a cross-connect operation. The ATM switch acknowledges the connect message back to the CPA. The CPA also sends an call setup message using MGCP protocol over the HL signaling channel 362A to the HLH 20. The HLH 20 sends an MGCP connect message to the CPA in response. The CPA in turn sends a GR-303 connect message to the LDS over the TMC channel and the incoming call is connected through.

FIG. 25B shows an example call flow for an outgoing call. For an outgoing call, the HLH 20 sends an MGCP notify message to the CPA 42 over the HL signaling channel 362A (FIG. 24). The CPA in turn sends a GR-303 call setup message to the LDS 50 over the TMC channel 49A. In response, the LDS sends a GR-303 connect message to the CPA. Next, the CPA sends a VSI connect message from the switch controller task 366 to the switch control interface 44A of the ATM switch 44 to effect a cross-connect operation. The ATM switch acknowledges the connect message back to the CPA. The CPA sends an MGCP connect message over the HL signaling channel 362A to the HLH. The CPA then sends a GR-303 connect acknowledgment to the LDS and the outgoing call is connected through.

Referring to FIG. 25C, an example call flow for clearing a connected call is shown. To clear the call, the LDS 50 sends a GR-303 disconnect message over the TMC channel 49A to the CPA 42 (FIG. 24). The CPA sends an MGCP delete connection message over the HL signaling channel 362A to the HLH 20. In response, the HLH sends the CPA an MGCP acknowledge message. The CPA also sends a VSI disconnect from the switch controller task 366 to the ATM switch controller interface 44A. The ATM switch acknowledges the disconnect message back to the CPA. The CPA next sends a GR-303 release message to the LDS which responds with a release complete message and the call is cleared.

Details of the call processing tasks that run on the CPA are now described with reference to state machines shown in FIGS. 26A-26G and FIGS. 27A-27C for the call processing task and the HLH task, respectively.

Figure 26A:
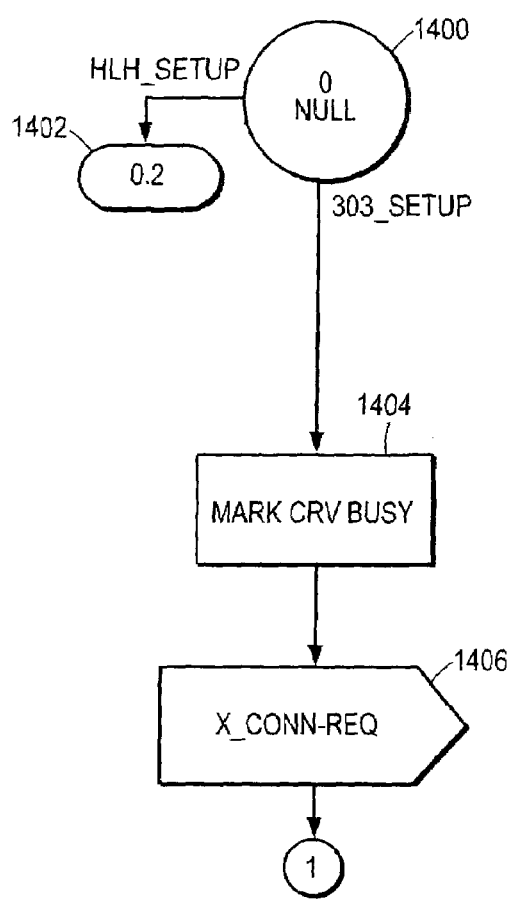
FIGS. 26A–26G are state machine diagrams for a call processing task at the call processing adjunct of FIG. 24.
Figure 26B:
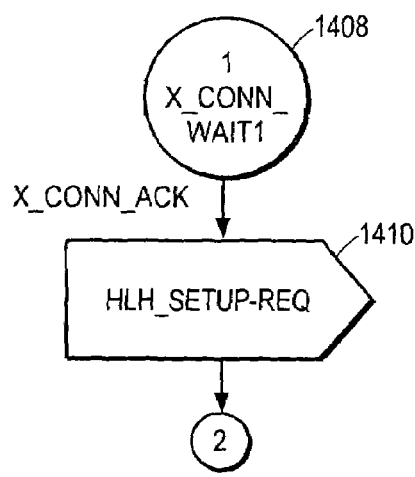
Figure 26C:
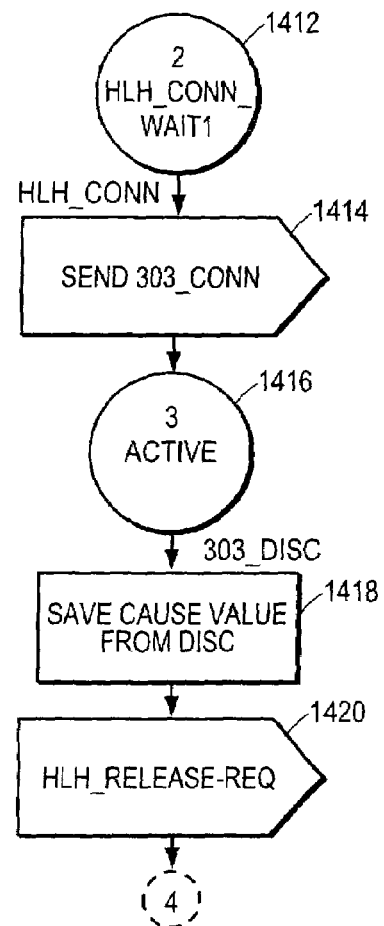

Referring now to FIG. 26A, an end point (i.e., TM) is in a NULL state 1400 while its not involved in a call. For an incoming call, a setup message (303_SETUP) is received via 303 interface (from the LDS). The software marks the call reference value as busy at 1404. Note that each TM has a CRV associated with it. The CRV can be thought of as being analogous to a phone number. A cross connect request is then sent to the ATM switch at 1406 and processing proceeds to state 1 at 1408 (FIG. 26B). Once an acknowledge message (X_CONN_ACK) is received from the ATM switch, the software send a setup request to the HLH task at 1410 and processing proceeds to state 2 at 1412 (FIG. 26C).

Figure 26D:
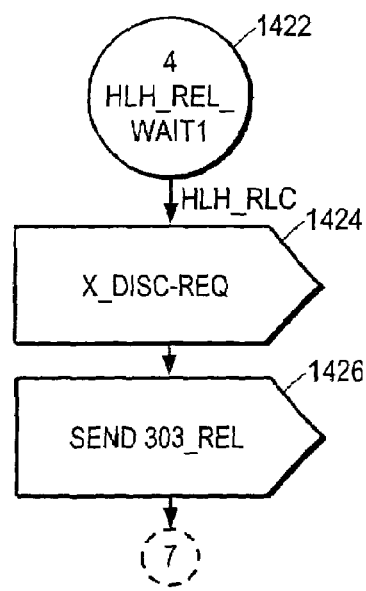
Figure 26E:
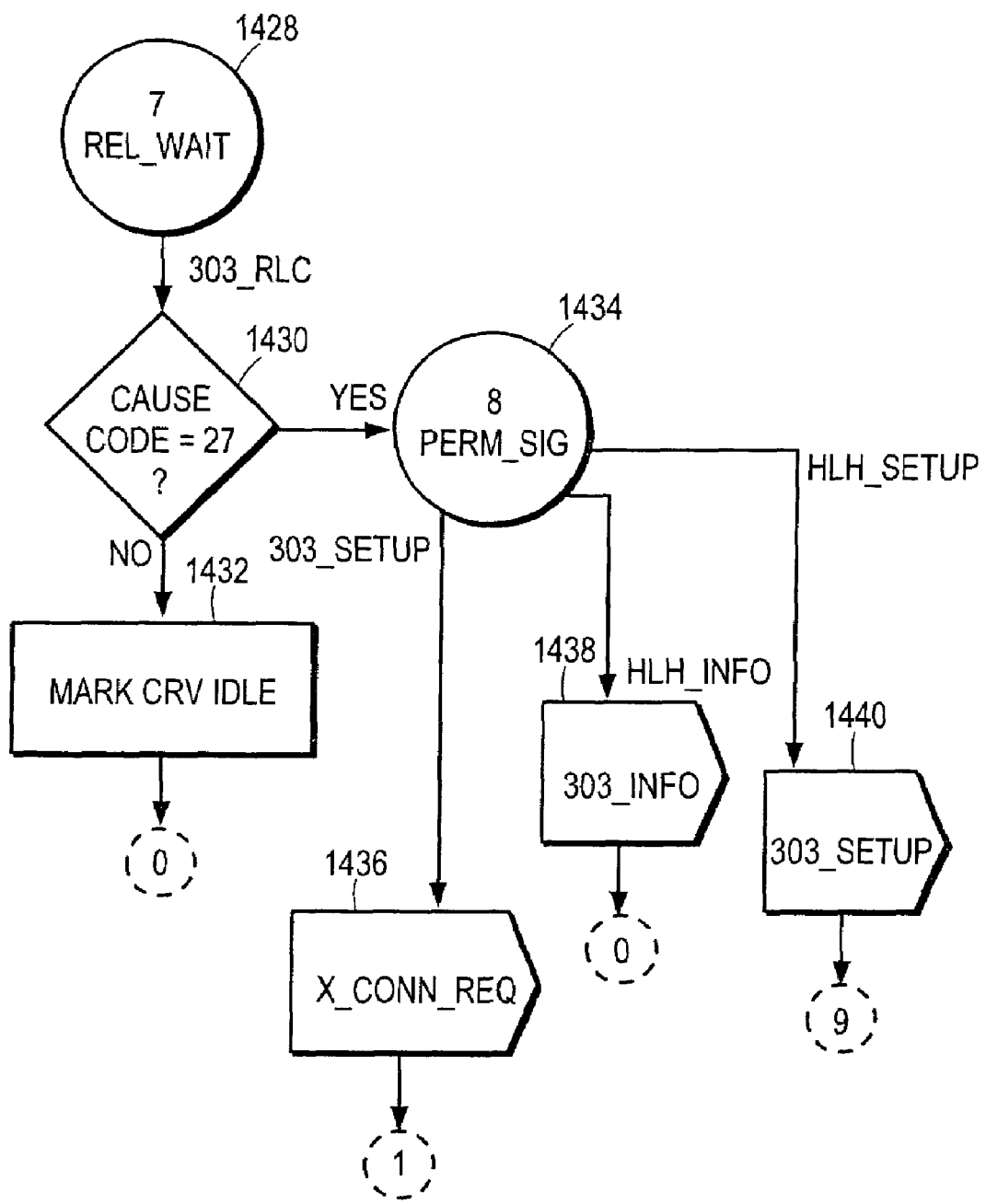

Once a connect message (HLH_CONN) is received from the HLH task (i.e., acknowledgment to setup request), the call processing task sends a connect message at 1414 via the 303 interface to the LDS and proceeds to the active state 3 at 1416. At this stage, the call is connected (i.e., conversation takes place). If any of the parties hang-up, a disconnect message (303_DISC) is received from the LDS. The cause code received within the message is saved at 1418, a release request message is sent to the HLH task and processing proceeds to state 4 at 1422 (FIG. 26D). Upon a release complete message (HLH_RLC) being received from the HLH task, a disconnect request is sent at 1424 to the ATM switch and a release message is sent at 1426 to the LDS via the 303 interface. Processing proceeds to state 7 at 1428 (FIG. 26E).

In state 7 the task is waiting for a release complete (303_RLC) from the LDS. If the cause code in the release complete is set to 27 at 1430, then processing continues at state 8; otherwise the CRV is marked idle at 1432 and processing continues at the NULL state. Once in state 8, an HLH info message (HLH_INFO) received from the HLH task causes the software to send a 303_INFO message at 1438 to the LDS and proceed to the NULL state. A setup message (303_SETUP) received from the LDS causes the software to send a cross connect request to the ATM switch at 1436 and processing proceeds to state 1 at 1408 (FIG. 26B). A setup message (HLH_SETUP) received from the HLH task at 1440 is handled as an outgoing call as described in the next section.

Figure 26F:
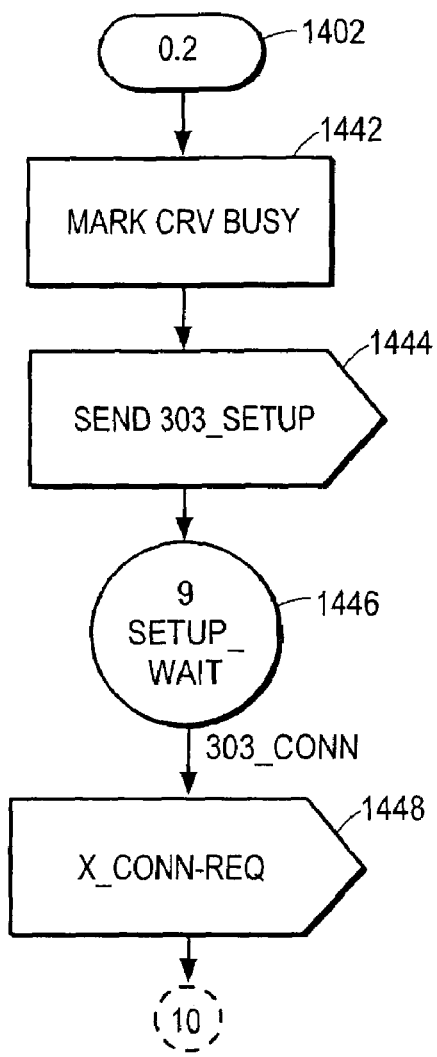
Figure 26G:
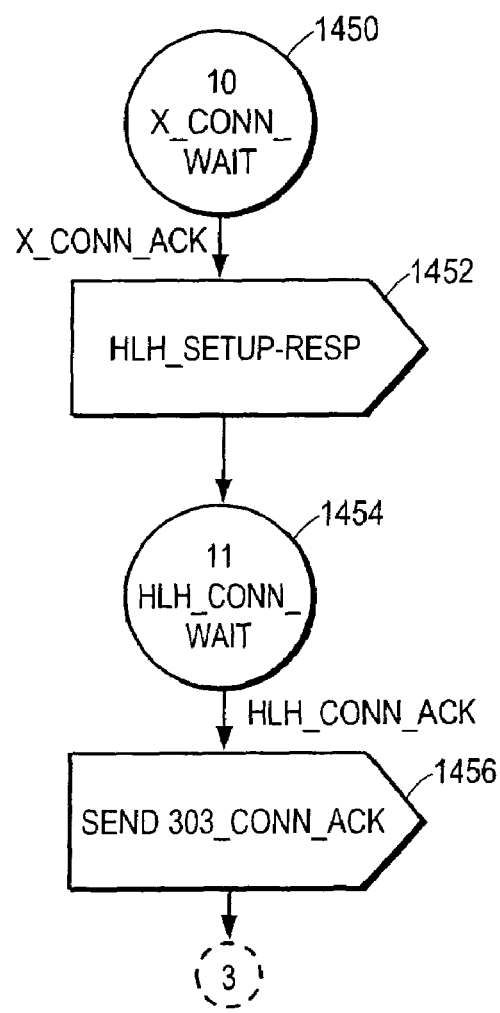

For an outgoing call (i.e., calls made from a TM to the LDS), a setup message is received from the HLH task while residing in state 0 (NULL). Referring to FIG. 26F, the CRV is marked busy at 1442 and a setup message is sent to the LDS at 1444 with processing proceeding to state 9 at 1446. In state 9, the task waits for a connect message (303_CONN) from the LDS. Once a connect message is received, a cross connect request is sent at 1448 to the ATM switch to cross connect a DS0 to the corresponding VC (ending at a TM) and the call is suspended in state 10 at 1450 (FIG. 26G). Once an acknowledge message (X_CONN_ACK) is received from the ATM switch in state 10, the flow continues by sending a setup request at 1452 to the HLH task and proceeding to state 11 at 1454. Once a connect acknowledge message (HLH_CONN_ACK) is received from the HLH task, a connect acknowledge message is sent to the LDS at 1456 and the call proceeds to the active state 3 at 1416 (FIG. 26C). A disconnect sequence is as described above.

Figure 27A:
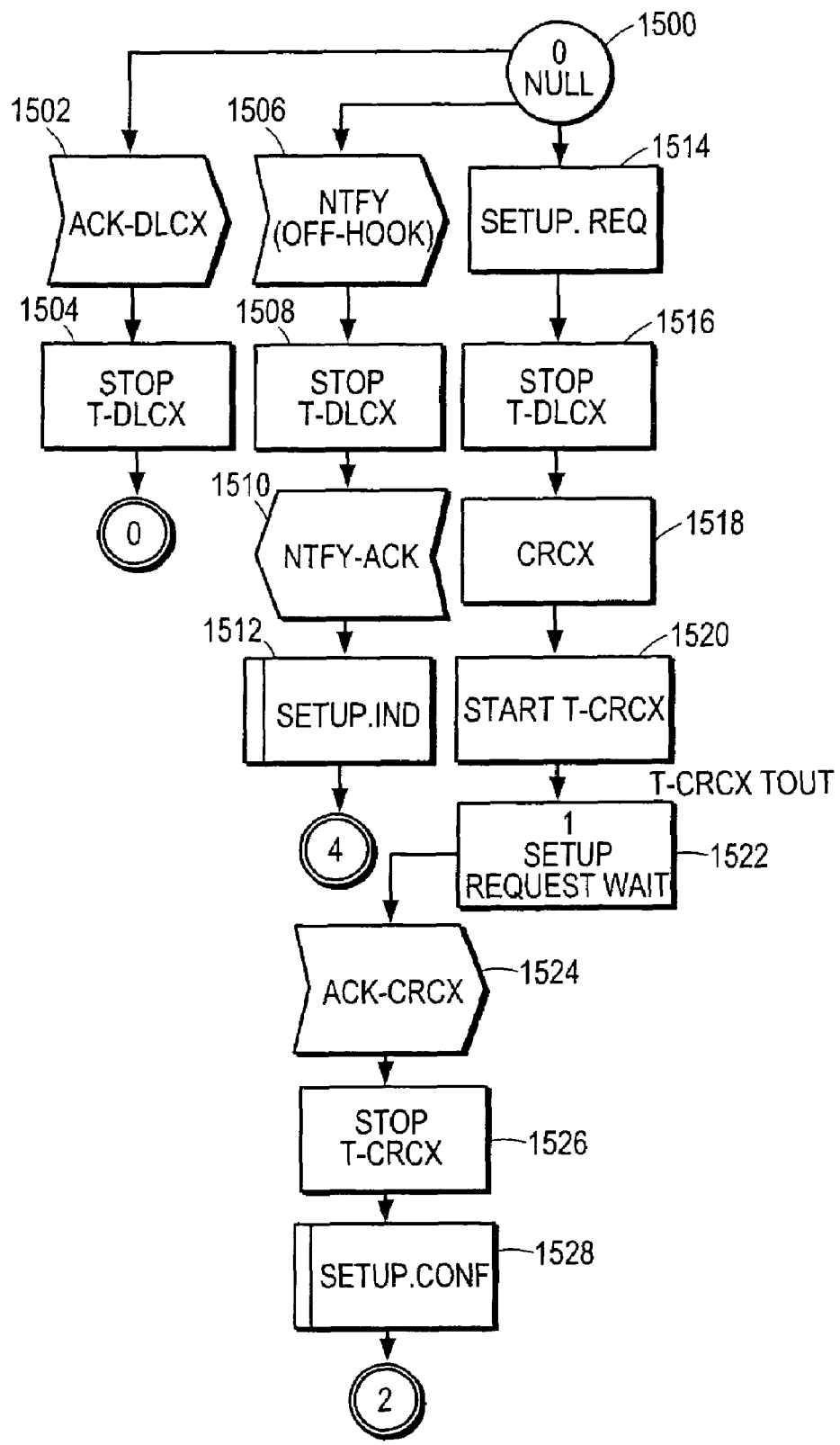

Referring to FIGS. 27A–27C, the HLH task state machines are now described. The HLH state machines are similar to the state machines described above in relation to FIGS. 26A–26G. The HLH task essentially receives messages via a predefined application programming interface (API) and translates them into MGCP messages. It should be understood that if a different protocol is used, e.g., SIP or H.323, then only the HLH task needs to be re-written to accommodate that protocol.

In the description that follows with respect to FIGS. 27A–27C, the following primitives are used:

| Primitive | Direction |
| --- | --- |
| Setup.Request | Call processing→Protocol |
| Setup.Response | Call processing→Protocol |
| Reject.Request | Call processing→Protocol |
| Release.Request | Call processing→Protocol |

-continued

| Primitive | Direction |
| --- | --- |
| Info.Request | Call processing→Protocol |
| Setup.Indication | Protocol→Call processing |
| Setup.Confirm | Protocol→Call processing |
| Reject.Indication | Protocol→Call processing |
| Release.Confirm | Protocol→Call processing |
| Info.Confirm | Protocol→Call processing |

In addition, the following timers are defined:

| Timer | Description | Value |
| --- | --- | --- |
| T-CRCX | Time to wait for CRCX response | 2 sec |
| T_DLCX | Time to wait for a DLCX response | 4 sec |

Referring to FIG. 27A, while no call is in progress every CRV/TM is in the NULL state at 1500. For an incoming call (i.e., calls coming from the LDS), a setup request is received at 1514 from the call processing task. Any outstanding DLCX timers are stopped at 1516 and a create connection message (CRCX) is sent at 1516 to the HLH via the MGCP interface. A timer is also started at 1520 to repeat sending this message if an acknowledgment is not received from the HLH. The call proceeds to state 1 at 1522. If the CRCX timer times out, a CRCX is resent to the HLH and a new timer is started at 1518, 1520. In state 1, once an acknowledgment to a CRCX is received at 1524 the CRCX timer is stopped at 1526, a setup confirm (i.e., HLH_CONN as described above) is given to the call processing task at 1528 and the call proceeds to state 2 (call is active) at 1530 (FIG. 27B). In state 2, if a release request is received at 1532 from the call processing task, a Delete connection (DLCX) is sent to the HLH at 1534 and a timer is started at 1536 to resend this message if an acknowledge is not received on time and the call proceeds to state 3 at 1538. Once an acknowledgment is received for a DLCX at 1540, the DLCX timer is stopped at 1542, a release confirm (i.e., release complete as described above) is sent to the call processing task at 1544 and the call proceeds to the NULL state at 1500 (FIG. 27A).

Referring again to FIG. 27A, for an outgoing call, a notify message is received from the HLH at 1506 indicating that a telephone module has gone off-hook (state 0). The software stops any outstanding DLCX timers at 1508, a notify acknowledgment is sent back to the HLH at 1510 and a setup indication is sent to the call processing task at 1512. The software proceeds to state 4 at 1546 (FIG. 27C). In state 4, once a setup response is received from the call processing task at 1548, a create connection is sent to the HLH at 1550, a timer is started at 1552 to resend this message in case an acknowledge is not received from the HLH in time, and the call proceeds to state 5 at 1554. Once an acknowledgment is received for the CRCX from the HLH at 1556, the timer is stopped at 1558 and a setup confirm (i.e., connect ack) is sent to the call processing task at 1560 with processing continuing at active state 2 (1530, FIG. 27B).

4.0 System Management

In traditional telecommunications equipment, the internal management information of a network element is usually made available through an SNMP interface, a command-line interface (e.g., TTY or telnet) or a specialized (and often proprietary) protocol. The network element is typically managed only by its associated element management system. This approach makes it difficult to share management information from the network element across the different operations support systems (OSSs) that might already be in place in the PSTN. When such sharing is necessary, it is generally done by providing a special communications link between the element manager and a specific operations support system. This approach is limiting because the interface at the network element may not have provided the information required by the legacy OSS. In addition, the element manager then must always be active for the OSS to operate. This reduces the reliability of the resulting network because the element manager is typically an ordinary PC or UNIX-based, desktop workstation rather than a high-reliability network element. This often means that costly development work is needed in the element manager, the OSS, and the network element itself to provide this capability.

In the CPA 42 (FIG. 1) of the present invention, a novel approach is used that alleviates these problems. Rather than build the managed objects in the network element using a proprietary scheme, a management subsystem in the CPA is built around a CORBA (Common Object Request Broker Architecture) server at its core. All of the managed objects are written as CORBA objects and so all of the capabilities of the network element are available through a CORBA interface. A CORBA interface definition language (IDL) specification for the CPA is provided as an Appendix.

Figure 28:
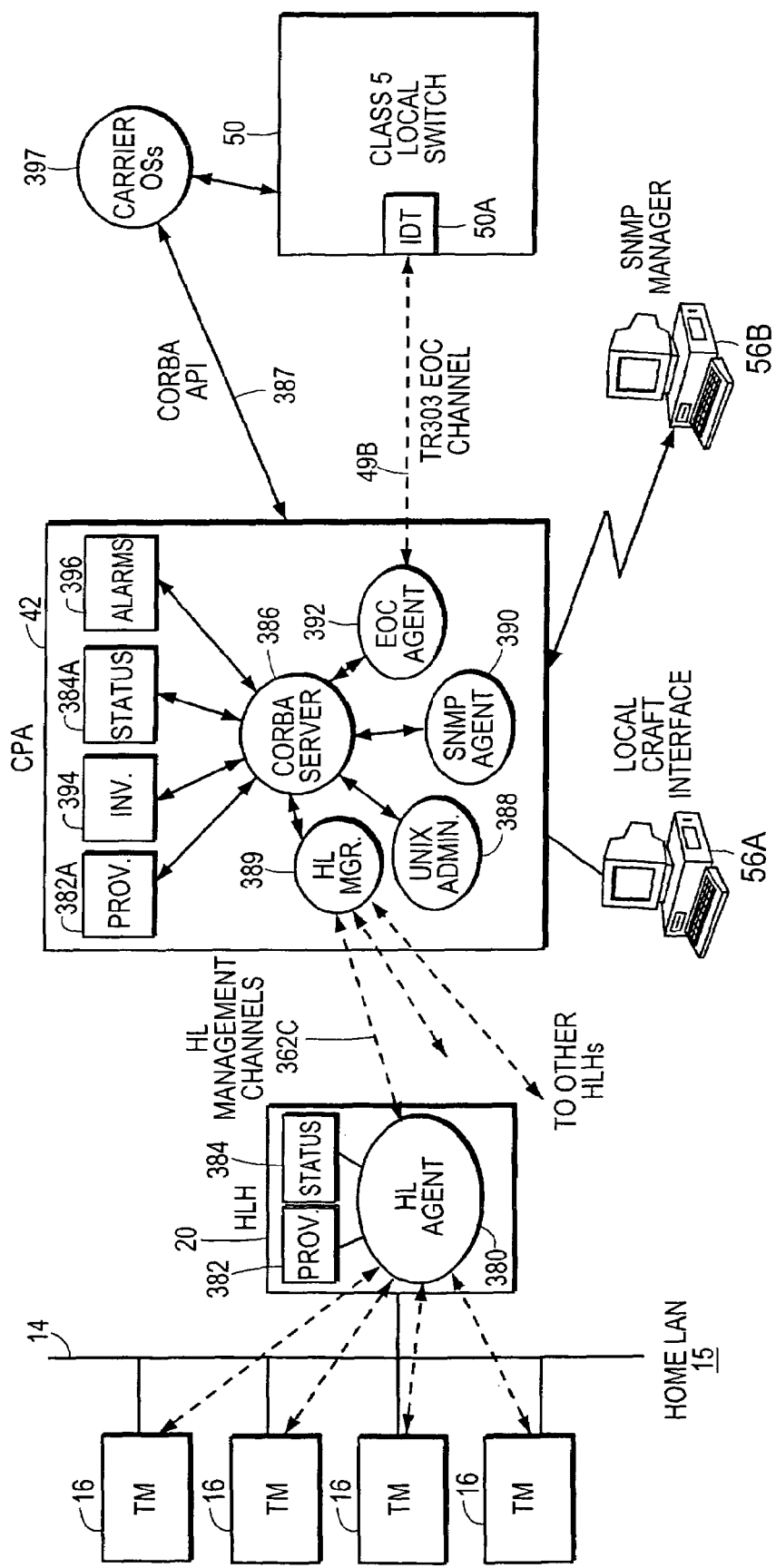
FIG. 28 shows a management plane architecture diagram for the loop carrier system of FIG. 1.

FIG. 28 shows the management plane architecture diagram for the end-to-end system. The CPA 42 is the focal point for supporting all end-to-end system level management functions. The CPA 42 interacts with the LDS 50 over the GR-303 embedded operations channel (EOC) to provide a rich set of OAM capabilities and functions that assist in the provisioning, monitoring, testing and maintenance of all system components including the TMs 16 and HLHs 20. In this management plane view, the HLH 20 includes an HL agent 380 and sub-systems for provisioning 382 and element status monitoring 384. An EOC agent 392 in the CPA 42 provides an implementation of GR-303 managed objects, handles scoping and filtering of switch requests and constructs event reports as required. The EOC operations messages support system alarms, performance monitoring and provisioning functions. The CPA 42 further includes a home LAN manager 389, an SNMP (simple network management protocol) agent 390 and general UNIX administration utilities 388. Multiple HLHs 20 are managed from the CPA 42 through management channels 362C to HL agents 380 to support all provisioning, maintenance and testing functions. The HL manager 389 includes a home LAN management information base (MIB) for configuration and status information regarding the TMs and HLH. The HL manager also manages remote software downloads into the HLH and automatic detection and reporting of TM port misconfigurations.

A CORBA server 386 provides the "glue" for all management applications with information regarding provisioning 382A, inventory 394, status 384A and alarms 396. The CORBA server extends an API 387 to service provider operation systems (OSs) 397 for support of automated flow-through provisioning applications. Thus, SNMP agent 390 is written as a CORBA client rather than operating directly on raw internal memory or hardware as would be the usual approach. The SNMP agent 390 allows the CPA to be managed in the usual fashion by an element manager. However, the internal managed objects are also directly available through the CORBA interface, making it easy to integrate the management of the CPA with legacy and future OSSs.

The CPA 42 provides subscriber management provisioning which includes HLH initialization and TM provisioning. In particular, the HLH initialization includes provisioning of the signaling and management virtual circuits and downloading of system configuration information. For each new TM, the CPA subscriber management provides the following functions: provisioning of the bearer channel virtual circuit; assignment of the CRV and TM port number; creation of the HLH association; and downloading of the TM related configuration information into the HLH.

The CPA 42 further includes a local craft interface 56A for local monitoring, provisioning and testing and an SNMP manager 56B for receiving SNMP traps, retrieving status and counter values and displaying configuration information.

To illustrate the power of CORBA-based flow-through provisioning, its impact on a subscriber's telephone line service order provisioning process is now described. In a provisioning model, such as the one that currently exists in the PSTN, a customer care agent takes the subscriber's order and enters a service order into systems such as PREMIS and SOP, which validate the order, perform a credit check if necessary and return the telephone number. After completion of the service order, a system such as SOAC triggers the engineering and provisioning process. During this process, a system such as SWITCH, which manages and assigns the Class 5 switch resources, generates the phone line's Call Reference Value (CRV), which needs to be provisioned in the Class 5 switch as well as the VLC system. A system such as MARCH/MAS is then used to provision this information in the Class 5 switch and the SNMP manager 56B can be used to perform the same operation on the VLC system.

Figure 29:
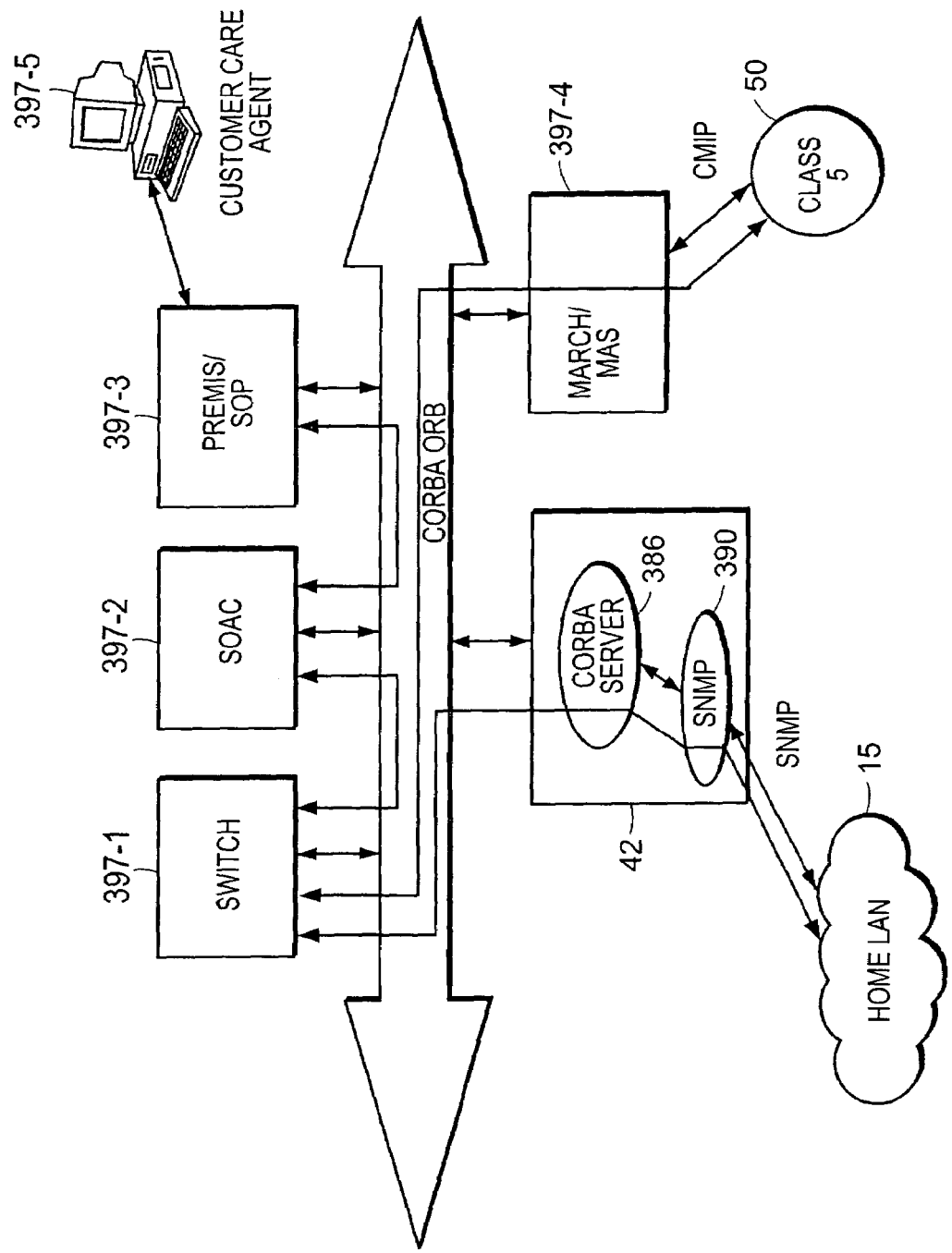
FIG. 29 is a management plane diagram illustrating a CORBA-based provisioning configuration.

The foregoing provisioning model is a highly manual process, whereby multiple workgroups get involved in executing the steps and entering information from one system to another. Such a process is error-prone and typically takes several hours or even days to complete. In contrast, by deploying a CORBA-based provisioning environment, service providers can dramatically cut-down the cycle time by several orders of magnitude. FIG. 29 shows a configuration for CORBA-based flow-through provisioning with the CORBA server 386 of CPA 42 and the aforementioned OSSs 397-1, 397-2, 397-3, 397-4. In this configuration, once the customer care agent 397-5 completes the service order, the CRV provisioning aspects can be fully automated across all the network components, thereby eliminating data entry errors and slashing provisioning intervals dramatically.

There are several advantages of the CORBA-based configuration. For example, by basing the internal management scheme on CORBA, instead of raw memory, it is very easy to add new protocols as CORBA clients, such as the BellCORE TL1 protocol, if desired to inter-operate with OSSs. Another advantage is that if the element manager should be turned off or fail for some reason, the other OSSs can still communicate with the CPA directly, thereby leading to greater overall system reliability and availability.

5.0 Software

The software components of the virtual loop carrier system 10 (FIG. 1) are distributed across the HLH 20 and the CPA 42.

Figure 30:
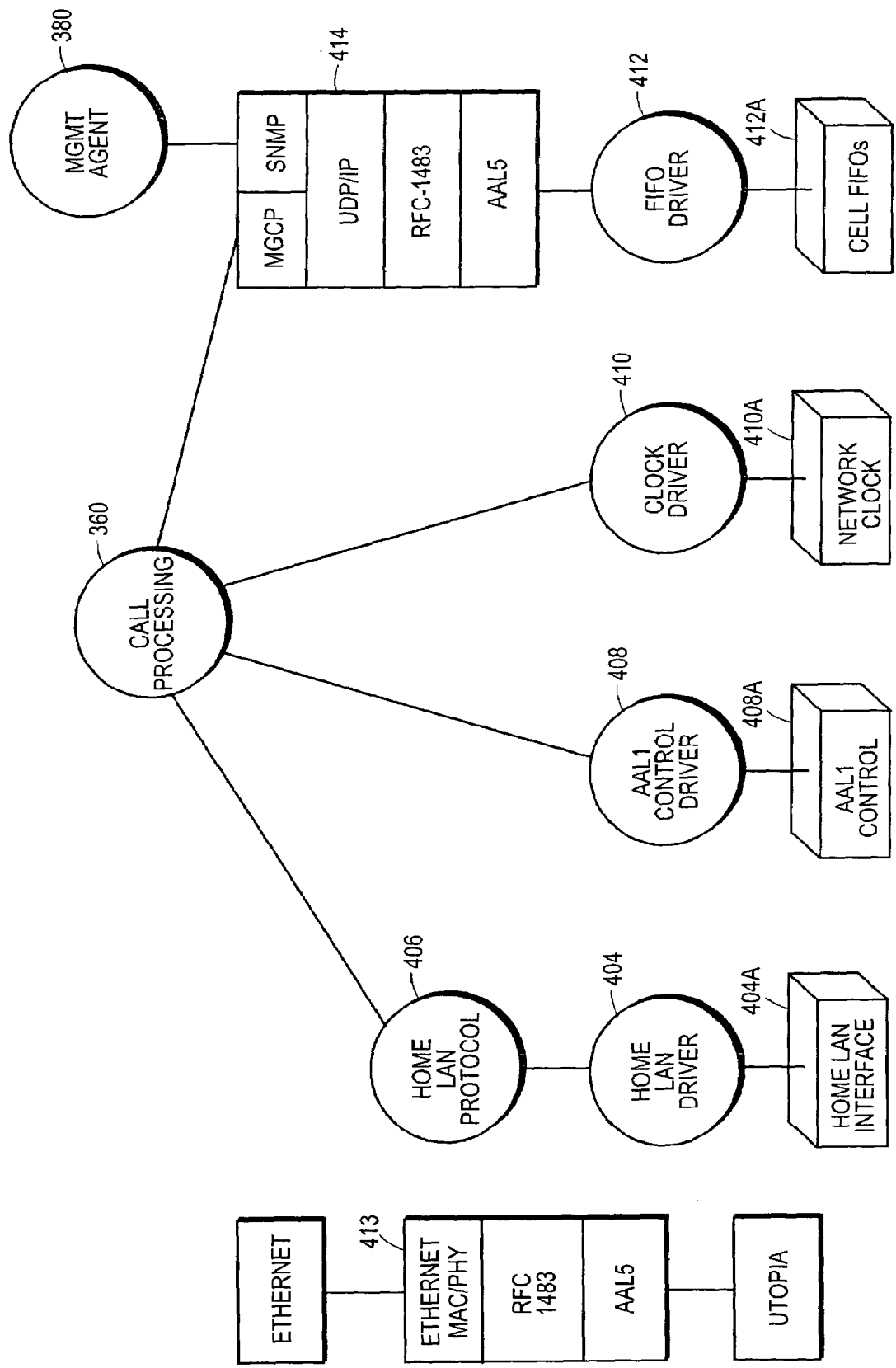
FIG. 30 is a software architecture diagram for the home LAN hub of FIG. 1.

There are seven major functional components of the software architecture for the HLH 20 as shown in FIG. 30. These components include call processing, home LAN protocol, AAL1 entity control, network clock control, network communications, user data communications and network management.

The call processing software 360 (also shown in FIG. 24) sets up and tears down connections based on commands received from the CPA 42 as described above. The call processing software also notifies the CPA of relevant events such as on-hook/off-hook signaling status, also described above. While most of the home LAN protocol is implemented in hardware in the preferred embodiment, software is needed to control such hardware. A home LAN driver 404 provides this control function. Additionally, some of the home LAN protocol, such as TM registration and on-hook/off-hook detection, is implemented in a home LAN protocol software module 406.

The HLH 20 includes four AAL1 entities implemented in hardware. An AAL1 entity control driver 408 provides configuration and control of this hardware on a call-by-call basis. A network clock control driver takes care of controlling the hardware used to recover network timing from the received ATM cell stream (described above) or from the ADSL physical layer.

A network communications module provides a wide-area connection (permanent virtual circuit) to the CPA 42. This wide-area connection is used for signaling and network management communications. A two-way cell FIFO 412A is included in the HLH to buffer incoming and outgoing ATM cells on the permanent virtual circuit. The HLH software includes a FIFO driver 412 which transfers cells between the FIFO 412A and a buffer in the processor memory (not shown). Above the FIFO driver 412 is a protocol stack 414 that includes ATM Adaptation Layer 5 (AAL5), RFC-1483 "Multiprotocol Encapsulation over ATM Adaptation Layer 5" layer and a standard IP with UDP. On top of UDP are several application layer protocols including SNMP and MGCP. Other application layer protocols can be added as needed.

Figure 2:
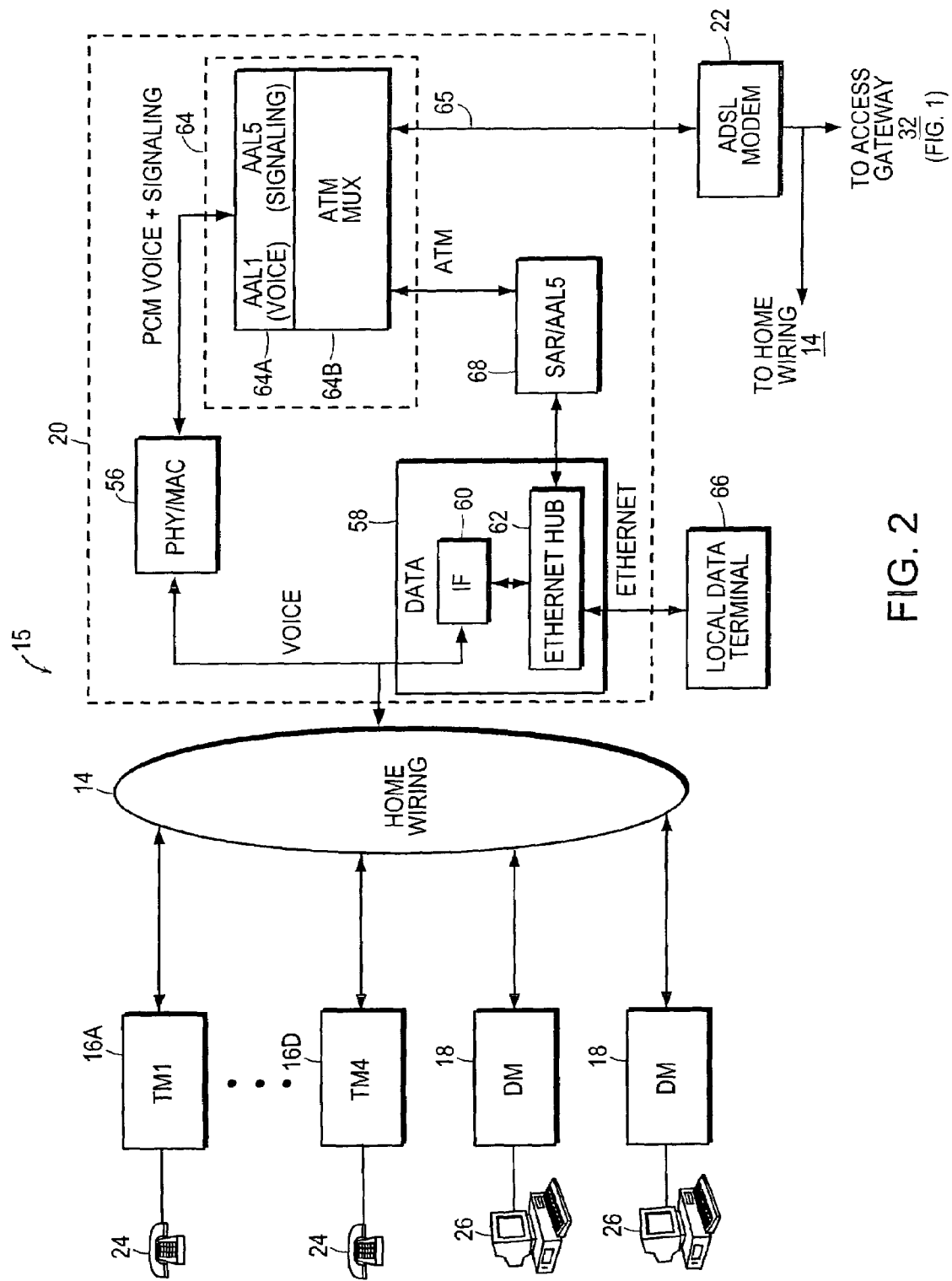
FIG. 2 is a block diagram of the home local area network shown in FIG. 1.

The user data communications block 413 provides an Ethernet port for connecting to a subscriber computer (e.g., device 66, FIG. 2). The user data communications block 413 has a protocol stack that includes AAL5, RFC-1483, and Ethernet MAC/PHY between Utopia and Ethernet interfaces.

The network management agent 380 (described above with reference to FIG. 28) provides information on the health of the HLH and its TMs to the CPA and allows a CPA to provision certain operating parameters such as the upstream ADSL rate and the call-reference value associated with each telephone line. Additionally, the network management agent provides a means for upgrading the HLH software.

Figure 31:
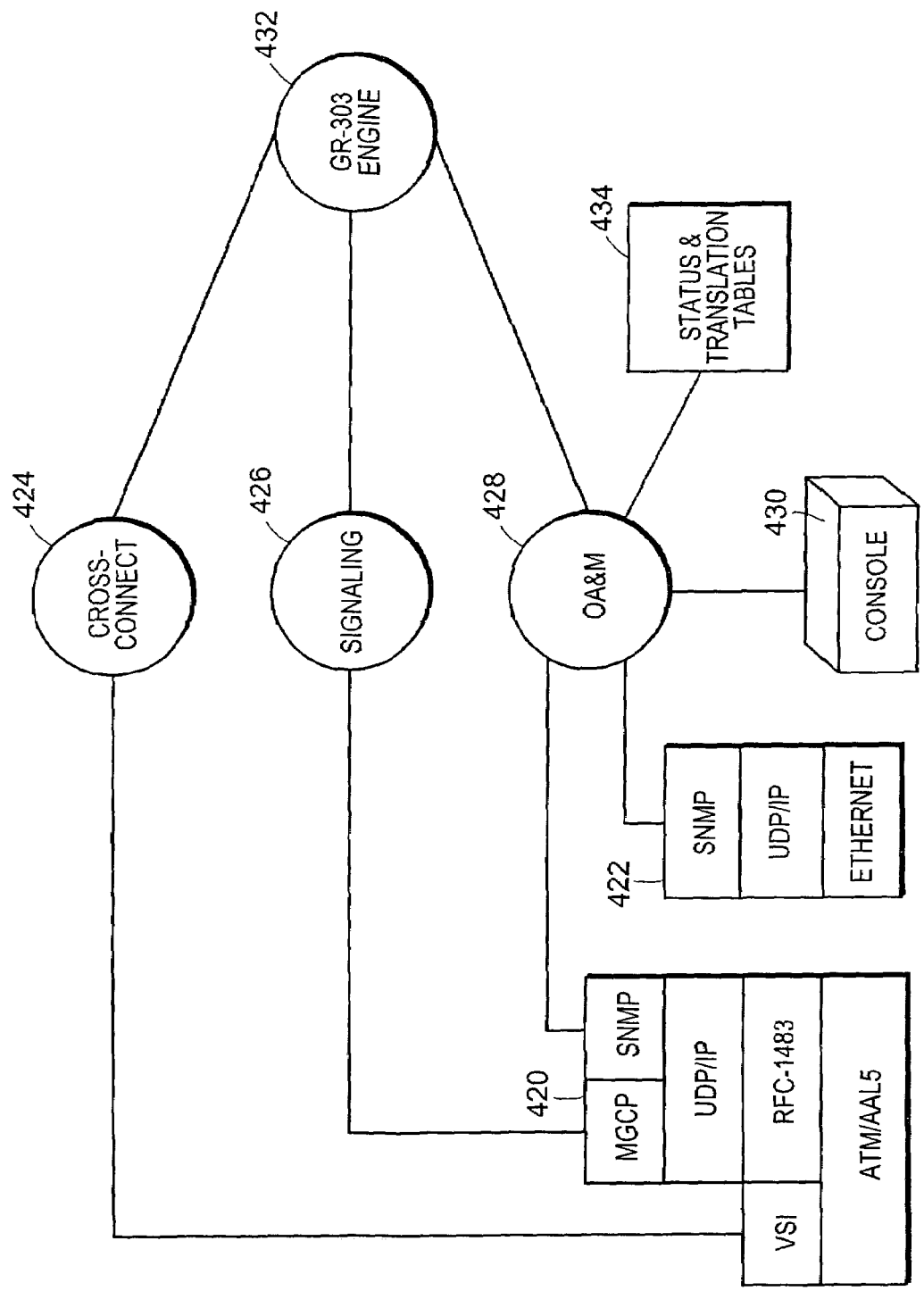
FIG. 31 is a software architecture diagram for the gateway of FIG. 1.

The major functional components of the software architecture for the CPA 42 (FIG. 1) include ATM protocol stack 420, Ethernet protocol stack 422, cross-connect control module 424, signaling module 426, GR-303 engine 432 and OAM module 428 as shown in FIG. 31.

The ATM protocol stack 420 provides permanent virtual circuit communications to the HLH 20 and the ATM switch 44 (FIG. 1). The HLH to CPA data link uses UDP/IP-base application layer protocols including MGCP and SNMP. An RFC-1483 protocol convergence layer is used to support the IP stack over ATM.

The Ethernet protocol stack 422 provides the means for the SNMP manager 56B (FIG. 28) to communicate with the CPA and for the CPA to query the ATM switch for operational status.

The cross-connect module 424 receives commands from the GR-303 engine 432 to make and break circuit connections between DS0 channels. The cross-connect module translates these commands into ATM virtual circuit connections and sends commands to the ATM switch 44 using the VSI protocol. The cross-connect module maintains the state of the connections at the GR-303 engine 432. The signaling module 426 is a state machine that controls the voice over ATM gateway function in the HLH based on a Q.931 primitives interchange with the GR-303 engine module.

The GR-303 engine module provides the basic TMC and EOC communications described herein above with reference to FIGS. 24 and 28. The OAM module 428 is implemented in the managed objects that run under the CORBA server 386 (FIG. 28).

The following describes a procedure that allows "diskless workstations" (such as an HLH 20, FIG. 1) on a PVC-only, IP over ATM network to automatically obtain their IP address from a central server such as the CPA 42.

The network topology for the virtual loop carrier system 10 (FIG. 1) is an example of a network of relatively dumb endpoints, i.e., HLHs 20, connected to a central server, i.e., CPA 42, over permanent virtual circuits (PVCs). The HLH endpoints do not directly communicate with each other, but only with the CPA on private, point-to-point, PVCs. It is highly desirable to be able to run IP applications over this network.

RFC-1577/RFC-2225 define a way to run IP applications over an ATM network. However, a limitation of this method is that all endpoints must be manually configured with an ATM address, their own IP address and their PVCs (if using PVCs). If the network were to consist of a large number (e.g., hundreds, thousands, or more) of geographically dispersed hosts, configuring addresses and PVCs manually causes operational difficulties. Further, if the intended network consists of relatively "dumb" endpoints such as the canonical "diskless workstation," it may not be possible.

A better way to allow ATM endpoints to boot up and obtain all their required information including their IP addresses and even their PVCs from a central server is now described. Two major constraints are the need to be compatible with existing data communications protocols such as RFC-1483 and the need to be easily implementable over a TCP/IP "Berkley sockets" interface on the server (e.g., CPA 42) using currently available ATM cards and software. This solution does not require changes to the operating system or device drivers on the server.

Two variations of the procedure are provided. The basic procedure assumes that the client endpoints (i.e., the HLHs) know which PVC to use to communicate with the server. In the more complex case, the clients do not know which PVC to use and must learn it. In both cases, the server does know which PVC's are configured and has a means to assign IP addresses based on the client PVC.

The basic procedure wherein the client endpoints know which PVC to use is first described. The client endpoints have three states: C_IDLE, C_LISTENING, and C_CONFIGURED. The C_IDLE state occurs when the endpoint is powered down or has been reset. The C_LISTENING state occurs when the unit has power, has gone through its boot-up procedures and just needs an IP address to communicate with the server. The C_CONFIGURED state is when the unit has an IP address.

The server (i.e., CPA 42) also maintains an internal state for each of its clients. There are two possible states: the NOT-CONFIGURED state and the CONFIGURED state. The CONFIGURED state means that the server believes the client has an IP address. The NOT-CONFIGURED state means the server believes the client needs an IP address. When a new client endpoint is provisioned at the server, the server either selects (using some algorithm), or is provisioned with, the PVC and IP address for the client. The server initially sets its state for that client to NOT-CONFIGURED.

In the NOT-CONFIGURED state, the server periodically sends an unsolicited BOOTP RESPONSE message with the IP addresses of itself and of the client. The server stays in this state until it receives an SNMP TRAP message from the client indicating that the client is operational. When the server receives the TRAP, it sets its client state to CONFIGURED and ceases sending BOOTP RESPONSE messages. The server expects to receive an SNMP TRAP message on a periodic basis from the client when the client has an IP address. This period could be a fixed time such as one minute or it could be provisioned at the server and possible passed to the client in a message such as an SNMP SET message. If the server does not receive one or more TRAP messages when they are expected, it changes its state for that client back to NOT-CONFIGURED and then uses the above described procedure.

The client endpoint starts in the C_IDLE state. When it has power and has gone through its boot-up procedure, it goes into the C_LISTENING state. In the C_LISTENING state, it monitors its PVC for the BOOTP RESPONSE message. When it "hears" the message, it extracts its IP address and the server's IP address and saves them. It then goes to the C_CONFIGURED state and immediately sends an SNMP TRAP message to the server. While in the C_CONFIGURED state, it periodically sends SNMP TRAP messages to the server.

In a network where the client endpoints do not even know which PVC to use, the above procedure is modified so that in the C_LISTENING state, the client listens on all PVC's for the BOOTP RESPONSE message from the server. When the client hears the BOOTP RESPONSE message, it records the PVC where the message was received and then uses this PVC for all communications with the server (as long as it remains in the C_CONFIGURED state). This approach can additionally be modified to handle special cases such as only listening on some PVCs for the BOOTP RESPONSE message and ignoring messages on all other PVCs. This can be used to allow communications to be shared with multiple devices or functions on an ATM link or to enforce network security.

6.0 Alternate Embodiments

Figure 32:
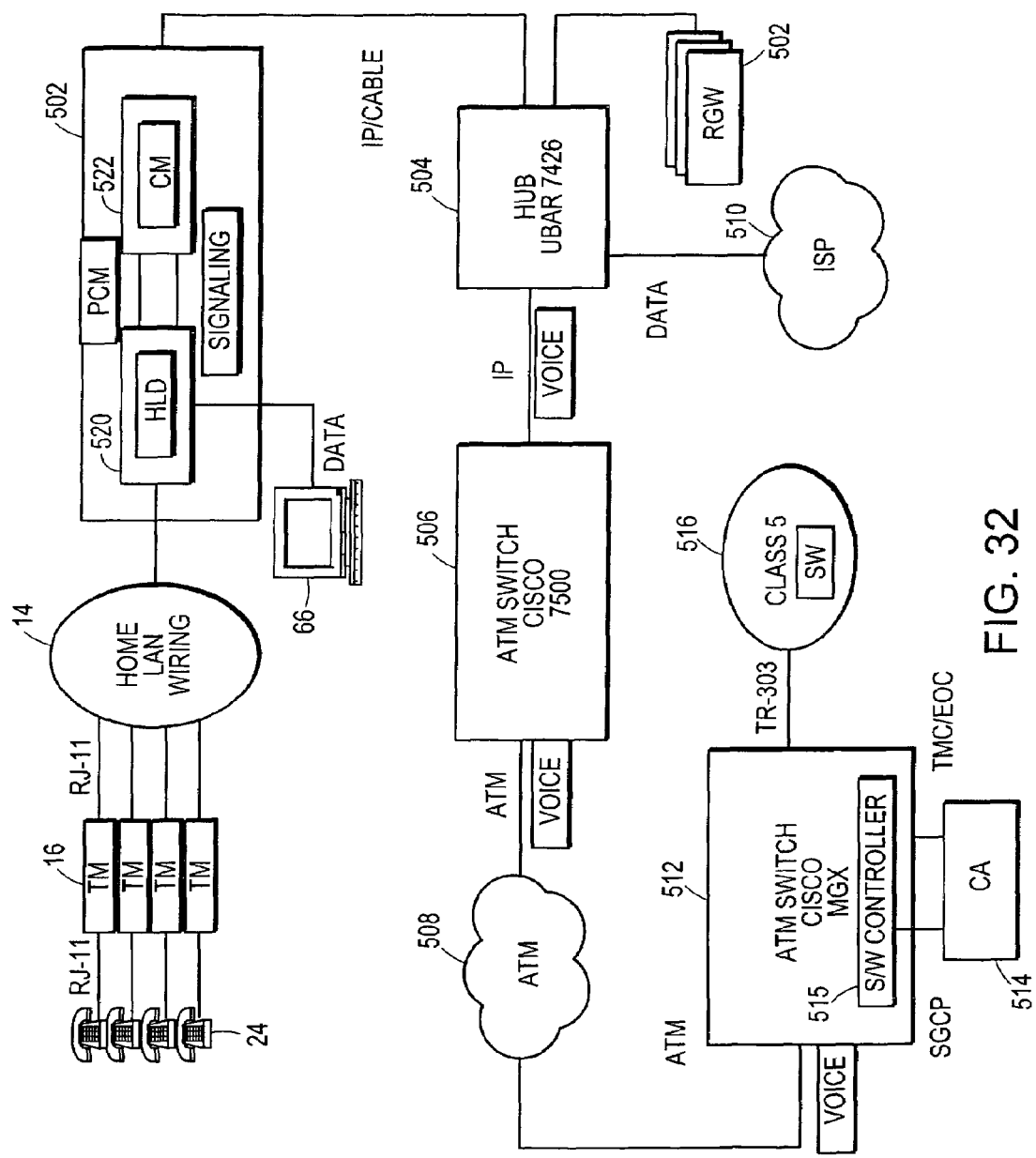
FIG. 32 is a block diagram of an alternate embodiment of a loop carrier system.

The virtual loop carrier system embodiment described herein above is based on xDSL access and ATM transport of voice services. An alternate embodiment is shown in FIG. 32 in which access to the home is provided over cable facilities using cable modem technology and the voice services are transported using voice over EP. In this embodiment, the telephone modules 16 and home wiring 14 are as described above with reference to FIG. 1. A residential gateway (RGW) 502 at the home includes a home LAN device 520 and a cable modem 522. Similar to the functionality provided by the HLH 20 (FIG. 1), the home LAN device 520 terminates the home LAN physical and MAC layers. Unlike the HLH 20 which converts PCM voice samples received from the TMs to AAL1 cells for transport over ADSL, the home LAN device 520 passes PCM voice samples and signaling (in-band and out-of-band) to cable modem 522 via a well-defined interface such as a TDM bus, RJ-11 or IP interface. The cable modem 522 transports the voice and signaling within IP packets to a hub or router 504 (e.g., a model UBR 7426 device). The hub 504 transports the IP packets to an IP-to-ATM converter 506 (e.g., Cisco Systems 7500 switch) which routes ATM cells through ATM network 508 to a GR-303 gateway switch 512 (e.g., Cisco Systems MGX switch). At the gateway 512, ATM to IP to DS0 conversion takes place such that each voice call is transported in a DS0 to Class 5 digital switch 516.

In addition to voice transport, a call agent 514, similar to the CPA 42 (FIG. 1) in the ADSL architecture, provides signaling translation functions. The MGCP signaling protocol is used between the call agent 514 and the residential gateway 502 and GR-303 is used between the call agent and the Class 5 switch 516.

Other embodiments can include a purely IP based access network wherein the gateway 512 is replaced with an IP router. In such an IP based approach, the telephone numbers and DS0 terminations on the gateway have IP addresses and routing is based on these IP addresses.

In yet another embodiment, the Class 5 switch 516 can be replaced with a Class 4 switch so that the GR-303 functions are replaced with signaling system 7 (SS7) functions. In such an embodiment, the conventional custom calling features such as call waiting and three-way calling are provided by software in the call agent. In addition, the residential gateway is expanded to provide dial tone, digit collection and other tones normally provided by the Class 5 switch.

Figure 33:
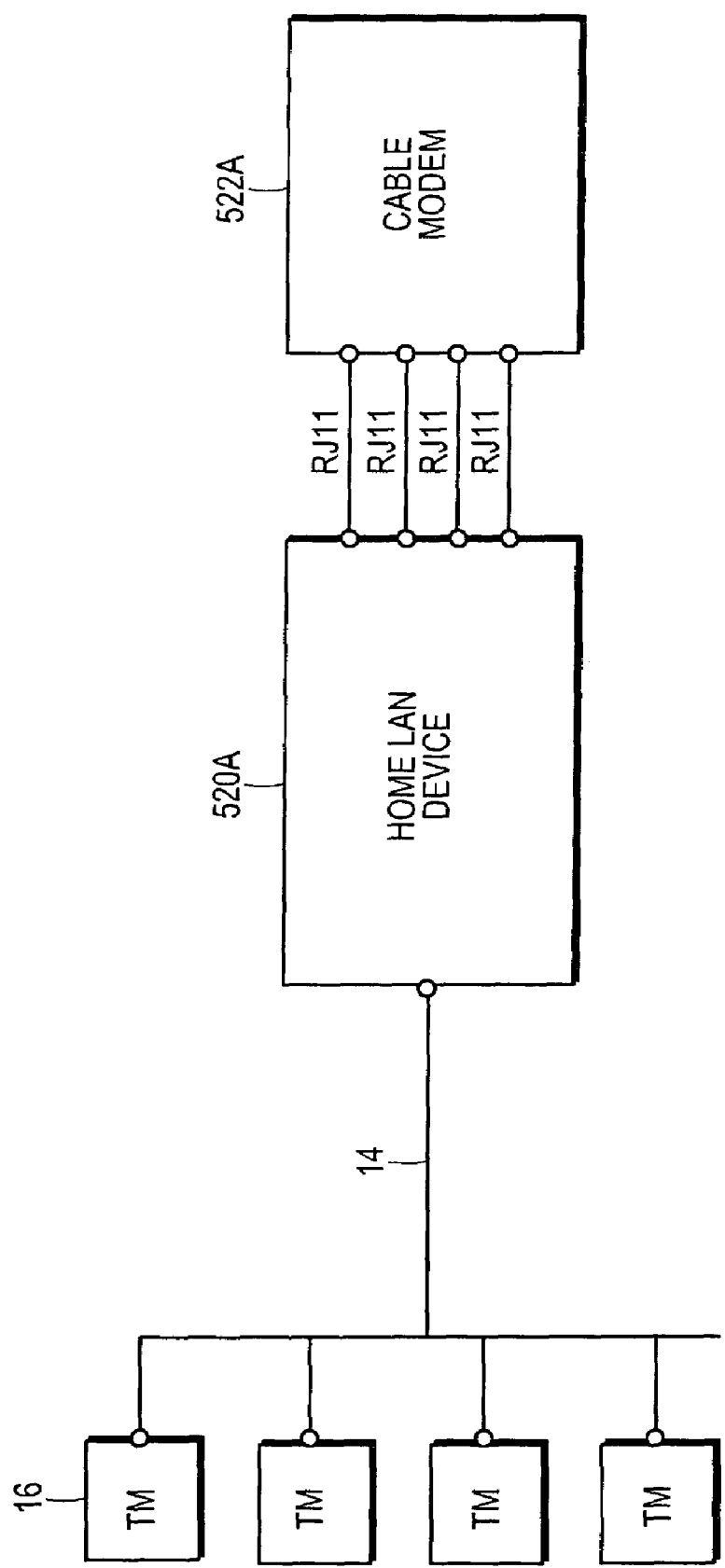
FIG. 33 is a block diagram of an alternate embodiment of a home local area network.

As described with reference to FIG. 32, the home LAN device 520 passes PCM voice samples and signaling (in-band and out-of-band) to cable modem 522 via a well-defined interface. An alternate embodiment of a home LAN device 520A is now described with reference to FIG. 33. In this embodiment, the telephone modules 16 and home wiring 14 are as described previously (FIG. 1). However, rather than pass PCM voice samples to the cable modem, the home LAN device 520A passes conventional analog telephony signals to cable modem 522A through standard connections, e.g., RJ-11. The cable modem 522A is a known cable modem such as a Cisco UBR 924 which converts the analog voice signals either to IP packets (described above for FIG. 32) or to another format suitable for more conventional cable-based telephony access systems.

Figure 34:
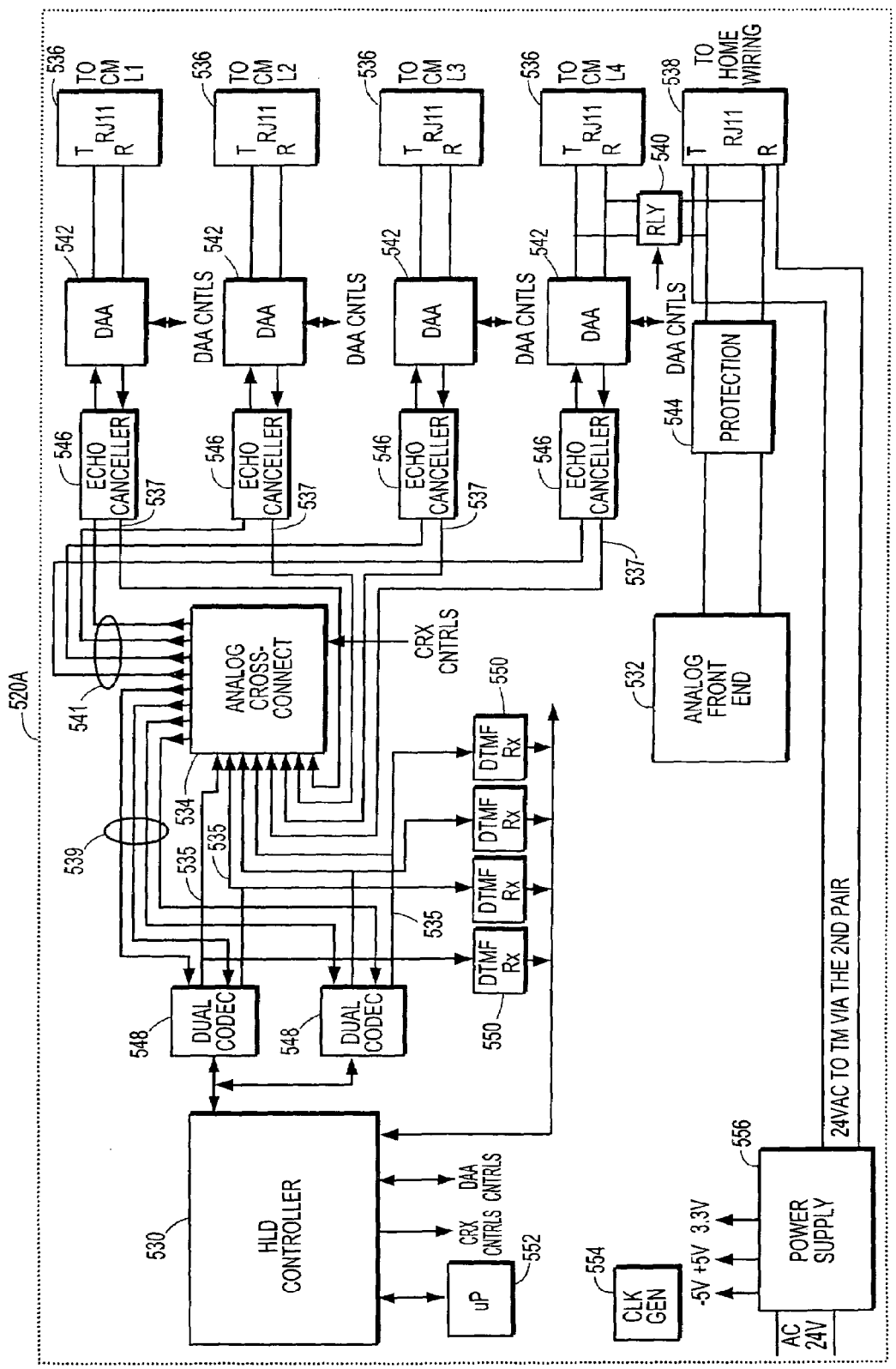
FIG. 34 is a schematic block diagram of an alternate embodiment of a home LAN device for the network of FIG. 33.

A schematic block diagram of the home LAN device (HLD) 520A is shown in FIG. 34. The home LAN device includes an HLD controller 530, analog front end (AFE) 532, analog crossconnect switch 534, microprocessor 552, clock generator 554 and power supply 556. Similar to the HLH 20A described herein above with reference to FIG. 3A, AFE 532 provides the physical layer interface to the home LAN through line protection 544 and home wiring port 538. Likewise, the HLD controller 530 provides an interface to the MAC layer. However, rather than converting PCM samples received through the AFE 532 to ATM AAL1 and AAL5 cells as described above for HLH 20A, the HLD controller 530 passes the upstream PCM samples to codecs 548 which convert the samples to analog telephony signals. These analog telephony signals (which include in-band signaling) are connected on input lines 535 to the analog crossconnect switch 534.

In the downstream direction, analog signals are received from the cable modem 522A (FIG. 33) on line ports 536 and pass through data access arrangement (DAA) devices 542 and echo cancellers 546. The received downstream analog telephony signals are connected on input lines 537 to the switch 534. The switch 534 crossconnects the input signals to output lines 539, 541 which connect downstream and upstream, respectively, to provide PBX-type calling features (e.g., conferencing, call transfers, intercom) under control of the HLD controller 530. In addition, the outputs from codecs 548 are coupled to digital collection receivers 550 to assist in the provision of the PBX-type calling features. Note that life line service in the case of a power outage can be provided by default operation of bypass relay 540 to connect the home wiring port 538 directly to an analog line port 536.

While this invention has been particularly shown and described with references to preferred embodiments thereof, it will be understood by those skilled in the art that various changes in form and details may be made therein without departing from the scope of the invention encompassed by the appended claims.

What is claimed is:

1. In a communication system having a home local area network and
    a local digital switch, a gateway for coupling between the home local area network and
    the local digital switch, the gateway comprising:
        a packet switch having a switch fabric;
        means for controlling conversion between voice packets from the home local area network and a circuit format compatible with the local digital switch and communicating with the home local area network using a first signaling protocol and with the local digital switch using a second signaling protocol, wherein the first and second signaling protocols are different; and
        means for controlling the packet switch fabric to setup and teardown virtual circuits bearing the voice packets in response to call processing messaging received from the home local area network using the first signaling protocol and from the local digital switch using the second signaling protocol.

2. The gateway of claim 1 wherein the second protocol is according to GR-303.

3. The gateway of claim 1 wherein the voice packets comprise ATM cells.

4. The gateway of claim 3 wherein the ATM cells are formatted according to an ATM Adaptation Layer.

5. The gateway of claim 4 wherein the ATM cells include AAL1-type and AAL5-type cells.

6. The gateway of claim 5 wherein the packet switch includes means for converting between AAL1 cells and PCM samples.

7. The gateway of claim 6 wherein the means for converting includes means for inserting PCM samples into DS0 format for connection to the local digital switch.

8. The gateway of claim 5 wherein the packet switch is configurable to route AAL5 cells to the means for controlling conversion wherein the AAL5 cells are converted to GR-303 call processing messages.

9. A computer program product for call processing, the computer program product comprising a computer usable medium having computer readable code thereon, which, when executed, causes one or more processors to perform the steps of:
    controlling conversion between voice packets associated with a home local area network and a circuit format associated with a local digital switch;
    communicating with the home local area network using a first signaling protocol;
    communicating with the local digital switch using a second signaling protocol, wherein the first and second signaling protocols are different; and
    controlling a packet switch fabric to setup and teardown virtual circuits bearing the voice packets in response to call processing messaging received from the home local area network using the first signaling protocol and from the local digital switch using the second signaling protocol.

10. The computer program product of claim 9 wherein the second signaling protocol is according to GR-303.

11. The computer program product of claim 9 wherein controlling conversion between voice packets and a circuit format includes converting between ATM cells and PCM samples.

12. A method of communication in a system having a home local area network that transmits and receives voice packets to and from a local digital switch, the method comprising:
    converting between voice packets and a circuit format at a gateway between the home local area network and the local digital switch;
    communicating with the home local area network from the gateway using a first signaling protocol;
    communicating with the local digital switch from the gateway using a second signaling protocol, wherein the first and second signaling protocols are different; and
    controlling a packet switch fabric to setup and teardown virtual circuits bearing the voice packets in response to call processing messaging received from the home local area network using the first signaling protocol and from the local digital switch using the second signaling protocol.

13. The method of claim 12 wherein the second protocol is according to GR-303.

14. The method of claim 13 further including converting AAL5 cells to GR-303 call processing messages at the gateway.

15. The method of claim 12 further including routing voice packets conveying AAL1 cells through an ATM network to the gateway and converting includes converting the AAL1 cells to PCM samples and inserting the PCM samples into DS0s for connection with the local digital switch.

\* \* \* \* \*

UNITED STATES PATENT AND TRADEMARK OFFICE
CERTIFICATE OF CORRECTION

PATENT NO. : 7,164,694 B1
APPLICATION NO. : 10/378587
DATED : January 16, 2007
INVENTOR(S) : Paiman Nodoushani and Anthony Monteiro It is certified that error appears in the above-identified patent and that said Letters Patent is hereby corrected as shown below:

Title page, item (75) Inventors, delete: "Anthony Monterio" and insert: --Anthony Monteiro--.

Signed and Sealed this

Twentieth Day of March, 2007

JON W. DUDAS
*Director of the United States Patent and Trademark Office*